(12) United States Patent
Wang et al.

(10) Patent No.: US 11,856,234 B2
(45) Date of Patent: Dec. 26, 2023

(54) INTERACTION BETWEEN SUB PICTURE AND TILE ROW SIGNALING

(71) Applicant: Bytedance Inc., Los Angeles, CA (US)

(72) Inventors: Ye-Kui Wang, San Diego, CA (US); Li Zhang, San Diego, CA (US); Kai Zhang, San Diego, CA (US)

(73) Assignee: BYTEDANCE INC., Los Angeles, CA (US)

( * ) Notice: Subject to any disclaimer, the term of this patent is extended or adjusted under 35 U.S.C. 154(b) by 0 days.

(21) Appl. No.: 17/894,888

(22) Filed: Aug. 24, 2022

(65) Prior Publication Data

US 2023/0007280 A1    Jan. 5, 2023

Related U.S. Application Data

(63) Continuation of application No. PCT/US2021/019235, filed on Feb. 23, 2021.

(60) Provisional application No. 62/980,963, filed on Feb. 24, 2020.

(51) Int. Cl.
| | |
|---|---|
| *H04N 19/134* | (2014.01) |
| *H04N 19/70* | (2014.01) |
| *H04N 19/174* | (2014.01) |
| *H04N 19/136* | (2014.01) |
| *H04N 19/172* | (2014.01) |
| *H04N 19/176* | (2014.01) |
| *H04N 19/169* | (2014.01) |

(52) U.S. Cl.
CPC ........... *H04N 19/70* (2014.11); *H04N 19/134* (2014.11); *H04N 19/136* (2014.11); *H04N 19/172* (2014.11); *H04N 19/174* (2014.11); *H04N 19/176* (2014.11); *H04N 19/1883* (2014.11)

(58) Field of Classification Search
None
See application file for complete search history.

(56) References Cited

U.S. PATENT DOCUMENTS

| | | |
|---|---|---|
| 9,491,456 B2 | 11/2016 | Wang |
| 10,511,843 B2 | 12/2019 | Fu et al. |
| 11,197,006 B2 | 12/2021 | Poirier et al. |
| 11,297,310 B2 | 4/2022 | Yoo et al. |

(Continued)

FOREIGN PATENT DOCUMENTS

| | | |
|---|---|---|
| CN | 110662053 A | 1/2020 |
| EP | 3020202 A1 | 5/2016 |

(Continued)

OTHER PUBLICATIONS

Document: JVET-Q_Notes_dF, Sulllivan et al. "Meeting Report of the 17th Meeting of the Joint Video Experts Team (JVET)," Joint Video Experts Team (JVET) of ITU-T SG 16 WP 3 and ISO/IEC JTC 1/SC 29/WG 11, 17th Meeting: Brussels, BE, Jan. 7-17, 2020, pp. 1-7, 149, 249-260.

(Continued)

*Primary Examiner* — Christopher G Findley
(74) *Attorney, Agent, or Firm* — Conley Rose, P.C.

(57) ABSTRACT

A method includes making a determination, according to a rule, about whether a height of a subpicture of a video picture of a video is less than a height of a tile row of the video picture; and performing, using the determination, a conversion between the video and a bitstream of the video.

17 Claims, 17 Drawing Sheets

(56) References Cited

U.S. PATENT DOCUMENTS

| | | | |
|---|---|---|---|
| 11,297,317 | B2 | 4/2022 | Han et al. |
| 11,477,454 | B2 | 10/2022 | Paluri et al. |
| 11,523,108 | B2 | 12/2022 | Zhang et al. |
| 11,533,500 | B2 | 12/2022 | Paluri et al. |
| 11,539,950 | B2 | 12/2022 | Zhang et al. |
| 11,601,655 | B2 | 3/2023 | Chen |
| 2012/0207227 | A1 | 8/2012 | Tsai et al. |
| 2013/0202051 | A1 | 8/2013 | Zhou |
| 2015/0264404 | A1 | 9/2015 | Hanuksela |
| 2015/0358631 | A1 | 12/2015 | Zhang et al. |
| 2016/0353110 | A1 | 12/2016 | Zhang et al. |
| 2016/0366437 | A1 | 12/2016 | Zhou et al. |
| 2017/0238014 | A1 | 8/2017 | Said |
| 2017/0238019 | A1 | 8/2017 | Said |
| 2018/0103252 | A1 | 4/2018 | Hsieh et al. |
| 2018/0270480 | A1 | 9/2018 | Zhang et al. |
| 2018/0376126 | A1 | 12/2018 | Hannuksela |
| 2019/0182495 | A1 | 6/2019 | Bruns et al. |
| 2019/0246143 | A1 | 8/2019 | Zhang et al. |
| 2019/0253624 | A1 | 8/2019 | Kim |
| 2019/0387241 | A1 | 12/2019 | Kim et al. |
| 2020/0260070 | A1 | 8/2020 | Yoo |
| 2020/0322623 | A1 | 10/2020 | Chiang |
| 2020/0389671 | A1 | 12/2020 | Zhao |
| 2020/0396475 | A1 | 12/2020 | Furht |
| 2021/0092408 | A1 | 3/2021 | Ramasubramonian |
| 2021/0136415 | A1 | 5/2021 | Hashimoto |
| 2021/0195186 | A1* | 6/2021 | Wu .................. H04N 19/196 |
| 2021/0218965 | A1 | 7/2021 | Li et al. |
| 2021/0409779 | A1 | 12/2021 | Li |
| 2022/0039430 | A1 | 2/2022 | Blase |
| 2022/0394281 | A1 | 12/2022 | Zhang et al. |
| 2022/0394301 | A1 | 12/2022 | Deshpande et al. |
| 2023/0057736 | A1 | 2/2023 | Hendry |
| 2023/0060709 | A1 | 3/2023 | Ouedraogo |

FOREIGN PATENT DOCUMENTS

| | | |
|---|---|---|
| EP | 4032304 A1 | 7/2022 |
| GB | 2584295 A | 12/2020 |
| GB | 2590636 A | 7/2021 |
| JP | 2013236358 A | 11/2013 |
| WO | 2019073112 A1 | 4/2019 |
| WO | 2019167849 A1 | 9/2019 |
| WO | 2019185883 A1 | 10/2019 |
| WO | 2019190907 A1 | 10/2019 |
| WO | 2020011796 A1 | 1/2020 |
| WO | 2020035827 A1 | 2/2020 |

OTHER PUBLICATIONS

Document: JVET-Q2001-vC, Bross, B., et al., "Versatile Video Coding (Draft 8)," Joint Video Experts Team (JVET) of ITU-T SG 16 WP 3 and ISO/IEC JTC 1/SC 29/WG 11 17th Meeting: Brussels, BE, Jan. 7-17, 2020, 508 pages.
"Series H: Audiovisual and Multimedia Systems Infrastructure of audiovisual services—Coding of moving video High efficiency video coding," Recommendation ITU-T H.265, Feb. 2018, 692 pages.
Document: JVET-G1001-v1, Chen J., et al., "Algorithm Description of Joint Exploration Test Model 7 (JEM 7)," Joint Video Exploration Team (JVET) of ITU-T SG 16 WP 3 and ISO/IEC JTC 1/SC 29/WG 11 7th Meeting: Torino, IT, Jul. 13-21, 2017, 50 pages.
Document: JVET-Q2002-v3, Chen, J., et al., "Algorithm description for Versatile Video Coding and Test Model 8 (VTIV 8)," Joint Video Experts Team (JVET) of ITU-T SG 16 WP 3 and ISO/IEC JTC 1/SC 29/WG 11 17th Meeting: Brussels, BE, Jan. 7-17, 2020, 97 pages.
Suehring, K., Retrieved from the Internet: https://vcgit.hhi.fraunhofer.de/jvet/WCSoftware_VTM.git, Nov. 15, 2022, 3 pages.
Document: JCTVC-AC1005-v2, Boyce, J., et al., "HEVC Additional Supplemental Enhancement Information (Draft 4)," Joint Collaborative Team on Video Coding (JCT-VC) of ITU-T SG 16 WP 3 and ISO/IEC JTC 1/SC 29/WG 11 29th Meeting: Macao, CN, Oct. 19-25, 2017, 56 pages.
Document: JVET-Q_Notes_dF, Sullivan, G., et al., "Meeting Report of the 17th Meeting of the Joint Video Experts Team (JVET)," Joint Video Experts Team (JVET) of ITU-T SG 16 WP 3 and ISO/IEC JTC 1/SC 29/WG 11, 17th Meeting: Brussels, BE, Jan. 7-17, 2020, 26 pages.
Aklouf, M., et al., "Low Complexity Versatile Video Coding (VVC) for Low Bitrate Applications," HAL id: hal-02299789, https://hal.archived-ouvertes.fr/hal-02299789, 8th European Workshop on Visual Information Processing (EUVIP 2019), Oct. 2019, 7 pages.
Koo, M., et al., "Low Frequency Non-Separable Transform (LFNST)," 2019 Picture Coding Symposium (PCS), Nov. 12-15, 2019, 5 pages.
Foreign Communication From A Related Counterpart Application, International Application No. PCT/CN2021/020618, English Translation of International Search Report dated Jul. 14, 2021, 22 pages.
Foreign Communication From A Related Counterpart Application, International Application No. PCT/CN2021/19216, English Translation of International Search Report dated May 7, 2021, 10 pages.
Foreign Communication From A Related Counterpart Application, International Application No. PCT/CN2021/19217, English Translation of International Search Report dated May 11, 2021, 16 pages.
Foreign Communication From A Related Counterpart Application, International Application No. PCT/CN2021/19228, English Translation of International Search Report dated May 7, 2021, 9 pages.
Foreign Communication From A Related Counterpart Application, International Application No. PCT/CN2021/19235, English Translation of International Search Report dated May 17, 2021, 10 pages.
Foreign Communication From A Related Counterpart Application, International Application No. PCT/CN2021/20615, English Translation of International Search Report dated May 20, 2021, 15 pages.
Document: JVET-M1001-v7, Bross, B., et al., "Versatile Video Coding; Draft 4," Joint Video Experts Team (JVET) of ITU-T SG 16 WP 3 and ISO/IEC JTC 1/SC 29/WG 11 13th Meeting: Marrakech, MA, Jan. 9-18, 2019, 300 pages.
Foreign Communication From A Related Counterpart Application, Indian Application No. 202227048235, Indian Office Action dated Dec. 8, 2022, 6 pages.
Non-Final Office Action dated Dec. 16, 2022, 23 pages, U.S. Appl. No. 17/893,500, filed Aug. 23, 2022.
Non-Final Office Action dated Jan. 3, 2023, 22 pages, U.S. Appl. No. 17/893,481, filed Aug. 23, 2022.
Document: JVET-Q2001-vD, Bross, B., et al., "Versatile Video Coding (Draft 8)," Joint Video Experts Team (JVET) of ITU-TSG 16 WP 3 and ISO/IEC JTC 1/SC 29/WG 11 17th Meeting: Brussels, BE, Jan. 7-17, 2020, 509 pages.
Document: JVET-Q2001-v3, Bross, B., et al., "Versatile Video Coding (Draft 8)," Joint Video Experts Team (JVET) of TU-TSG 16 WP 3 and ISO/IEC JTC 1/SC 29/WG 11 17th Meeting: Brussels, BE, Jan. 7-17, 2020, 39 pages.
Document: JVET-P0365-v2, Ramasubramonian, A., et al., "AHG15: Scaling matrices for LFNST-coded blocks," Joint Video Experts Team (JVET) of ITU-TSG 16 WP 3 and ISO/IEC JTC 1/SC 29/WG 11 16th Meeting: Geneva, CH, Oct. 1-11, 2019, 4 pages.
Non-Final Office Action dated Mar. 28, 2023, 31 pages, U.S. Appl. No. 17/901,270, filed Sep. 1, 2022.
Foreign Communication From A Related Counterpart Application, European Application No. 21760718.3, Extended European Search Report dated Feb. 27, 2023, 10 pages.
Foreign Communication From A Related Counterpart Application, European Application No. 21764233.9, Extended European Search Report dated Mar. 22, 2023, 9 pages.
Document: JVET-R0062-v1, Zhang, L., et al., "AHG12: A cleanup on uniform tile and rectangular slice partitioning," Joint Video Experts Team (JVET) of ITU-T SG 16 WP 3 and ISO/IEC JTC 1/SC 29/WG 11 18th Meeting: by teleconference, Apr. 15-24, 2020, 6 pages.
Non-Final Office Action dated Apr. 26, 2023, 33 pages, U.S. Appl. No. 17/894,832, filed Aug. 24, 2022.
Notice of Allowance dated May 18, 2023, 18 pages, U.S. Appl. No. 17/893,481, filed Aug. 23, 2022.

\* cited by examiner

1400 →

1402 — Performing a conversion between a video unit of a video region of a video and a bitstream of a video, wherein the bitstream conforms to a format rule, wherein the format rule specifies that a first control information at a first level the video region in the bitstream controls whether a second control information is included at a second level of the video unit in the bitstream, wherein the second level is smaller than the first level, wherein the first control information and the second control information include information about whether or how a luma mapping and chroma scaling (LMCS) tool is applied to the video unit, and wherein the LMCS tool includes using a chroma residue scaling (CRS), or a luma reshaping process (RP) for the conversion

FIG. 14

Performing a conversion between a video and a bitstream of the video according to a rule, wherein the rule specifies that a luma mapping and chroma scaling (LMCS) tool is enabled when a first syntax element in a referred sequence parameter set indicates that the LMCS tool is enabled, wherein the rule specifies that the LMCS tool is not used when the first syntax element indicates that the LMCS tool is disabled, wherein the rule specifies that the LMCS tool is enabled for all slices associated with picture header of a video picture when a second syntax element in the bitstream indicates that the LMCS tool is enabled at the picture header level of the video, wherein the rule specifies that the LMCS tool is not used for all slices associated with the picture header when the second syntax element indicates that the LMCS tool is disabled at a picture header level of the video, wherein the rule specifies that the LMCS tool is used for a current slice associated with a slice header of a video picture when a third syntax element selectively included in the bitstream indicates that the LMCS tool is enabled at a slice header level of the video, and wherein the rule specifies that the LMCS tool is not used for the current slice when the third syntax element indicates that the LMCS tool is disabled at the slice header level of the video

1602

Performing a conversion between a video comprising one or more video pictures and a bitstream of a video according to a rule, wherein the rule specifies that whether an adaptive motion vector difference resolution (AMVR) is used in a motion vector coding of an affine inter mode based on a syntax element selectively included in a referred sequence parameter set (SPS) that indicates whether the AMVR is enabled, wherein the rule specifies that the AMVR is not used in the motion vector coding of the affine inter mode when the syntax element indicates that the AMVR is disabled, and wherein the rule specifies that the AMVR is inferred not to be used in the motion vector coding of the affine inter mode when the syntax element is not included in the SPS

FIG. 16

INTERACTION BETWEEN SUB PICTURE AND TILE ROW SIGNALING

CROSS REFERENCE TO RELATED APPLICATIONS

This application is a continuation of International Patent Application No. PCT/US2021/019235 filed on Feb. 23, 2021, which claims the priority to and benefits of U.S. Provisional Patent Application No. U.S. 62/980,963 filed on Feb. 24, 2020, all of which are hereby incorporated by reference in their entireties.

TECHNICAL FIELD

This patent document relates to image and video coding and decoding.

BACKGROUND

Digital video accounts for the largest bandwidth use on the internet and other digital communication networks. As the number of connected user devices capable of receiving and displaying video increases, it is expected that the bandwidth demand for digital video usage will continue to grow.

SUMMARY

The present document discloses techniques that can be used by video encoders and decoders for processing coded representation of video using control information useful for decoding of the coded representation.

In one example aspect, a video processing method is disclosed. The method includes performing a conversion between a video comprising one or more video pictures and a bitstream of the video, wherein each video picture comprises one or more tiles that include one or more tile columns, wherein the bitstream conforms to a format rule, and wherein the format rule specifies that a tile column index is derived for each coding tree unit (CTU) column of a tile of a video picture.

In another example aspect, a video processing method is disclosed. The method includes performing a conversion between a video comprising one or more video pictures and a bitstream of the video, wherein each video picture comprises one or more tiles that include one or more tile rows, wherein the bitstream conforms to a format rule, and wherein the format rule specifies that a tile row index is derived for each coding tree unit (CTU) row of a tile of a video picture.

In another example aspect, a video processing method is disclosed. The method includes performing a conversion between a video comprising at least one video picture and a bitstream of the video according to a rule, wherein the at least one video picture comprises one or more slices and one or more subpictures, and wherein the rule specifies that an order of slice indices of the one or more slices in the at least one video picture is indicated responsive to a syntax element associated with the at least one picture indicative of whether a single slice is included per subpicture of the at least one video picture.

In another example aspect, a video processing method is disclosed. The method includes performing a conversion between a video unit of a video region of a video and a bitstream of a video, wherein the bitstream conforms to a format rule, wherein the format rule specifies that a first control information at a first level the video region in the bitstream controls whether a second control information is included at a second level of the video unit in the bitstream, wherein the second level is smaller than the first level, wherein the first control information and the second control information include information about whether or how a luma mapping and chroma scaling (LMCS) tool is applied to the video unit, and wherein the LMCS tool includes using a chroma residue scaling (CRS), or a luma reshaping process (RP) for the conversion.

In another example aspect, a video processing method is disclosed. The method includes performing a conversion between a video and a bitstream of the video according to a rule, wherein the rule specifies that a luma mapping and chroma scaling (LMCS) tool is enabled when a first syntax element in a referred sequence parameter set indicates that the LMCS tool is enabled, wherein the rule specifies that the LMCS tool is not used when the first syntax element indicates that the LMCS tool is disabled, wherein the rule specifies that the LMCS tool is enabled for all slices associated with picture header of a video picture when a second syntax element in the bitstream indicates that the LMCS tool is enabled at the picture header level of the video, wherein the rule specifies that the LMCS tool is not used for all slices associated with the picture header when the second syntax element indicates that the LMCS tool is disabled at a picture header level of the video, wherein the rule specifies that the LMCS tool is used for a current slice associated with a slice header of a video picture when a third syntax element selectively included in the bitstream indicates that the LMCS tool is enabled at a slice header level of the video, and wherein the rule specifies that the LMCS tool is not used for the current slice when the third syntax element indicates that the LMCS tool is disabled at the slice header level of the video.

In another example aspect, a video processing method is disclosed. The method includes performing a conversion between a video comprising one or more video pictures and a bitstream of a video according to a rule, wherein the rule specifies that whether an adaptive motion vector difference resolution (AMVR) is used in a motion vector coding of an affine inter mode based on a syntax element selectively included in a referred sequence parameter set (SPS) that indicates whether the AMVR is enabled, wherein the rule specifies that the AMVR is not used in the motion vector coding of the affine inter mode when the syntax element indicates that the AMVR is disabled, and wherein the rule specifies that the AMVR is inferred not to be used in the motion vector coding of the affine inter mode when the syntax element when the syntax element is not included in the SPS.

In another example aspect, a video processing method is disclosed. The method includes performing a conversion between a video comprising a video picture and a bitstream of the video according to a rule, wherein the video picture comprising a subpicture, a tile, and a slice, and wherein the rule specifies that, due to the subpicture comprising the slice that is partitioned from the tile, the conversion is performed by refraining from counting a height of the subpicture using a number of tiles of the video picture.

In another example aspect, a video processing method is disclosed. The method includes performing a conversion between a video comprising a video picture and a bitstream of the video, wherein the bitstream indicates a height of a subpicture of the video picture that is counted based on a number of coding tree units (CTUs) of the video picture.

In another example aspect, a video processing method is disclosed. The method includes making a determination, according to a rule, about whether a height of a subpicture of a video picture of a video is less than a height of a tile row of the video picture; and performing, using the determination, a conversion between the video and a bitstream of the video.

In another example aspect, a video processing method is disclosed. The method includes performing a conversion between a video comprising one or more video pictures, wherein each video picture comprises one or more tiles and a coded representation of a video, wherein the coded representation conforms to a format rule; wherein the format rule specifies first information that is signalled in the coded representation and second information that is derived from the coded representation, wherein at least the first information or the second information relates to row indexes or column indexes of the one or more tiles.

In another example aspect, a video processing method is disclosed. The method includes performing a conversion between a video unit of a video region of a video and a coded representation of a video, wherein the coded representation conforms to a format rule; wherein the format rule specifies that a first control information at the video region controls whether a second control information is included at the video unit level; wherein the first control information and/or the second control information includes information about luma mapping and chroma scaling (LMCS) or chroma residue scaling (CRS) or a reshaping process (RP) used for the conversion.

In yet another example aspect, a video encoder apparatus is disclosed. The video encoder comprises a processor configured to implement the above-described methods.

In yet another example aspect, a video decoder apparatus is disclosed. The video decoder comprises a processor configured to implement the above-described methods.

In yet another example aspect, a computer readable medium having code stored thereon is disclosed. The code embodies one of the methods described herein in the form of processor-executable code.

These, and other features are described throughout the present document.

BRIEF DESCRIPTION OF DRAWINGS

FIGS. 11 to 19 are flowcharts for example methods of video processing.

DETAILED DESCRIPTION

Figure 2:
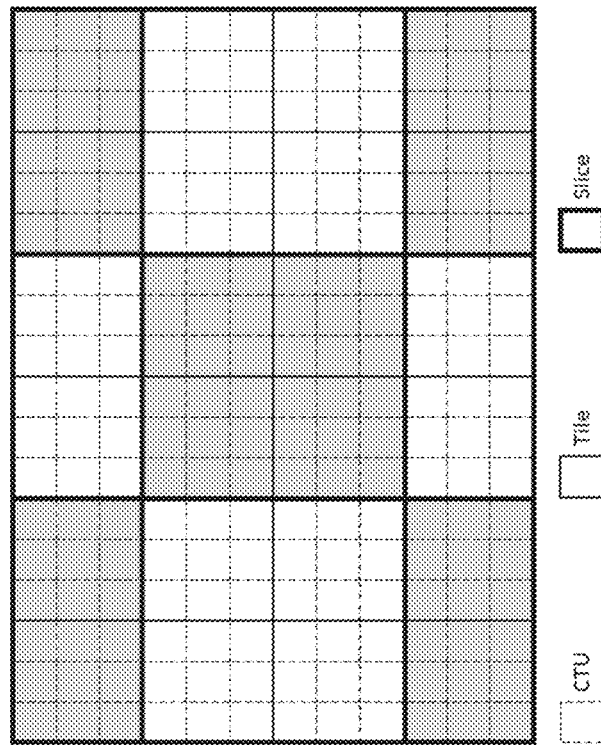
FIG. 2 shows an example of rectangular slice partitioning of a picture, where the picture is divided into 24 tiles (6 tile columns and 4 tile rows) and 9 rectangular slices.

Section headings are used in the present document for ease of understanding and do not limit the applicability of techniques and embodiments disclosed in each section only to that section. Furthermore, H.266 terminology is used in some description only for ease of understanding and not for limiting scope of the disclosed techniques. As such, the techniques described herein are applicable to other video codec protocols and designs also. In the present document, editing changes are shown to text by open and close double brackets (e.g., [[ ]]) indicating cancelled text in between the double brackets, and boldface italic text indicating added text, with respect to the current draft of the VVC specification.

1. Summary

This document is related to video coding technologies. Specifically, it is about support of subpictures, LMCS, and AMVR. The aspects on subpictures include the derivation of the number of tile rows and columns included in one subpicture as well as the derivation of the list of raster scan CTU addresses for CTUs included in a slice when each subpicture contains only one slice. The aspects on LMCS are about signalling of enabling of LMCS on different levels. The aspects on AMVR are about the semantics of sps_affine_amvr_enabled_flag. The ideas may be applied individually or in various combination, to any video coding standard or non-standard video codec that supports single-layer and/or multi-layer video coding, e.g., the being-developed Versatile Video Coding (VVC).

2. Abbreviations

ALF Adaptive Loop Filter
AMVR Adaptive Motion Vector difference Resolution
APS Adaptation Parameter Set
AU Access Unit
AUD Access Unit Delimiter
AVC Advanced Video Coding
CLVS Coded Layer Video Sequence
CPB Coded Picture Buffer
CRA Clean Random Access
CTU Coding Tree Unit
CVS Coded Video Sequence
DPB Decoded Picture Buffer
DPS Decoding Parameter Set
EOB End Of Bitstream
EOS End Of Sequence
GDR Gradual Decoding Refresh
HEVC High Efficiency Video Coding
HRD Hypothetical Reference Decoder
IDR Instantaneous Decoding Refresh
JEM Joint Exploration Model
LMCS Luma Mapping with Chroma Scaling
MCTS Motion-Constrained Tile Sets
NAL Network Abstraction Layer
OLS Output Layer Set
PH Picture Header
PPS Picture Parameter Set
PTL Profile, Tier and Level PU Picture Unit
RBSP Raw Byte Sequence Payload
SEI Supplemental Enhancement Information
SPS Sequence Parameter Set
SVC Scalable Video Coding
VCL Video Coding Layer
VPS Video Parameter Set
VTM VVC Test Model
VUI Video Usability Information
VVC Versatile Video Coding

3. Initial Discussion

Video coding standards have evolved primarily through the development of the well-known International Telecommunication Union (ITU) Telecommunication Standardization Sector (ITU-T) and International Organization for Standardization (ISO)/International Electrotechnical Commission (IEC) standards. The ITU-T produced H.261 and H.263, ISO/IEC produced Moving Picture Experts Group (MPEG)-1 and MPEG-4 Visual, and the two organizations jointly produced the H.262/MPEG-2 Video and H.264/MPEG-4 Advanced Video Coding (AVC) and H.265/High Efficiency Video Coding (HEVC) standards. Since H.262, the video coding standards are based on the hybrid video coding structure wherein temporal prediction plus transform coding are utilized. To explore the future video coding technologies beyond HEVC, the Joint Video Exploration Team (WET) was founded by Video Coding Experts Group (VCEG) and MPEG jointly in 2015. Since then, many new methods have been adopted by JVET and put into the reference software named Joint Exploration Model (JEM). The JVET meeting is concurrently held once every quarter, and the new coding standard is targeting at 50% bitrate reduction as compared to HEVC. The new video coding standard was officially named as Versatile Video Coding (VVC) in the April 2018 JVET meeting, and the first version of VVC test model (VTM) was released at that time. As there are continuous effort contributing to VVC standardization, new coding techniques are being adopted to the VVC standard in every JVET meeting. The VVC working draft and test model VTM are then updated after every meeting. The VVC project is now aiming for technical completion (FDIS) at the July 2020 meeting.

3.1. Picture Partitioning Schemes in HEVC

HEVC includes four different picture partitioning schemes, namely regular slices, dependent slices, tiles, and Wavefront Parallel Processing (WPP), which may be applied for Maximum Transfer Unit (MTU) size matching, parallel processing, and reduced end-to-end delay.

Regular slices are similar as in H.264/AVC. Each regular slice is encapsulated in its own NAL unit, and in-picture prediction (intra sample prediction, motion information prediction, coding mode prediction) and entropy coding dependency across slice boundaries are disabled. Thus a regular slice can be reconstructed independently from other regular slices within the same picture (though there may still have interdependencies due to loop filtering operations).

The regular slice is the only tool that can be used for parallelization that is also available, in virtually identical form, in H.264/AVC. Regular slices based parallelization does not require much inter-processor or inter-core communication (except for inter-processor or inter-core data sharing for motion compensation when decoding a predictively coded picture, which is typically much heavier than inter-processor or inter-core data sharing due to in-picture prediction). However, for the same reason, the use of regular slices can incur substantial coding overhead due to the bit cost of the slice header and due to the lack of prediction across the slice boundaries. Further, regular slices (in contrast to the other tools mentioned below) also serve as the key mechanism for bitstream partitioning to match MTU size requirements, due to the in-picture independence of regular slices and that each regular slice is encapsulated in its own NAL unit. In many cases, the goal of parallelization and the goal of MTU size matching place contradicting demands to the slice layout in a picture. The realization of this situation led to the development of the parallelization tools mentioned below.

Dependent slices have short slice headers and allow partitioning of the bitstream at treeblock boundaries without breaking any in-picture prediction. Basically, dependent slices provide fragmentation of regular slices into multiple NAL units, to provide reduced end-to-end delay by allowing a part of a regular slice to be sent out before the encoding of the entire regular slice is finished.

In WPP, the picture is partitioned into single rows of coding tree blocks (CTBs). Entropy decoding and prediction are allowed to use data from CTBs in other partitions. Parallel processing is possible through parallel decoding of CTB rows, where the start of the decoding of a CTB row is delayed by two CTBs, so to ensure that data related to a CTB above and to the right of the subject CTB is available before the subject CTB is being decoded. Using this staggered start (which appears like a wavefront when represented graphically), parallelization is possible with up to as many processors/cores as the picture contains CTB rows. Because in-picture prediction between neighboring treeblock rows within a picture is permitted, the required inter-processor/inter-core communication to enable in-picture prediction can be substantial. The WPP partitioning does not result in the production of additional NAL units compared to when it is not applied, thus WPP is not a tool for MTU size matching. However, if MTU size matching is required, regular slices can be used with WPP, with certain coding overhead.

Tiles define horizontal and vertical boundaries that partition a picture into tile columns and rows. Tile column runs from the top of a picture to the bottom of the picture. Likewise, tile row runs from the left of the picture to the right of the picture. The number of tiles in a picture can be derived simply as number of tile columns multiply by number of tile rows.

The scan order of CTBs is changed to be local within a tile (in the order of a CTB raster scan of a tile), before decoding the top-left CTB of the next tile in the order of tile raster scan of a picture. Similar to regular slices, tiles break in-picture prediction dependencies as well as entropy decoding dependencies. However, they do not need to be included into individual NAL units (same as WPP in this regard); hence tiles may not be used for MTU size matching. Each tile can be processed by one processor/core, and the inter-processor/inter-core communication required for in-picture prediction between processing units decoding neighboring tiles is limited to conveying the shared slice header in cases where a slice is spanning more than one tile, and loop filtering related sharing of reconstructed samples and metadata. When more than one tile or WPP segment is included in a slice, the entry point byte offset for each tile or WPP segment other than the first one in the slice is signalled in the slice header.

For simplicity, restrictions on the application of the four different picture partitioning schemes have been specified in HEVC. A given coded video sequence may not include both tiles and wavefronts for most of the profiles specified in HEVC. For each slice and tile, either or both of the following conditions may be fulfilled: 1) all coded treeblocks in a slice belong to the same tile; 2) all coded treeblocks in a tile belong to the same slice. Finally, a wavefront segment contains exactly one CTB row, and when WPP is in use, if a slice starts within a CTB row, it may end in the same CTB row.

A recent amendment to HEVC is specified in the JCT-VC output document JCTVC-AC1005, J. Boyce, A. Ramasubramonian, R. Skupin, G. J. Sullivan, A. Tourapis, Y.-K. Wang (editors), "HEVC Additional Supplemental Enhancement Information (Draft 4)," Oct. 24, 2017, publicly available herein: http://phenix.int-evry.fr/jct/doc_end_user/documents/29_Macau/wg11/JCTVC-AC1005-v2.zip. With this amendment included, HEVC specifies three MCTS-related SEI messages, namely temporal MCTSs SEI message, MCTSs extraction information set SEI message, and MCTSs extraction information nesting SEI message.

The temporal MCTSs SEI message indicates existence of MCTSs in the bitstream and signals the MCTSs. For each MCTS, motion vectors are restricted to point to full-sample locations inside the MCTS and to fractional-sample locations that require only full-sample locations inside the MCTS for interpolation, and the usage of motion vector candidates for temporal motion vector prediction derived from blocks outside the MCTS is disallowed. This way, each MCTS may be independently decoded without the existence of tiles not included in the MCTS.

The MCTSs extraction information sets SEI message provides supplemental information that can be used in the MCTS sub-bitstream extraction (specified as part of the semantics of the SEI message) to generate a conforming bitstream for a MCTS set. The information consists of a number of extraction information sets, each defining a number of MCTS sets and containing RBSP bytes of the replacement VPSs, SPSs, and PPSs to be used during the MCTS sub-bitstream extraction process. When extracting a sub-bitstream according to the MCTS sub-bitstream extraction process, parameter sets (VPSs, SPSs, and PPSs) need to be rewritten or replaced, slice headers need to be slightly updated because one or all of the slice address related syntax elements (including first_slice_segment_in_pic_flag and slice_segment_address) typically would need to have different values.

3.2. Partitioning of Pictures in VVC

In VVC, A picture is divided into one or more tile rows and one or more tile columns. A tile is a sequence of CTUs that covers a rectangular region of a picture. The CTUs in a tile are scanned in raster scan order within that tile.

A slice consists of an integer number of complete tiles or an integer number of consecutive complete CTU rows within a tile of a picture.

Two modes of slices are supported, namely the raster scan slice mode and the rectangular slice mode. In the raster scan slice mode, a slice contains a sequence of complete tiles in a tile raster scan of a picture. In the rectangular slice mode, a slice contains either a number of complete tiles that collectively form a rectangular region of the picture or a number of consecutive complete CTU rows of one tile that collectively form a rectangular region of the picture. Tiles within a rectangular slice are scanned in tile raster scan order within the rectangular region corresponding to that slice.

A subpicture contains one or more slices that collectively cover a rectangular region of a picture.

Figure 1:
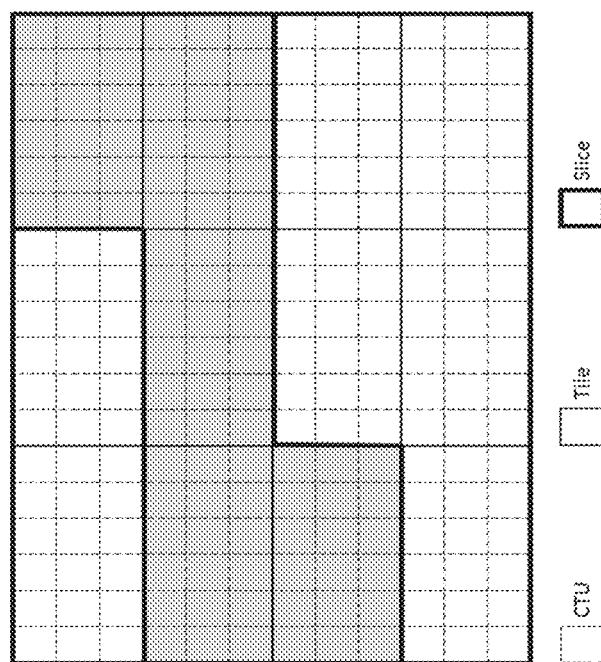
FIG. 1 shows an example of raster scan slice partitioning of a picture, where the picture is divided into 12 tiles and 3 raster scan slices.

FIG. 1 shows an example of raster scan slice partitioning of a picture, where the picture is divided into 12 tiles and 3 raster scan slices.

FIG. 2 shows an example of rectangular slice partitioning of a picture, where the picture is divided into 24 tiles (6 tile columns and 4 tile rows) and 9 rectangular slices.

Figure 3:
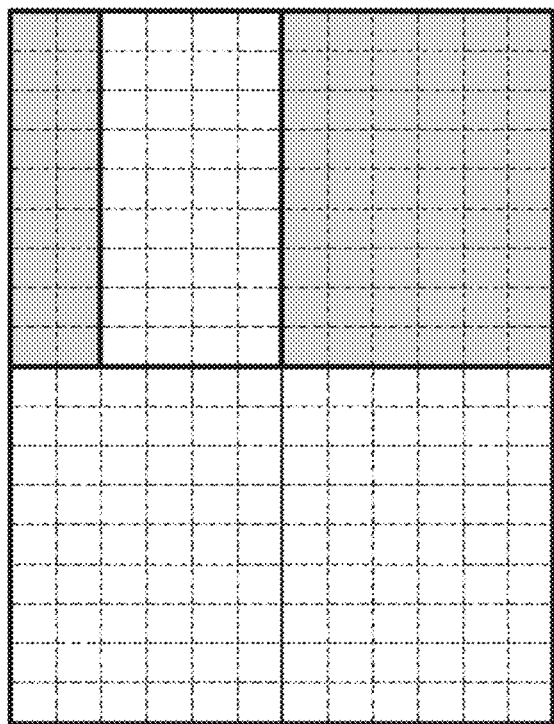
FIG. 3 shows an example of a picture partitioned into tiles and rectangular slices, where the picture is divided into 4 tiles (2 tile columns and 2 tile rows) and 4 rectangular slices.

FIG. 3 shows an example of a picture partitioned into tiles and rectangular slices, where the picture is divided into 4 tiles (2 tile columns and 2 tile rows) and 4 rectangular slices.

Figure 4:
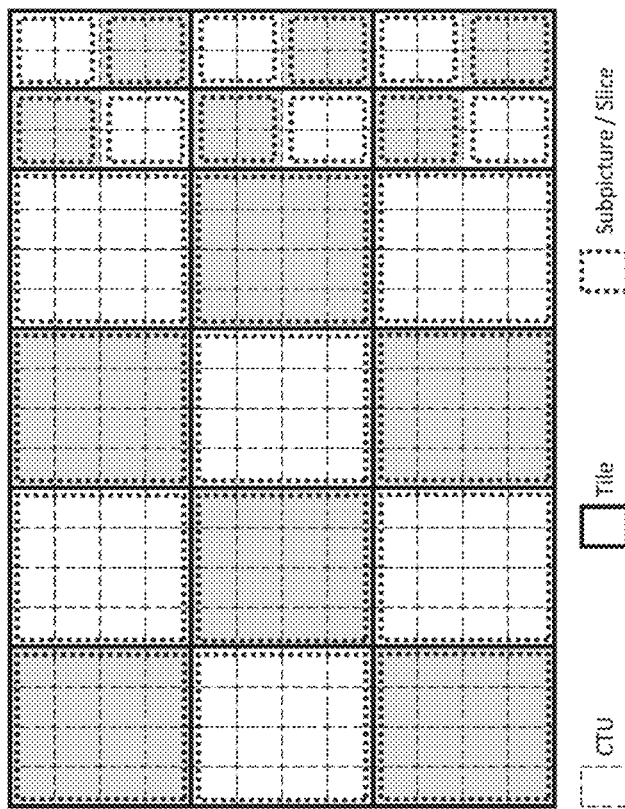
FIG. 4 shows a picture that is partitioned into 15 tiles, 24 slices and 24 subpictures.

FIG. 4 shows an example of subpicture partitioning of a picture, where a picture is partitioned into 18 tiles, 12 on the left-hand side each covering one slice of 4 by 4 CTUs and 6 tiles on the right-hand side each covering 2 vertically-stacked slices of 2 by 2 CTUs, altogether resulting in 24 slices and 24 subpictures of varying dimensions (each slice is a subpicture).

3.3. Signalling of SPS/PPS/Picture Header/Slice Header in VVC (as JVET-Q2001-vC)

7.3.2.3 Sequence Parameter Set RBSP Syntax

|  | Descriptor |
|---|---|
| seq_parameter_set_rbsp( ) { |  |
|   sps_seq_parameter_set_id | u(4) |
|   sps_video_parameter_set_id | u(4) |
|   sps_max_sublayers_minus1 | u(3) |
|   sps_reserved_zero_4bits | u(4) |
|   sps_ptl_dpb_hrd_params_present_flag | u(1) |
|   if( sps_ptl_dpb_hrd_params_present_flag ) |  |
|     profile_tier_level( 1, sps_max_sublayers_minus1 ) |  |
|   gdr_enabled_flag | u(1) |
|   chroma_format_idc | u(2) |
|   if( chroma_format_idc = = 3 ) |  |
|     separate_colour_plane_flag | u(1) |
|   res_change_in_clvs_allowed_flag | u(1) |
|   pic_width_max_in_luma_samples | ue(v) |
|   pic_height_max_in_luma_samples | ue(v) |
|   sps_conformance_window_flag | u(1) |
|   if( sps_conformance_window_flag ) { |  |
|     sps_conf_win_left_offset | ue(v) |
|     sps_conf_win_right_offset | ue(v) |
|     sps_conf_win_top_offset | ue(v) |
|     sps_conf_win_bottom_offset | ue(v) |
|   } |  |

-continued

| | Descriptor |
|---|---|
| sps_log2_ctu_size_minus5 | u(2) |
| subpic_info_present_flag | u(1) |
| if( subpic_info_present_flag ) { | |
|   sps_num_subpics_minus1 | ue(v) |
|   sps_independent_subpics_flag | u(1) |
|   for( i = 0; sps_num_subpics_minus1 > 0 && i <= sps_num_subpics_minus1; i++ ) { | |
|     if( i > 0 && pic_width_max_in_luma_samples > CtbSizeY ) | |
|       subpic_ctu_top_left_x[ i ] | u(v) |
|     if( i > 0 && pic_height_max_in_luma_samples > CtbSizeY ) { | |
|       subpic_ctu_top_left_y[ i ] | u(v) |
|     if( i < sps_num_subpics_minus1 && | |
|       pic_width_max_in_luma_samples > CtbSizeY ) | |
|       subpic_width_minus1[ i ] | u(v) |
|     if( i < sps_num_subpics_minus1 && | |
|       pic_height_max_in_luma_samples > CtbSizeY ) | |
|       subpic_height_minus1[ i ] | u(v) |
|     if(! sps_independent_subpics_flag) { | |
|       subpic_treated_as_pic_flag[ i ] | u(1) |
|       loop_filter_across_subpic_enabled_flag[ i ] | u(1) |
|     } | |
|   } | |
|   sps_subpic_id_len_minus1 | ue(v) |
|   subpic_id_mapping_explicitly_signalled_flag | u(1) |
|   if( subpic_id_mapping_explicitly_signalled_flag ) { | |
|     subpic_id_mapping_in_sps_flag | u(1) |
|     if( subpic_id_mapping_in_sps_flag ) | |
|       for( i = 0; i <= sps_num_subpics_minus1; i++ ) | |
|         sps_subpic_id[ i ] | u(v) |
|   } | |
| } | |
| bit_depth_minus8 | ue(v) |
| sps_entropy_coding_sync_enabled_flag | u(1) |
| if( sps_entropy_coding_sync_enabled_flag ) | |
|   sps_wpp_entry_point_offsets_present_flag | u(1) |
| sps_weighted_pred_flag | u(1) |
| sps_weighted_bipred_flag | u(1) |
| log2_max_pic_order_cnt_lsb_minus4 | u(4) |
| sps_poc_msb_flag | u(1) |
| if( sps_poc_msb_flag ) | |
|   poc_msb_len_minus1 | ue(v) |
| num_extra_ph_bits_bytes | u(2) |
|   extra_ph_bits_struct( num_extra_ph_bits_bytes ) | |
| num_extra_sh_bits_bytes | u(2) |
|   extra_sh_bits_struct( num_extra_sh_bits_bytes ) | |
| if( sps_max_sublayers_minus1 > 0 ) | |
|   sps_sublayer_dpb_params_flag | u(1) |
| if( sps_ptl_dpb_hrd_params_present_flag ) | |
|   dpb_parameters( sps_max_sublayers_minus1, sps_sublayer_dpb_params_flag ) | |
| long_term_ref_pics_flag | u(1) |
| inter_layer_ref_pics_present_flag | u(1) |
| sps_idr_rpl_present_flag | u(1) |
| rpl1_same_as_rpl0_flag | u(1) |
| for( i = 0; i < !rpl1_same_as_rpl0_flag ? 2 : 1; i++ ) { | |
|   num_ref_pic_lists_in_sps[ i ] | ue(v) |
|   for( j = 0; j < num_ref_pic_lists_in_sps[ i ]; j++) | |
|     ref_pic_list_struct( i, j ) | |
| } | |
| if( ChromaArrayType != 0 ) | |
|   qtbtt_dual_tree_intra_flag | u(1) |
| log2_min_luma_coding_block_size_minus2 | ue(v) |
| partition_constraints_override_enabled_flag | u(1) |
| sps_log2_diff_min_qt_min_cb_intra_slice_luma | ue(v) |
| sps_max_mtt_hierarchy_depth_intra_slice_luma | ue(v) |
| if( sps_max_mtt_hierarchy_depth_intra_slice_luma != 0 ) { | |
|   sps_log2_diff_max_bt_min_qt_intra_slice_luma | ue(v) |
|   sps_log2_diff_max_tt_min_qt_intra_slice_luma | ue(v) |
| } | |
| sps_log2_diff_min_qt_min_cb_inter_slice | ue(v) |
| sps_max_mtt_hierarchy_depth_inter_slice | ue(v) |
| if( sps_max_mtt_hierarchy_depth_inter_slice != 0 ) { | |
|   sps_log2_diff_max_bt_min_qt_inter_slice | ue(v) |
|   sps_log2_diff_max_tt_min_qt_inter_slice | ue(v) |
| } | |
| if( qtbtt_dual_tree_intra_flag ) { | |
|   sps_log2_diff_min_qt_min_cb_intra_slice_chroma | ue(v) |

-continued

| | Descriptor |
|---|---|
|     sps_max_mtt_hierarchy_depth_intra_slice_chroma | ue(v) |
|     if( sps_max_mtt_hierarchy_depth_intra_slice_chroma != 0 ) { | |
|       sps_log2_diff_max_bt_min_qt_intra_slice_chroma | ue(v) |
|       sps_log2_diff_max_tt_min_qt_intra_slice_chroma | ue(v) |
|     } | |
| } | |
| sps_max_luma_transform_size_64_flag | u(1) |
| if( ChromaArrayType != 0 ) { | |
|   sps_joint_cbcr_enabled_flag | u(1) |
|   same_qp_table_for_chroma | u(1) |
|   numQpTables = same_qp_table_for_chroma ? 1 : ( sps_joint_cbcr_enabled_flag ? 3 : 2 ) | |
|   for( i = 0; i < numQpTables; i++ ) { | |
|     qp_table_start_minus26[ i ] | se(v) |
|     num_points_in_qp_table_minus1[ i ] | ue(v) |
|     for( j = 0; j <= num_points_in_qp_table_minus1[ i ]; j++ ) { | |
|       delta_qp_in_val_minus1[ i ][ j ] | ue(v) |
|       delta_qp_diff_val[ i ][ j ] | ue(v) |
|     } | |
|   } | |
| } | |
| sps_sao_enabled_flag | u(1) |
| sps_alf_enabled_flag | u(1) |
| if( sps_alf_enabled_flag && ChromaArrayType != 0 ) | |
|   sps_ccalf_enabled_flag | u(1) |
| sps_transform_skip_enabled_flag | u(1) |
| if( sps_transform_skip_enabled_flag ) { | |
|   log2_transform_skip_max_size_minus2 | ue(v) |
|   sps_bdpcm_enabled_flag | u(1) |
| } | |
| sps_ref_wraparound_enabled_flag | u(1) |
| sps_temporal_mvp_enabled_flag | u(1) |
| if( sps_temporal_mvp_enabled_flag ) | |
|   sps_sbtmvp_enabled_flag | u(1) |
| sps_amvr_enabled_flag | u(1) |
| sps_bdof_enabled_flag | u(1) |
| if( sps_bdof_enabled_flag ) | |
|   sps_bdof_pic_present_flag | u(1) |
| sps_smvd_enabled_flag | u(1) |
| sps_dmvr_enabled_flag | u(1) |
| if( sps_dmvr_enabled_flag ) | |
|   sps_dmvr_pic_present_flag | u(1) |
| sps_mmvd_enabled_flag | u(1) |
| sps_isp_enabled_flag | u(1) |
| sps_mrl_enabled_flag | u(1) |
| sps_mip_enabled_flag | u(1) |
| if( ChromaArrayType != 0 ) | |
|   sps_cclm_enabled_flag | u(1) |
| if( chroma_format_idc == 1 ) { | |
|   sps_chroma_horizontal_collocated_flag | u(1) |
|   sps_chroma_vertical_collocated_flag | u(1) |
| } | |
| sps_mts_enabled_flag | u(1) |
| if( sps_mts_enabled_flag ) { | |
|   sps_explicit_mts_intra_enabled_flag | u(1) |
|   sps_explicit_mts_inter_enabled_flag | u(1) |
| } | |
| six_minus_max_num_merge_cand | ue(v) |
| sps_sbt_enabled_flag | u(1) |
| sps_affine_enabled_flag | u(1) |
| if( sps_affine_enabled_flag ) { | |
|   five_minus_max_num_subblock_merge_cand | ue(v) |
|   sps_affine_type_flag | u(1) |
|   if( sps_amvr_enabled_flag ) | |
|     sps_affine_amvr_enabled_flag | u(1) |
|   sps_affine_prof_enabled_flag | u(1) |
|   if( sps_affine_prof_enabled_flag ) | |
|     sps_prof_pic_present_flag | u(1) |
| } | |
| sps_palette_enabled_flag | u(1) |
| if( ChromaArrayType == 3 && ! sps_max_luma_transform_size_64_flag ) | |
|   sps_act_enabled_flag | u(1) |
| if( sps_transform_skip_enabled_flag || sps_palette_enabled_flag ) | |
|   min_qp_prime_ts_minus4 | ue(v) |
| sps_bcw_enabled_flag | u(1) |
| sps_ibc_enabled_flag | u(1) |

-continued

| | Descriptor |
|---|---|
| if( sps_ibc_enabled_flag ) | |
|   six_minus_max_num_ibc_merge_cand | ue(v) |
| sps_ciip_enabled_flag | u(1) |
| if( sps_mmvd_enabled_flag ) | |
|   sps_fpel_mmvd_enabled_flag | u(1) |
| if( MaxNumMergeCand >= 2 ) { | |
|   sps_gpm_enabled_flag | u(1) |
|   if( sps_gpm_enabled_flag && MaxNumMergeCand >= 3 ) | |
|     max_num_merge_cand_minus_max_num_gpm_cand | ue(v) |
| } | |
| sps_lmcs_enabled_flag | u(1) |
| sps_lfnst_enabled_flag | u(1) |
| sps_ladf_enabled_flag | u(1) |
| if( sps_ladf_enabled_flag ) { | |
|   sps_num_ladf_intervals_minus2 | u(2) |
|   sps_ladf_lowest_interval_qp_offset | se(v) |
|   for( i = 0; i < sps_num_ladf_intervals_minus2 + 1; i++ ) { | |
|     sps_ladf_qp_offset[ i ] | se(v) |
|     sps_ladf_delta_threshold_minus1[ i ] | ue(v) |
|   } | |
| } | |
| log2_parallel_merge_level_minus2 | ue(v) |
| sps_scaling_list_enabled_flag | u(1) |
| sps_dep_quant_enabled_flag | u(1) |
| if( !sps_dep_quant_enabled_flag ) | |
|   sps_sign_data_hiding_enabled_flag | u(1) |
| sps_virtual_boundaries_enabled_flag | u(1) |
| if( sps_virtual_boundaries_enabled_flag ) { | |
|   sps_virtual_boundaries_present_flag | u(1) |
|   if( sps_virtual_boundaries_present_flag ) { | |
|     sps_num_ver_virtual_boundaries | u(2) |
|     for( i = 0; i < sps_num_ver_virtual_boundaries; i++ ) | |
|       sps_virtual_boundaries_pos_x[ i ] | u(13) |
|     sps_num_hor_virtual_boundaries | u(2) |
|     for( i = 0; i < sps_num_hor_virtual_boundaries; i++ ) | |
|       sps_virtual_boundaries_pos_y[ i ] | u(13) |
|   } | |
| } | |
| if( sps_ptl_dpb_hrd_params_present_flag ) { | |
|   sps_general_hrd_params_present_flag | u(1) |
|   if( sps_general_hrd_params_present_flag ) { | |
|     general_hrd_parameters( ) | |
|     if( sps_max_sublayers_minus1 > 0 ) | |
|       sps_sublayer_cpb_params_present_flag | u(1) |
|     firstSubLayer = sps_sublayer_cpb_params_present_flag ? 0 : | |
|       sps_max_sublayers_minus1 | |
|     ols_hrd_parameters( firstSubLayer, sps_max_sublayers_minus1 ) | |
|   } | |
| } | |
| field_seq_flag | u(1) |
|   vui_parameters_present_flag | u(1) |
| if( vui_parameters_present_flag ) | |
|   vui_parameters( ) /* Specified in ITu-T H.SEI | ISO/IEC 23002-7 */ | |
| sps_extension_flag | u(1) |
| if( sps_extension_flag ) | |
|   while( more_rbsp_data( ) ) | |
|     sps_extension_data_flag | u(1) |
| rbsp_trailing_bits( ) | |
| } | |

7.3.2.4 Picture Parameter Set RBSP Syntax

| | Descriptor |
|---|---|
| pic_parameter_set_rbsp( ) { | ue(v) |
|   pps_pic_parameter_set_id | |
|   pps_seq_parameter_set_id | u(4) |
|   mixed_nalu_types_in_pic_flag | u(1) |
|   pic_width_in_luma_samples | ue(v) |
|   pic_height_in_luma_samples | ue(v) |
|   pps_conformance_window_flag | u(1) |
|   if( pps_conformance_window_flag ) { | |
|     pps_conf_win_left_offset | ue(v) |
|     pps_conf_win_right_offset | ue(v) |

| | Descriptor |
|---|---|
|     pps_conf_win_top_offset | ue(v) |
|     pps_conf_win_bottom_offset | ue(v) |
| } | |
| scaling_window_explicit_signalling_flag | u(1) |
| if( scaling_window_explicit_signalling_flag ) { | |
|     scaling_win_left_offset | ue(v) |
|     scaling_win_right_offset | ue(v) |
|     scaling_win_top_offset | ue(v) |
|     scaling_win_bottom_offset | ue(v) |
| } | |
| output_flag_present_flag | u(1) |
| subpic_id_mapping_in_pps_flag | u(1) |
| if( subpic_id_mapping_in_pps_flag ) { | |
|     pps_num_subpics_minus1 | ue(v) |
|     pps_subpic_id_len_minus1 | ue(v) |
|     for( i = 0; i <= pps_num_subpic_minus1; i++ ) | |
|       pps_subpic_id[ i ] | u(v) |
| } | |
| no_pic_partition_flag | u(1) |
| if( !no_pic_partition_flag ) { | |
|     pps_log2_ctu_size_minus5 | u(2) |
|     num_exp_tile_columns_minus1 | ue(v) |
|     num_exp_tile_rows_minus1 | ue(v) |
|     for( i = 0; i <= num_exp_tile_columns_minus1; i++ ) | |
|       tile_column_width_minus1[ i ] | ue(v) |
|     for( i = 0; i <= num_exp_tile_rows_minus1; i++ ) | |
|       tile_row_height_minus1[ i ] | ue(v) |
|     if( NumTilesInPic > 1 ) | |
|       rect_slice_flag | u(1) |
|     if( rect_slice_flag ) | |
|       single_slice_per_subpic_flag | u(1) |
|     if( rect_slice_flag && !single_slice_per_subpic_flag ) { | |
|       num_slices_in_pic_minus1 | ue(v) |
|       if( num_slices_in_pic_minus1 > 0 ) | |
|         tile_idx_delta_present_flag | u(1) |
|       for( i = 0; i < num_slices_in_pic_minus1; i++ ) { | |
|         if( NumTileColumns > 1 ) | |
|           slice_width_in_tiles_minus1[ i ] | ue(v) |
|         if( NumTileRows > 1 && | |
|           ( tile_idx_delta_present_flag || tileIdx % NumTileColumns == 0 ) ) | |
|           slice_height_in_tiles_minus1[ i ] | ue(v) |
|         if( slice_width_in_tiles_minus1[ i ] == 0 && | |
|           slice_height_in_tiles_minus1[ i ] == 0 && | |
|           RowHeight[ SliceTopLeftTileIdx[ i ] / NumTileColumns ] > 1 ) { | |
|           num_exp_slices_in_tile[ i ] | ue(v) |
|           numExpSlicesInTile = num_exp_slices_in_tile[ i ] | |
|           for( j = 0; j < numExpSlicesInTile; j++ ) | |
|             exp_slice_height_in_ctus_minus1[ j ] | ue(v) |
|           i += NumSlicesInTile[ i ] | |
|         } | |
|         if( tile_idx_delta_present_flag && i < num_slices_in_pic_minus1 ) | |
|           tile_idx_delta[ i ] | se(v) |
|       } | |
|     } | |
|     loop_filter_across_tiles_enabled_flag | u(1) |
|     loop_filter_across_slices_enabled_flag | u(1) |
| } | |
| cabac_init_present_flag | u(1) |
| for( i = 0; i < 2; i++ ) | |
|     num_ref_idx_default_active_minus1[ i ] | ue(v) |
| rpl1_idx_present_flag | u(1) |
| init_qp_minus26 | se(v) |
| cu_qp_delta_enabled_flag | u(1) |
| pps_chroma_tool_offsets_present_flag | u(1) |
| if( pps_chroma_tool_offsets_present_flag ) { | |
|     pps_cb_qp_offset | se(v) |
|     pps_cr_qp_offset | se(v) |
|     pps_joint_cbcr_qp_offset_present_flag | u(1) |
|     if( pps_joint_cbcr_qp_offset_present_flag ) | |
|       pps_joint_cbcr_qp_offset_value | se(v) |
|     pps_slice_chroma_qp_offsets_present_flag | u(1) |
|     pps_cu_chroma_qp_offset_list_enabled_flag | u(1) |
| } | |
| if( pps_cu_chroma_qp_offset_list_enabled_flag ) { | |
|     chroma_qp_offset_list_len_minus1 | ue(v) |

|  | Descriptor |
|---|---|
|     for( i = 0; i <= chroma_qp_offset_list_len_minus1; i++ ) { | |
|       cb_qp_offset_list[ i ] | se(v) |
|       cr_qp_offset_list[ i ] | se(v) |
|       if( pps_joint_cbcr_qp_offset_present_flag ) | |
|         joint_cbcr_qp_offset_list[ i ] | se(v) |
|     } | |
| } | |
| pps_weighted_pred_flag | u(1) |
| pps_weighted_bipred_flag | u(1) |
| deblocking_filter_control_present_flag | u(1) |
| if( deblocking_filter_control_present_flag ) { | |
|   deblocking_filter_override_enabled_flag | u(1) |
|   pps_deblocking_filter_disabled_flag | u(1) |
|   if( !pps_deblocking_filter_disabled_flag ) { | |
|     pps_beta_offset_div2 | se(v) |
|     pps_tc_offset_div2 | se(v) |
|     pps_cb_beta_offset_div2 | se(v) |
|     pps_cb_tc_offset_div2 | se(v) |
|     pps_cr_beta_offset_div2 | se(v) |
|     pps_cr_tc_offset_div2 | se(v) |
|   } | |
| } | |
| rpl_info_in_ph_flag | u(1) |
| if( deblocking_filter_override_enabled_flag ) | |
|   dbf_info_in_ph_flag | u(1) |
| sao_info_in_ph_flag | u(1) |
| alf_info_in_ph_flag | u(1) |
| if( ( pps_weighted_pred_flagpps_weighted_bipred_flag ) && rpl_present_in_ph_flag ) | |
|   wp_info_in_ph_flag | u(1) |
| qp_delta_info_in_ph_flag | u(1) |
| pps_ref_wraparound_enabled_flag | u(1) |
| if( pps_ref_wraparound_enabled_flag ) | |
|   pps_ref_wraparound_offset | ue(v) |
| picture_header_extension_present_flag | u(1) |
| slice_header_extension_present_flag | u(1) |
| pps_extension_flag | u(1) |
| if( pps_extension_flag ) | |
|   while( more_rbsp_data( ) ) | |
|     pps_extension_data_flag | u(1) |
| rbsp_trailing_bits( ) | |
| } | |

7.3.2.7 Picture Header Structure Syntax

|  | Descriptor |
|---|---|
| picture_header_structure( ) { | |
|   gdr_or_irap_pic_flag | u(1) |
|   if( gdr_or_irap_pic_flag ) | |
|     gdr_pic_flag | u(1) |
|   ph_inter_slice_allowed_flag | u(1) |
|   if( ph_inter_slice_allowed_flag ) | |
|     ph_intra_slice_allowed_flag | u(1) |
|   non_reference_picture_flag | u(1) |
|   ph_pic_parameter_set_id | ue(v) |
|   ph_pic_order_cnt_lsb | u(v) |
|   if( gdr_or_irap_pic_flag ) | |
|     no_output_of_prior_pics_flag | u(1) |
|   if( gdr_pic_flag ) | |
|     recovery_poc_cnt | ue(v) |
|   for( i = 0; i < NumExtraPhBits; i++ ) | |
|     ph_extra_bit[ i ] | u(1) |
|   if( sps_poc_msb_flag ) { | |
|     ph_poc_msb_present_flag | u(1) |
|     if( ph_poc_msb_present_flag ) | |
|       poc_msb_val | u(v) |
|   } | |
|   if( sps_alf_enabled_flag && alf_info_in_ph_flag ) { | |
|     ph_alf_enabled_flag | u(1) |
|     if( ph_alf_enabled_flag ) { | |
|       ph_num_alf_aps_ids_luma | u(3) |
|       for( i = 0; i < ph_num_alf_aps_ids_luma; i++ ) | |
|         ph_alf_aps_id_luma[ i ] | u(3) |

-continued

| | Descriptor |
|---|---|
|     if( ChromaArrayType != 0 ) | |
|       ph_alf_chroma_idc | u(2) |
|     if( ph_alf_chroma_idc > 0 ) | |
|       ph_alf_aps_id_chroma | u(3) |
|     if( sps_ccalf_enabled_flag ) { | |
|       ph_cc_alf_cb_enabled_flag | u(1) |
|       if( ph_cc_alf_cb_enabled_flag ) | |
|         ph_cc_alf_cb_aps_id | u(3) |
|       ph_cc_alf_cr_enabled_flag | u(1) |
|       if( ph_cc_alf_cr_enabled_flag ) | |
|         ph_cc_alf_cr_aps_id | u(3) |
|     } | |
|   } | |
| } | |
| if( sps_lmcs_enabled_flag ) { | |
|   ph_lmcs_enabled_flag | u(1) |
|   if( ph_lmcs_enabled_flag ) { | |
|     ph_lmcs_aps_id | u(2) |
|     if( ChromaArrayType != 0 ) | |
|       ph_chroma_residual_scale_flag | u(1) |
|   } | |
| } | |
| if( sps_scaling_list_enabled_flag ) { | |
|   ph_scaling_list_present_flag | u(1) |
|   if( ph_scaling_list_present_flag ) | |
|     ph_scaling_list_aps_id | u(3) |
| } | |
| if(    sps_virtual_boundaries_enabled_flag    && !sps_virtual_boundaries_present_flag) { | |
|   ph_virtual_boundaries_present_flag | u(1) |
|   if( ph_virtual_boundaries_present_flag ) { | |
|     ph_num_ver_virtual_boundaries | u(2) |
|     for( i = 0; i < ph_num_ver_virtual_boundaries; i++ ) | |
|       ph_virtual_boundaries_pos_x[ i ] | u(13) |
|     ph_num_hor_virtual_boundaries | u(2) |
|     for( i = 0; i < ph_num_hor_virtual_boundaries; i++ ) | |
|       ph_virtual_boundaries_pos_y[ i ] | u(13) |
|   } | |
| } | |
| if( output_flag_present_flag ) | |
|   pic_output_flag | u(1) |
| if( rpl_info_in_ph_flag ) | |
|   ref_pic_lists( ) | |
| if( partition_constraints_override_enabled_flag ) | |
|   partition_constraints_override_flag | u(1) |
| if( ph_intra_slice_allowed_flag ) { | |
|   if( partition_constraints_override_flag ) { | |
|     ph_log2_diff_min_qt_min_cb_intra_slice_luma | ue(v) |
|     ph_max_mtt_hierarchy_depth_intra_slice_luma | ue(v) |
|     if( ph_max_mtt_hierarchy_depth_intra_slice_luma != 0 ) { | |
|       ph_log2_diff_max_bt_min_qt_intra_slice_luma | ue(v) |
|       ph_log2_diff_max_tt_min_qt_intra_slice_luma | ue(v) |
|     } | |
|     if( qtbtt_dual_tree_intra_flag ) { | |
|       ph_log2_diff_min_qt_min_cb_intra_slice_chroma | ue(v) |
|       ph_max_mtt_hierarchy_depth_intra_slice_chroma | ue(v) |
|       if( ph_max_mtt_hierarchy_depth_intra_slice_chroma != 0 ) { | |
|         ph_log2_diff_max_bt_min_qt_intra_slice_chroma | ue(v) |
|         ph_log2_diff_max_tt_min_qt_intra_slice_chroma | ue(v) |
|       } | |
|     } | |
|   } | |
|   if( cu_qp_delta_enabled_flag ) | |
|     ph_cu_qp_delta_subdiv_intra_slice | ue(v) |
|   if( pps_cu_chroma_qp_offset_lis_tenabled_flag ) | |
|     ph_cu_chroma_qp_offset_subdiv_intra_slice | ue(v) |
| } | |
| if( ph_inter_slice_allowed_flag) { | |
|   if( partition_constraints_override_flag ) { | |
|     ph_log2_diff_min_qt_min_cb_inter_slice | ue(v) |
|     ph_max_mtt_hierarchy_depth_inter_slice | ue(v) |
|     if( ph_max_mtt_hierarchy_depth_inter_slice != 0 ) { | |
|       ph_log2_diff_max_bt_min_qt_inter_slice | ue(v) |
|       ph_log2_diff_max_tt_min_qt_inter_slice | ue(v) |
|     } | |
|   } | |

|  | Descriptor |
|---|---|
| if( cu_qp_delta_enabled_flag ) | |
|   ph_cu_qp_delta_subdiv_inter_slice | ue(v) |
| if( pps_cu_chroma_qp_offset_list_enabled_flag ) | |
|   ph_cu_chroma_qp_offset_subdiv_inter_slice | ue(v) |
| if( sps_temporal_mvp_enabled_flag ) { | |
|   ph_temporal_mvp_enabled_flag | u(1) |
|   if( ph_temporal_mvp_enabled_flag && rpl_info_in_ph_flag ) { | |
|     ph_collocated_from_l0_flag | u(1) |
|     if( ( ph_collocated_from_l0_flag && | |
|       num_ref_entries[ 0 ][ RplsIdx[ 0 ] ] > 1 ) \|\| | |
|       ( !ph_collocated_from_l0_flag && | |
|       num_ref_entries[ 1 ][ RplsIdx[ 1 ] ] > 1 ) ) | |
|     ph_collocated_ref_idx | ue(v) |
|   } | |
| } | |
| mvd_l1_zero_flag | u(1) |
| if( sps_fpel_mmvd_enabled_flag ) | |
|   ph_fpel_mmvd_enabled_flag | u(1) |
| if( sps_bdof_pic_present_flag ) | |
|   ph_disable_bd_of_flag | u(1) |
| if( sps_dmvr_pic_present_flag ) | |
|   ph_disabled_mvr_flag | u(1) |
| if( sps_prof_pic_present_flag ) | |
|   ph_disable_prof_flag | u(1) |
| if( ( pps_weighted_pred_flag \|\| pps_weighted_bipred_flag ) && wp_info_in_ph_flag ) | |
|   pred_weight_table( ) | |
| } | |
| if( qp_delta_infb_in_ph_flag ) | |
|   ph_qp_delta | se(v) |
| if( sps_joint_cbcr_enabled_flag ) | |
|   ph_joint_cbcr_sign_flag | u(1) |
| if( sps_sao_enabled_flag && sao_info_in_ph_flag ) { | |
|   ph_sao_luma_enabled_flag | u(1) |
|   if( ChromaArrayType != 0 ) | |
|     ph_sao_chroma_enabled_flag | u(1) |
| } | |
| if( sps_dep_quant_enabled_flag) | |
|   ph_dep_quant_enabled_flag | u(1) |
| if( sps_sign_data_hiding_enabled_flag && !ph_dep_quant_enabled_flag ) | |
|   pic_sign_data_hiding_enabled_flag | u(1) |
| if( deblocking_filter_override_enabled_flag && dbf_info_in_ph_flag ) { | |
|   ph_deblocking_filter_override_flag | u(1) |
|   if( ph_deblocking_filter_override_flag ) { | |
|     ph_deblocking_filter_disabled_flag | u(1) |
|     if( !ph_deblocking_filter_disabled_flag ) { | |
|       ph_beta_offset_div2 | se(v) |
|       ph_tc_offset_div2 | se(v) |
|       ph_cb_beta_offset_div2 | se(v) |
|       ph_cb_tc_offset_div2 | se(v) |
|       ph_cr_beta_offset_div2 | se(v) |
|       ph_cr_tc_offset_div2 | se(v) |
|     } | |
|   } | |
| } | |
| if( picture_header_extension_present flag ) { | |
|   ph_extension_length | ue(v) |
|   for( i = 0; i < ph_extension_length; i++) | |
|     ph_extension_data_byte[ i ] | u(8) |
| } | |
| } | |

7.3.7.1 General Slice Header Syntax

|  | Descriptor |
|---|---|
| slice_header( ) { | |
|   picture_header_in_slice_header_flag | u(1) |
|   if( picture_header_in_slice_header_flag ) | |
|     picture_header_structure( ) | |
|   if( subpic_infb_present_flag ) | |
|     slice_subpic_id | u(v) |

-continued

|  | Descriptor |
|---|---|
| if( ( rect_slice_flag && NumSlicesInSubpic[ CurrSubpicIdx ] > 1 ) \|\| | |
| ( !rect_slice_flag && NumTilesInPic > 1 ) ) | |
|   slice_address | u(v) |
| for( i = 0; i < NumExtraPhBits; i++ ) | |
|   sh_extra_bit[ i ] | u(1) |
| if( !rect_slice_flag && NumTilesInPic > 1 ) | |
|   num_tiles_in_slice_minus1 | ue(v) |
| if( ph_inter_ slice_allowed_flag) | |
|   slice_type | ue(v) |
| if( sps_alf_enabled_flag && !alf_info_in_ph_flag ) { | |
|   slice_alf_enabled_flag | u(1) |
|   if( slice_alf_enabled_flag ) { | |
|     slice_num_alf_aps_ids_luma | u(3) |
|     for( i = 0; i < slice_num_alf_aps_ids_luma; i++ ) | |
|       slice_alf_aps_id_luma[ i ] | u(3) |
|     if( ChromaArrayType != 0 ) | |
|       slice_alf_chroma_idc | u(2) |
|     if( slice_alf_chroma_idc ) | |
|       slice_alf_aps_id_chroma | u(3) |
|     if( sps_ccalf_ enabled_flag ) { | |
|       slice_cc_alf_cb_enabled_flag | u(1) |
|       if( slice_cc_alf_cb_enabled_flag ) | |
|         slice_cc_alf_cb_aps_id | u(3) |
|       slice_cc_alf_cr_enabled_flag | u(1) |
|       if( slice_cc_alf_cr_enabled_flag ) | |
|         slice_cc_alf_cr_aps_id | u(3) |
|     } | |
|   } | |
| } | |
| if( separate_colour_plane_flag = = 1 ) | |
|   colour_plane_id | u(2) |
| if( !rpl_info_in_ph_flag && ((nal_unit_type != IDR_W_RADL && nal_unit_type != | |
|     IDR_N_LP \|\| sps_idr_rpl_present_flag ) ) | |
|   ref_pic_lists( ) | |
| if( ( rpl_info_in_ph_flag \|\| ( ( nal_unit_type != IDR_W_RADL && nal_unit_type != | |
|     IDR_N_LP) \|\| sps_idr_rpl_present_flag ) ) && | |
|     ( slice_type != I && num_ref_entries[ 0 ][ RplsIdx[ 0 ] ] > 1 ) \|\| | |
|     ( slice type = = B && num_ref_entries[ 1 ][ RplsIdx[ 1 ] ] >1 ) ) { | |
|   num_ref_idx_active_override_flag | u(1) |
|   if( num_ref_idx_active_override_flag ) | |
|     for( i = 0; i < ( slice_type = = B ? 2: 1 ); i++ ) | |
|       if( num_ref_entries[ i ][ RplsIdx[ i ] ] > 1 ) | |
|         num_ref_idx_active_minus1[ i ] | ue(v) |
| } | |
| if( slice_type != I ) { | |
|   if( cabac_init_present_flag ) | |
|     cabac_init_flag | u(1) |
|   if( ph_temporal_mvp_enabled_flag && !rpl_info_in_ph_flag ) { | |
|     if( slice_ type = = B ) | |
|       slice_collocated_from_l0_flag | u(1) |
|     if( ( slice_collocated_from_l0_flag && NumRefIdxActive 0 ] > 1 ) \|\| | |
|       ( ! slice_collocated_from_l0_flag && NumRefIdxActive[ 1 ] > 1 ) ) | |
|     slice_collocated_ref_idx | ue(v) |
|   } | |
|   if( !wp_info_in_ph_flag && ( ( pps_weighted_pred_flag && slice_type = = P ) \|\| | |
|     (pps_weighted_bipred_flag && slice_type = = B ) ) ) | |
|     pred_weight_table( ) | |
| } | |
| if( !qp_delta_info_in_ph_flag ) | |
|   slice_qp_delta | se(v) |
| if( pps_slice_chroma_qp_offsets present_flag ) { | |
|   slice_cb_qp_offset | se(v) |
|   slice_cr_qp_offset | se(v) |
|   if( sps_joint_cb_cr_enabled_flag ) | |
|     slice_joint_cb_cr_qp_offset | se(v) |
| } | |
| if( pps_cu_chroma_qp_offset_list_enabled_flag ) | |
|   cu_chroma_qp_offset_enabled_flag | u(1) |
| if( sps_sao_enabled_flag && ! sao_info_in_ph_flag ) { | |
|   slice_sao_luma_flag | u(1) |
|   if( ChromaArrayType != 0 ) | |
|     slice_sao_chroma_flag | u(1) |

|  | Descriptor |
|---|---|
| } | |
|   if( deblocking_filter_override_enabled_flag && !dbf_info_in_ph_flag ) | |
|     slice_deblocking_filter_override_flag | u(1) |
|   if( slice_deblocking_filter_override _flag) { | |
|     slice_deblocking_filter_disabled_flag | u(1) |
|     if( !slice_deblocking_filter_disabled_flag ) { | |
|       slice_beta_offset_div2 | se(v) |
|       slice_tc_offset_div2 | se(v) |
|       slice_cb_beta_offset_div2 | se(v) |
|       slice_cc_tc_offset_div2 | se(v) |
|       slice_cr_beta_offset_div2 | se(v) |
|       slice_cr_tc_offset_div2 | se(v) |
|     } | |
|   } | |
|   slice_ts_residual_coding_disabled_flag | u(1) |
|   if( ph_lmcs_enabled_flag ) | |
|     slice_lmcs_enabled_flag | u(1) |
|   if( pic_scaling_list_enabled_flag ) | |
|     slice_scaling_list_present_flag | u(1) |
|   if( NumEntryPoints > 0 ) { | |
|     offset_len_minus1 | ue(v) |
|     for( i = 0; i < NumEntryPoints; i++ ) | |
|       entry_point_offset_minus1[ i ] | u(v) |
|   } | |
|   if( slice_header_extension_present_flag ) { | |
|     slice_header_extension_length | ue(v) |
|     for( i = 0; i < slice_header_extension_length; i++) | |
|       slice_header_extension_data_byte[ i ] | u(8) |
|   } | |
|   byte_alignment( ) | |
| } | |

3.4. The Specifications in JVET-Q2001-vC for Tiles, Slices and Subpictures

3 Definitions picture-level slice index: An index of a slice to the list of slices in a picture in the order as they are signalled in the PPS when the rect_slice_flag is equal to 1.

subpicture-level slice index: An index of a slice to the list of slices in a subpicture in the order as they are signalled in the PPS when the rect_slice_flag is equal to 1.

6.5.1 CTB Raster Scanning, Tile Scanning, and Subpicture Scanning Processes

The variable NumTileColumns, specifying the number of tile columns, and the list colWidth[i] for i ranging from 0 to NumTileColumn−1, inclusive, specifying the width of the i-th tile column in units of CTBs, are derived as follows:

```
remainingWidthInCtbsY = PicWidthInCtbsY
for( i = 0; i < num_exp_tile_columns_minus1; i++ ) {
  colWidth[ i ] = tile_column_width_minus1[ i ] + 1
  remainingWidthInCtbsY -= colWidth[ i ]
}
uniformTileColWidth = tile_column_width_minus1[ num_exp_tile_columns_minus1 ] +
1 (23)
while( remainingWidthInCtbsY >= uniformTileColWidth ) {
  colWidth[ i++ ] = uniformTileColWidth
  remainingWidthInCtbsY -= uniformTileColWidth
}
if( remainingWidthInCtbsY > 0 )
  colWidth[ i++ ] = remainingWidthInCtbsY
NumTileColumns = i
```

The variable NumTileRows, specifying the number of tile rows, and the list RowHeight[j] for j ranging from 0 to NumTileRows−1, inclusive, specifying the height of the j-th tile row in units of CTBs, are derived as follows:

```
remainingHeightInCtbsY = PicHeightInCtbsY
for( j = 0; j < num_exp_tile_rows_minus1; j++ ) {
  RowHeight[ j ] = tile_row_height_minus1[ j ] + 1
  remainingHeightInCtbsY -= RowHeight[ j ]
}
uniformTileRowHeight = tile_row_height_minus1[ num_exp_tile_rows_minus1 ] + 1
   (24)
while( remainingHeightInCtbsY >= uniformTileRowHeight ) {
  RowHeight[ j++ ] = uniformTileRowHeight
  remainingHeightInCtbsY -= uniformTileRowHeight
}
```

```
if( remainingHeightInCtbsY > 0 )
    RowHeight[ j++ ] = remainingHeightInCtbsY
NumTileRows = j
```

The variable NumTilesInPic is set equal to NumTileColumns*NumTileRows.

The list tileColBd[i] for i ranging from 0 to NumTileColumns, inclusive, specifying the location of the i-th tile column boundary in units of CTBs, is derived as follows:

for(tileColBd[0]=0,i=0;i<NumTileColumns;i++)tile-
    ColBd[i+1]=tileColBd[i]+colWidth[i]     (25)

NOTE 1—The size of the array tileColBd[ ] is one greater than the actual number of tile columns in the derivation of CtbToTileColBd[ ].

The list tileRowBd[j] for j ranging from 0 to NumTileRows, inclusive, specifying the location of the j-th tile row boundary in units of CTBs, is derived as follows:

for(tileRowBd[0]=0,j=0;j<NumTileRows;j++)tile-
    RowBd[j+1]=tileRowBd[j]+RowHeight[j]     (26)

NOTE 2—The size of the array tileRowBd[ ] in the above derivation is one greater than the actual number of tile rows in the derivation of CtbToTileRowBd[ ].

The list CtbToTileColBd[ctbAddrX] for ctbAddrX ranging from 0 to PicWidthInCtbsY, inclusive, specifying the conversion from a horizontal CTB address to a left tile column boundary in units of CTBs, is derived as follows:

```
tileX = 0
for( ctbAddrX = 0; ctbAddrX <= PicWidthInCtbsY; ctbAddrX++ ) {
    if( ctbAddrX = = tileColBd[ tileX + 1 ] )          (27)
        tileX++
    CtbToTileColBd[ ctbAddrX ] = tileColBd[ tileX ]
}
```

NOTE 3—The size of the array CtbToTileColBd[ ] in the above derivation is one greater than the actual number of picture width in CTBs in the derivaqiton slice data( ) signalling.

The list CtbToTileRowBd[ctbAddrY] for ctbAddrY ranging from 0 to PicHeightInCtbsY, inclusive, specifying the conversion from a vertical CTB address to a top tile column boundary in units of CTBs, is derived as follows:

```
tileY = 0
for( ctbAddrY = 0; ctbAddrY <= PicHeightInCtbsY; ctbAddrY++ ) {
    if( ctbAddrY = = tileRowBd[ tileY + 1 ] )          (28)
        tileY++
    CtbToTileRowBd[ ctbAddrY ] = tileRowBd[ tileY ]
}
```

NOTE 4—the size of the array CtbToTileRowBd[ ] in the above derivation is one greater than the actual number of picture height in CTBs in the slice data( ) signalling.

For rectangular slices, the list NumCtusInSlice[i] for i ranging from 0 to num_slices_in_pic_minus1, inclusive, specifying the number of CTU in the i-th slice, the list SliceTopLeftTileIdx[i] for i ranging from 0 to num_slices_in_pic_minus1, inclusive, specifying the index of the top-left tile of the slice, and the matrix CtbAddrInSlice[i][j] for i ranging from 0 to num_slices_in_pic_minus1, inclusive, and j ranging from 0 to NumCtusInSlice[i]−1, inclusive, specifying the picture raster scan address of the j-th CTB within the i-th slice, are derived as follows:

```
if( single_slice_per_subpic_flag ) {
    for(i = 0; i <= sps_num_subpics_minus1; i++ )
        NumCtusInSlice[ i ] = 0
    for( i = 0; i < PicSizeInCtbsY; i ++ ) {
        sliceIdx = subpic_info_present_flag ? CtbToSubpicIdx[ i ] : 0
        CtbAddrInSlice[ sliceIdx ][ NumCtusInSlice[ sliceIdx ] ] = i
        NumCtusInSlice[ sliceIdx ]++
    }
} else {
    tileIdx = 0
    for( i = 0; i <= num_slices_in_pic_minus1; i++ )
        NumCtusInSlice[ i ] = 0
    for( i = 0; i <= num_slices_in_pic_minus1; i++ ) {
        SliceTopLeftTileIdx[ i ] = tileIdx
        tileX = tileIdx % NumTileColumns
        tileY = tileIdx / NumTileColumns
        if( i = = num_slices_in_pic_minus1 ) {
            slice_width_in_tiles_minus1[ i ] = NumTileColumns − 1 − tileX
            slice_height_in_tiles_minus1[ i ] = NumTileRows − 1 − tileY
            NumSlicesInTile[ i ] = 1
        }
        if( slice_width_in_tiles_minus1[ i ] = = 0 && slice_height_in_
tiles_minus1[ i ] = = 0 ) {          (29)
            ctbY = tileRowBd[ tileY ]
            for( j = 0; j < NumSlicesInTile[ i ] − 1; j++ ) {
                AddCtbsToSlice( i, tileColBd[ tileX ], tileColBd[ tileX + 1 ],
                    ctbY, ctbY + SliceHeightInCtusMinus1[ i ] + 1 )
                ctbY += SliceHeightInCtusMinus1[ i ] + 1
                i++
            }
            AddCtbsToSlice( i, tileColBd[ tileX ], tileColBd[ tileX + 1 ],
ctbY, tileRowBd[ tileY + 1 ] )
        } else
            for( j = 0; j <= slice_height_in_tiles_minus1[ i ]j++)
                for( k = 0; k <= slice_width_in_tiles_minus1[ i ]; k++ )
                    AddCtbsToSlice( i, tileColBd[ tileX + k ], tileColBd[ tileX
+ k + 1 ],
                        tileRowBd[ tileY + j ], tileRowBd[ tileY + j + 1 ] )
        if( tile_idx_delta_present_flag )
            tileIdx += tile_idx_delta[ i ]
        else {
            tileIdx += slice_width_in_tiles_minus1[ i ] + 1
            if( tileIdx % NumTileColumns = = 0 )
                tileIdx += slice_height_in_tiles_minus1[ i ] * NumTileColumns
        }
    }
}
```

Where the function AddCtbsToSlice(sliceIdx, startX, stopX, startY, stopY) is specified as follows:

```
for( ctbY = startY; ctbY < stopY; ctbY++ )
    for( ctbX = startX; ctbX < stopX; ctbX++ ) {
        CtbAddrInSlice[ sliceIdx ][ NumCtusInSlice[ sliceIdx ] ] =
ctbY * PicWidthInCtbsY + ctbX     (30)
        NumCtusInSlice[ sliceIdx ]++
    }
```

For bitstream conformance, the values of NumCtusInSlice[i] for i ranging from 0 to num_slices_in_pic_minus1, inclusive, may be greater than 0. Additionally, for bitstream conformance, the matrix CtbAddrInSlice[i][j] for i ranging from 0 to num_slices_in_pic_minus1, inclusive, and j ranging from 0 to NumCtusInSlice[i]−1, inclusive, may include all CTB addresses in the range 0 to PicSizeInCtbsY−1 once and only once. The list CtbToSubpicIdx[ctbAddrRs] for ctbAddrRs ranging from 0 to PicSizeInCtbsY−1, inclusive, specifying the conversion from a CTB address in picture raster scan to a subpicture index, is derived as follows:

```
for( ctbAddrRs = 0; ctbAddrRs < PicSizeInCtbsY; ctbAddrRs++ ) {
    posX = ctbAddrRs % PicWidthInCtbsY
    posY = ctbAddrRs / PicWidthInCtbsY
```

-continued

```
    CtbToSubpicIdx[ ctbAddrRs ] = −1
    for( i = 0; CtbToSubpicIdx[ ctbAddrRs ] < 0 && i <= sps_num_
subpics_minus1; i++ ) {                                    (31)
        if( (posX >= subpic_ctu_top_left_x[ i ]) &&
           (posX < subpic_ctu_top_left_x[i]+ subpic_width_minus1[ i ]
+ 1 ) &&
           ( posY >= subpic_ctu_top_left_y[ i ] ) &&
           ( posY < subpic_ctu_top_left_y[ i ] + subpic_height_minus1
              [ i ] + 1 ) )
            CtbToSubpicIdx[ ctbAddrRs ] = i
    }
}
```

The list NumSlicesInSubpic[i], specifying the number of rectangular slices in the i-th subpicture, is derived as follows:

```
for(j = 0; j <= sps_num_subpics_minus1; j++ )
    NumSlicesInSubpic[ j ] = 0
for( i = 0; i <= num_slices_in_pic_minus1; i++ ) {
    posX = CtbAddrInSlice[ i ][ 0 ] % PicWidthInCtbsY
    posY = CtbAddrInSlice[ i ][ 0 ] / PicWidthInCtbsY
    for(j = 0;j <= sps_num_subpics_minus1; j++ ) {
        if( ( posX >= subpic_ctu_top_left_x[ j ] ) &&(32)
           ( posX < subpic_ctu_top_left_x[ j ] + subpic_width_minus1
[ j ] + 1 ) &&
           ( posY >= subpic_ctu_top_left_y[ j ] ) &&
           ( posY < subpic_ctu_top_left_y[ j ] + subpic_height_minus1
              [ j ] + 1 ) ) {
            NumSlicesInSubpic[ j ]++
        }
    }
}
...
```

7.3.4.3 Picture Parameter Set RBSP Semantics

...

subpic_id_mapping_in_pps_flag equal to 1 specifies that the subpicture ID mapping is signalled in the PPS. subpic_id_mapping_in_pps_flag equal to 0 specifies that the subpicture ID mapping is not signalled in the PPS. If subpic_id_mapping_explicitly_signalled_flag is 0 or subpic_id_mapping_in_sps_flag is equal to 1, the value of subpic_id_mapping_in_pps_flag may be equal to 0. Otherwise (subpic_id_mapping_explicitly_signalled_flag is equal to 1 and subpic_id_mapping_in_sps_flag is equal to 0), the value of subpic_id_mapping_in_pps_flag may be equal to 1.

pps_num_subpics_minus1 may be equal to sps_num_subpics_minus1.

pps_subpic_id_len_minus1 may be equal to sps_subpic_id_len_minus1.

pps_subpic_id[i] specifies the subpicture ID of the i-th subpicture. The length of the pps_subpic_id[i] syntax element is pps_subpic_id_len_minus1+1 bits.

The variable SubpicIdVal[i], for each value of i in the range of 0 to sps_num_subpics_minus1, inclusive, is derived as follows:

```
for( i = 0; i <= sps_num_subpics_minus1; i++ )
    if( subpic_id_mapping_explicitly_signalled_flag )
        SubpicIdVal[ i ] = subpic_id_mapping_in_pps_flag ? pps_subpic_id
[ i ] sps_subpic_id[ i ]                         (80)
    else
        SubpicIdVal[ i ] = i
```

For bitstream conformance, both of the following constraints may apply:

For any two different values of i and j in the range of 0 to sps_num_subpics_minus1, inclusive, SubpicIdVal[i] may not be equal to SubpicIdVal[j].

When the current picture is not the first picture of the CLVS, for each value of i in the range of 0 to sps_num_subpics_minus1, inclusive, if the value of SubpicIdVal[i] is not equal to the value of SubpicIdVal[i] of the previous picture in decoding order in the same layer, the nal_unit_type for all coded slice NAL units of the subpicture in the current picture with subpicture index i may be equal to a particular value in the range of IDR_W_RADL to CRA_NUT, inclusive.

no_pic_partition_flag equal to 1 specifies that no picture partitioning is applied to each picture referring to the PPS. no_pic_partition_flag equal to 0 specifies each picture referring to the PPS may be partitioned into more than one tile or slice.

For bitstream conformance, the value of no_pic_partition_flag may be the same for all PPSs that are referred to by coded pictures within a CLVS.

For bitstream conformance, the value of no_pic_partition_flag may not be equal to 1 when the value of sps_num_subpics_minus1+1 is greater than 1.

pps_log 2_ctu_size_minus5 plus 5 specifies the luma coding tree block size of each CTU. pps_log 2_ctu_size_minus5 may be equal to sps_log_2_ctu_size_minus5.

num_exp_tile_columns_minus1 plus 1 specifies the number of explicitly provided tile column widths. The value of num_exp_tile_columns_minus1 may be in the range of 0 to PicWidthInCtbsY−1, inclusive. When no_pic_partition_flag is equal to 1, the value of num_exp_tile_columns_minus1 is inferred to be equal to 0.

num_exp_tile_rows_minus1 plus 1 specifies the number of explicitly provided tile row heights. The value of num_exp_tile_rows_minus1 may be in the range of 0 to PicHeightInCtbsY−1, inclusive. When no_pic_partition_flag is equal to 1, the value of num_tile_rows_minus1 is inferred to be equal to 0.

tile_column_width_minus1[i] plus 1 specifies the width of the i-th tile column in units of CTBs for i in the range of 0 to num_exp_tile_columns_minus1−1, inclusive. tile_column_width_minus1[num_exp_tile_columns_minus1] is used to derive the width of the tile columns with index greater than or equal to num_exp_tile_columns_minus1 as specified in clause 6.5.1. The value of tile_column_width_minus1 [i] may be in the range of 0 to PicWidthInCtbsY−1, inclusive. When not present, the value of tile_column_width_minus1 [0] is inferred to be equal to PicWidthInCtbsY−1.

tile_row_height_minus1[i] plus 1 specifies the height of the i-th tile row in units of CTBs for i in the range of 0 to num_exp_tile_rows_minus1−1, inclusive. tile_row_height_minus1 [num_exp_tile_rows_minus1] is used to derive the height of the tile rows with index greater than or equal to num_exp_tile_rows_minus1 as specified in clause 6.5.1. The value of tile_row_height_minus1 [i] may be in the range of 0 to PicHeightInCtbsY−1, inclusive. When not present, the value of tile_row_height_minus1 [0] is inferred to be equal to PicHeightInCtbsY−1.

rect_slice_flag equal to 0 specifies that tiles within each slice are in raster scan order and the slice information is not signalled in PPS. rect_slice_flag equal to 1 specifies that tiles within each slice cover a rectangular region of the picture and the slice information is signalled in the PPS. When not present, rect_slice_flag is inferred to be equal to 1. When subpic_info_present_flag is equal to 1, the value of rect_slice_flag may be equal to 1.

single_slice_per_subpic_flag equal to 1 specifies that each subpicture consists of one and only one rectangular slice. single_slice_per_subpic_flag equal to 0 specifies that each subpicture may consist of one or more rectangular slices. When single_slice_per_subpic_flag is equal to 1, num_slices_in_pic_minus1 is inferred to be equal to sps_num_subpics_minus1. When not present, the value of single_slice_per_subpic_flag is inferred to be equal to 0.
num_slices_in_pic_minus1 plus 1 specifies the number of rectangular slices in each picture referring to the PPS. The value of num_slices_in_pic_minus1 may be in the range of 0 to MaxSlicesPerPicture−1, inclusive, where MaxSlicesPerPicture is specified in Annex A. When no_pic_partition_flag is equal to 1, the value of num_slices_in_pic_minus1 is inferred to be equal to 0.
tile_idx_delta_present_flag equal to 0 specifies that tile_idx_delta values are not present in the PPS and all rectangular slices in pictures referring to the PPS are specified in raster order according to the process defined in clause 6.5.1. The tile_idx_delta_present_flag equal to 1 specifies that tile_idx_delta values may be present in the PPS and all rectangular slices in pictures referring to the PPS are specified in the order indicated by the values of tile_idx_delta. When not present, the value of tile_idx_delta_present_flag is inferred to be equal to 0.
slice_width_in_tiles_minus1[i] plus 1 specifies the width of the i-th rectangular slice in units of tile columns. The value of slice_width_in_tiles_minus1 [i] may be in the range of 0 to NumTileColumns−1, inclusive.
When slice_width_in_tiles_minus1[i] is not present, the following applies:
  If NumTileColumns is equal to 1, the value of slice_width_in_tiles_minus1 [i] is inferred to be equal to 0.
  Otherwise, the value of slice_width_in_tiles_minus1 [i] is inferred as specified in clause 6.5.1.
slice_height_in_tiles_minus1[i] plus 1 specifies the height of the i-th rectangular slice in units of tile rows. The value of slice_height_in_tiles_minus1 [i] may be in the range of 0 to NumTileRows−1, inclusive.
When slice_height_in_tiles_minus1[i] is not present, the following applies:—
  If NumTileRows is equal to 1, or tile_idx_delta_present_flag is equal to 0 and tileIdx % NumTileColumns is greater than 0), the value of slice_height_in_tiles_minus1[i] is inferred to be equal to 0.
  Otherwise (NumTileRows is not equal to 1, and tile_idx_delta_present_flag is equal to 1 or tileIdx % NumTileColumns is equal to 0), when tile_idx_delta_present_flag is equal to 1 and tileIdx % NumTileColumns is equal to 0, the value of slice_height_in_tiles_minus1 [i] is inferred to be equal to slice_height_in_tiles_minus1[i−1].
num_exp_slices_in_tile[i] specifies the number of explicitly provided slice heights in the current tile that contains more than one rectangular slices. The value of num_exp_slices_in_tile[i] may be in the range of 0 to RowHeight[tileY]−1, inclusive, where tileY is the tile row index containing the i-th slice. When not present, the value of num_exp_slices_in_tile[i] is inferred to be equal to 0. When num_exp_slices_in_tile[i] is equal to 0, the value of the variable NumSlicesInTile[i] is derived to be equal to 1.
exp_slice_height_in_ctus_minus1[j] plus 1 specifies the height of the j-th rectangular slice in the current tile in units of CTU rows. The value of exp_slice_height_in_ctus_minus1 [j] may be in the range of 0 to RowHeight[tileY]−1, inclusive, where tileY is the tile row index of the current tile.

When num_exp_slices_in_tile[i] is greater than 0, the variable NumSlicesInTile[i] and SliceHeightInCtusMinus1[i+k] for k in the range of 0 to NumSlicesInTile[i]−1 are derived as follows:

```
remainingHeightInCtbsY = RowHeight[ SliceTopLeftTileIdx[ i ] / NumTileColumns ]
numExpSliceInTile = num_exp_slices_in_tile[ i ]
for( j = 0; j < numExpSliceInTile − 1; j++ ) {
   SliceHeightInCtusMinus1[ i++ ] = exp_slice_height_in_ctu_minus1[ j ]
   remainingHeightInCtbsY −= SliceHeightInCtusMinus1[ j ]
}
uniformSliceHeightMinus1 = SliceHeightInCtusMinus1[ i − 1 ]     (81)
while( remainingHeightInCtbsY >= (uniformSliceHeightMinus1 + 1) ) {
   SliceHeightInCtusMinus1[ i++ ] = uniformSliceHeightMinus1
   remainingHeightInCtbsY −= (uniformSliceHeightMinus1 + 1)
   j++
}
if( remainingHeightInCtbsY > 0 ) {
   SliceHeightInCtusMinus1[ i++ ] = remainingHeightInCtbsY
   j++
}
NumSlicesInTile[ i ] = j
``` tile_idx_delta[i] specifies the difference between the tile index of the first tile in the i-th rectangular slice and the tile index of the first tile in the (i+1)-th rectangular slice. The value of tile_idx_delta[i] may be in the range of −NumTilesInPic+1 to NumTilesInPic−1, inclusive. When not present, the value of tile_idx_delta[i] is inferred to be equal to 0. When present, the value of tile_idx_delta[i] may not be equal to 0.
. . .
7.4.2.4.5 Order of VCL NAL Units and their Association to Coded Pictures
The order of the VCL NAL units within a coded picture is constrained as follows:
  For any two coded slice NAL units A and B of a coded picture, let subpicIdxA and subpicIdxB be their subpicture level index values, and sliceAddrA and sliceddrB be their slice address values.
    When either of the following conditions is true, coded slice NAL unit A may precede coded slice NAL unit B:
    subpicIdxA is less than subpicIdxB.
    subpicIdxA is equal to subpicIdxB and sliceAddrA is less than sliceAddrB.
7.4.8.1 General Slice Header Semantics
The variable CuQpDeltaVal, specifying the difference between a luma quantization parameter for the coding unit containing cu_qp_delta_abs and its prediction, is set equal to 0. The variables CuQpOffset$_{Cb}$, CuQpOffset$_{Cr}$, and CuQpOffset$_{CbCr}$, specifying values to be used when determining the respective values of the Qp'$_{Cb}$, Qp'$_{Cr}$, and Qp'$_{CbCr}$ quantization parameters for the coding unit containing cu_chroma_qp_offset_flag, are all set equal to 0.
picture_header_in_slice_header_flag equal to 1 specifies that the PH syntax structure is present in the slice header. picture_header_in_slice_header_flag equal to 0 specifies that the PH syntax structure is not present in the slice header. For bitstream conformance, the value of picture_header_in_slice_header_flag may be the same in all coded slices in a CLVS.
When picture_header_in_slice_header_flag is equal to 1 for a coded slice, for bitstream conformance, no VCL NAL unit with nal_unit_type equal to PH NUT may be present in the CLVS.
When picture_header_in_slice_header_flag is equal to 0, all coded slices in the current picture may have picture_header_in_slice_header_flag is equal to 0, and the current PU may have a PH NAL unit.

slice_subpic_id specifies the subpicture ID of the subpicture that contains the slice. If slice_subpic_id is present, the value of the variable CurrSubpicIdx is derived to be such that SubpicIdVal[CurrSubpicIdx] is equal to slice_subpic_id. Otherwise (slice_subpic_id is not present), CurrSubpicIdx is derived to be equal to 0. The length of slice_subpic_id is sps_subpic_id_len_minus1+1 bits.

slice_address specifies the slice address of the slice. When not present, the value of slice_address is inferred to be equal to 0. When rect_slice_flag is equal to 1 and NumSlicesInSubpic[CurrSubpicIdx] is equal to 1, the value of slice_address is inferred to be equal to 0.

If rect_slice_flag is equal to 0, the following applies:
    The slice address is the raster scan tile index.
    The length of slice_address is Ceil(Log 2 (NumTilesInPic)) bits.
    The value of slice_address may be in the range of 0 to NumTilesInPic−1, inclusive.

Otherwise (rect_slice_flag is equal to 1), the following applies:
    The slice address is the subpicture-level slice index of the slice.
    The length of slice_address is Ceil(Log 2(NumSlicesInSubpic[CurrSubpicIdx])) bits.
    The value of slice_address may be in the range of 0 to NumSlicesInSubpic[CurrSubpicIdx]−1, inclusive.

For bitstream conformance, the following constraints may apply:
    If rect_slice_flag is equal to 0 or subpic_info_present_flag is equal to 0, the value of slice_address may not be equal to the value of slice_address of any other coded slice NAL unit of the same coded picture.
    Otherwise, the pair of slice_subpic_id and slice_address values may not be equal to the pair of slice_subpic_id and slice_address values of any other coded slice NAL unit of the same coded picture.
    The shapes of the slices of a picture may be such that each CTU, when decoded, may have its entire left boundary and entire top boundary consisting of a picture boundary or consisting of boundaries of previously decoded CTU(s).

sh_extra_bit[i] may be equal to 1 or 0. Decoders conforming to this version of this Specification may ignore the value of sh_extra_bit[i]. Its value does not affect decoder conformance to profiles specified in this version of specification. num_tiles_in_slice_minus1 plus 1, when present, specifies the number of tiles in the slice. The value of num_tiles_in_slice_minus1 may be in the range of 0 to NumTilesInPic−1, inclusive. The variable NumCtusInCurrSlice, which specifies the number of CTUs in the current slice, and the list CtbAddrInCurrSlice[i], for i ranging from 0 to NumCtusInCurrSlice−1, inclusive, specifying the picture raster scan address of the i-th CTB within the slice, are derived as follows:

```
if( rect_slice_flag ) {
   picLevelSliceIdx = slice_address
   for( j = 0; j < CurrSubpicIdx; j++ )
      picLevelSliceIdx += NumSlicesInSubpic[ j ]
   NumCtusInCurrSlice = NumCtusInSlice[ picLevelSliceIdx ]
   for( i = 0; i < NumCtusInCurrSlice; i++ )
      CtbAddrInCurrSlice[ i ] = CtbAddrInSlice[ picLevelSliceIdx ][ i ]
         (117)
} else {
   NumCtusInCurrSlice = 0
   for( tileIdx = slice_address; tileIdx <= slice_address + num_tiles_in_slice_minus1; tileIdx++ ) {
      tileX = tileIdx % NumTileColumns
      tileY = tileIdx / NumTileColumns
      for( ctbY = tileRowBd[ tileY ]; ctbY < tileRowBd[ tileY + 1 ]; ctbY++ ) {
         for( ctbX = tileColBd[ tileX ]; ctbX < tileColBd[ tileX + 1 ]; ctbX++ ) {
            CtbAddrInCurrSlice[ NumCtusInCurrSlice ] = ctbY * PicWidthInCtb + ctbX
            NumCtusInCurrSlice++
         }
      }
   }
}
```

The variables SubpicLeftBoundaryPos, SubpicTopBoundaryPos, SubpicRightBoundaryPos, and SubpicBotBoundaryPos are derived as follows:

```
if( subpic_treated_as_pic_flag[ CurrSubpicIdx ] ) {
   SubpicLeftBoundaryPos = subpic_ctu_top_left_x[ CurrSubpicIdx ]
      *CtbSizeY
   SubpicRightBoundaryPos = Min( pic_width_max_in_luma_
   samples − 1,
      ( subpic_ctu_top_left_x[ CurrSubpicIdx ] +
      subpic_width_minus1[ CurrSubpicIdx ] + 1 ) * CtbSizeY − 1 )
   SubpicTopBoundaryPos = subpic_ctu_top_left_y[ CurrSubpicIdx ]
      *CtbSizeY
      (118)
   SubpicBotBoundaryPos = Min( pic_height_max_in_luma_
   samples − 1,
      ( subpic_ctu_top_left_y[ CurrSubpicIdx ] +
      subpic_height_minus1[ CurrSubpicIdx ] + 1 ) * CtbSizeY − 1 )
}
...
```

3.5. Luma Mapping with Chroma Scaling (LMCS)

LMCS includes two aspects: luma mapping (reshaping process, denoted by RP) and luma dependent chroma residual scaling (CRS). For the luma signal, the LMCS mode operates based on two domains are involved wherein including a first domain that is an original domain and a second domain that is a reshaped domain which maps luma samples to particular values according reshaping models. In addition, for the chroma signal, residual scaling may be applied wherein the scaling factors are derived from luma samples.

The related syntax elements and semantics in SPS, picture header (PH) and slice header (SH) are described as follows:
Syntax Tables
7.3.2.3 Sequence Parameter Set RBSP Syntax

|  | Descriptor |
| --- | --- |
| seq_parameter_set_rbsp( ) { |  |
|   sps_seq_parameter_set_id | u(4) |
|   sps_video_parameter_set_id | u(4) |
|   sps_max_sublayers_minus1 | u(3) |
|   sps_reserved_zero_4bits | u(4) |
|   ... |  |
|   sps_affine_enabled_flag | u(1) |
|   if( sps_affine_enabled_flag ) { |  |
|     five_minus_max_num_subblock_merge_cand | ue(v) |
|     sps_affine_type_flag | u(1) |
|     if( sps_amvr_enabled_flag) |  |
|       sps_affine_amvr_enabled_flag | u(1) |
|     sps_affine_prof_enabled_flag | u(1) |
|     if( sps_affine_prof_enabled_flag) |  |
|       sps_prof_pic_present_flag | u(1) |

|   | Descriptor |
|---|---|
| } | |
| ... | |
|   sps_lmcs_enabled_flag | u(1) |
|   sps_lfnst_enabled_flag | u(1) |
| ... | |
| } | |

7.3.2.7 Picture Header Structure Syntax

|   | Descriptor |
|---|---|
| picture_header_structure( ) { | |
|   gdr_or_irap_pic_flag | u(1) |
|   if( gdr_or_irap_pic_flag ) | |
|     gdr_pic_flag | u(1) |
| ... | |
|   if( sps_lmcs_enabled_flag ) { | |
|     ph_lmcs_enabled_flag | u(1) |
|     if( ph_lmcs_enabled_flag ) { | |
|       ph_lmcs_aps_id | u(2) |
|       if( ChromaArrayType != 0 ) | |
|         ph_chroma_residual_scale_flag | u(1) |
|     } | |
|   } | |
|   if( sps_scaling_list_enabled_flag ) { | |
|     ph_scaling_list_present_flag | u(1) |
|     if( ph_scaling_list_present_flag ) | |
|       ph_scaling_list_aps_id | u(3) |
|   } | |
|   if( sps_virtual_boundaries_enabled_flag && !sps_virtual_boundaries_present_flag ) { | |
|     ph_virtual_boundaries_present_flag | u(1) |
|     if( ph_virtual_boundaries_present_flag ) { | |
|       ph_num_ver_virtual_boundaries | u(2) |
|       for( i = 0; i < ph_num_ver_virtual_boundaries; i++ ) | |
|         ph_virtual_boundaries_pos_x[ i ] | u(13) |
|       ph_num_hor_virtual_boundaries | u(2) |
|       for( i = 0; i < ph_num_hor_virtual_boundaries; i++ ) | |
|         ph_virtual_boundaries_pos_y[ i ] | u(13) |
|     } | |
|   } | |
| } | |

7.3.7 Slice Header Syntax
7.3.7.1 General Slice Header Syntax

|   | Descriptor |
|---|---|
| slice_header( ) { | |
|   picture_header_in_slice_header_flag | u(1) |
|   slice_ts_residual_coding_disabled_flag | u(1) |
|   if( ph_lmcs_enabled_flag ) | |
|     slice_lmcs_enabled_flag | u(1) |
|   if( pic_scaling_list_enabled_flag ) | |
|     slice_scaling_list_present_flag | u(1) |
|   if( NumEntryPoints > 0 ) { | |
|     offset_len_minus1 | ue(v) |
|     for( i = 0; i < NumEntryPoints; i++ ) | |
|       entry_point_offset_minus1[ i ] | u(v) |
|   } | |
|   if( slice_header_extension_present_flag ) { | |
|     slice_header_extension_length | ue(v) |
|     for( i = 0; i < slice_header_extension_length; i++) | |
|       slice_header_extension_data_byte[ i ] | u(8) |
|   } | |
|   byte_alignment( ) | |
| } | |

Semantics
sps_lmcs_enabled_flag equal to 1 specifies that luma mapping with chroma scaling is used in the CLVS. sps_lmcs_enabled_flag equal to 0 specifies that luma mapping with chroma scaling is not used in the CLVS.

ph_lmcs_enabled_flag equal to 1 specifies that luma mapping with chroma scaling is enabled for all slices associated with the PH. ph_lmcs_enabled_flag equal to 0 specifies that luma mapping with chroma scaling may be disabled for one, or more, or all slices associated with the PH. When not present, the value of ph_lmcs_enabled_flag is inferred to be equal to 0.

ph_lmcs_aps_id specifies the adaptation parameter set id of the LMCS APS that the slices associated with the PH refers to. The TemporalId of the APS NAL unit having aps_params_type equal to LMCS_APS and adaptation_parameter_set_id equal to ph_lmcs_aps_id may be less than or equal to the TemporalId of the picture associated with PH.

ph_chroma_residual_scale_flag equal to 1 specifies that chroma residual scaling is enabled for the all slices associated with the PH. ph_chroma_residual_scale_flag equal to 0 specifies that chroma residual scaling may be disabled for one, or more, or all slices associated with the PH. When ph_chroma_residual_scale_flag is not present, it is inferred to be equal to 0.

slice_lmcs_enabled_flag equal to 1 specifies that luma mapping with chroma scaling is enabled for the current slice. slice_lmcs_enabled_flag equal to 0 specifies that luma mapping with chroma scaling is not enabled for the current slice. When slice_lmcs_enabled_flag is not present, it is inferred to be equal to 0.

3.6. Adaptive Motion Vector Difference Resolution (AMVR) for Affine Coded Blocks Affine AMVR is a coding tool that allows an affine inter coded block to transmit the MV differences in different resolutions, such as in the precision of ¼ luma sample (default, with amvr_flag set to 0), 1/16 luma sample, 1 luma sample.

The related syntax elements and semantics in SPS are described as follows:

Syntax Tables
7.3.2.3 Sequence Parameter Set RBSP Syntax

|   | Descriptor |
|---|---|
| seq_parameter_set_rbsp( ) { | |
|   sps_seq_parameter_set_id | u(4) |
|   sps_video_parameter_set_id | u(4) |
|   sps_max_sub_layers_minus1 | u(3) |
|   sps_reserved_zero_4bits | u(4) |
| ... | |
|   sps_affine_enabled_flag | u(1) |
|   if( sps_affine_enabled_flag ) { | |
|     five_minus_max_num_subblock_merge_cand | ue(v) |
|     sps_affine_type_flag | u(1) |
|     if( sps_amvr_enabled_flag ) | |
|       sps_affine_amvr_enabled_flag | u(1) |
|     sps_affine_prof_enabled_flag | u(1) |
|     if( sps_affine_prof_enabled_flag ) | |
|       sps_prof_pic_present_flag | u(1) |
|   } | |
| ... | |
|   sps_lmcs_enabled_flag | u(1) |
|   sps_lfnst_enabled_flag | u(1) |
| ... | |
| } | |

Semantics
sps_affine_amvr_enabled_flag equal to 1 specifies that adaptive motion vector difference resolution is used in motion vector coding of affine inter mode. sps_affine_amvr_enabled_flag equal to 0 specifies that adaptive motion vector difference resolution is not used in motion vector coding of affine inter mode. When not present, the value of sps_affine_amvr_enabled_flag is inferred to be equal to 0.

D.7 Subpicture Level Information SEI Message

D.7.1 Subpicture Level Information SEI Message Syntax

| | Descriptor |
|---|---|
| subpic_level_info( payloadSize ) { | |
|   num_ref_levels_minus1 | u(3) |
|   sli_cbr_constraint_flag | u(1) |
|   explicit_fraction_present_flag | u(1) |
|   if( explicit_fraction_present_flag ) | |
|     sli_num_subpics_minus1 | ue(v) |
|   while( !byte_aligned( ) ) | |
|     sli_alignment_zero_bit | f(1) |
|   for( i = 0; i <= num_ref_levels_minus1; i++ ) { | |
|     ref_level_idc[ i ] | u(8) |
|     if( explicit_fraction_present_flag ) | |
|       for( j = 0; j <= sli_num_subpics_minus1; j++ ) | |
|         ref_level_fraction_minus1[ i ][ j ] | u(8) |
|     } | |
|   } | |
| } | |

D.7.2 Subpicture Level Information SEI Message Semantics

The subpicture level information SEI message contains information about the level that subpicture sequences in the bitstream conform to when testing the conformance of the extracted bitstreams containing the subpicture sequences according to Annex A.

When a subpicture level information SEI message is present for any picture of a CLVS, a subpicture level information SEI message may be present for the first picture of the CLVS. The subpicture level information SEI message persists for the current layer in decoding order from the current picture until the end of the CLVS. All subpicture level information SEI messages that apply to the same CLVS may have the same content. A subpicture sequence consists of all subpictures within a CLVS that have the same value of subpicture index.

For bitstream conformance, when a subpicture level information SEI message is present for a CLVS, the value of subpic_treated_aspic_flag[i] may be equal to 1 for each value of i in the range of 0 to sps_num_subpics_minus1, inclusive.

num_ref_levels_minus1 plus 1 specifies the number of reference levels signalled for each of the sps_num_subpics_minus1+1 subpictures.

sli_cbr_constraint_flag equal to 0 specifies that to decode the sub-bitstreams resulting from extraction of any subpicture of the bitstream according to clause C.7 by using the HRD using any CPB specification in the extracted sub-bitstream, the hypothetical stream scheduler (HSS) operates in an intermittent bit rate mode. sli_cbr_constraint_flag equal to 1 specifies that the HSS operates in a constant bit rate (CBR) mode.

explicit_fraction_present_flag equal to 1 specifies that the syntax elements ref_level_fraction_minus1 [i] are present. explicit_fraction_present_flag equal to 0 specifies that the syntax elements ref_level_fraction_minus1 [i] are not present.

sli_num_subpics_minus1 plus 1 specifies the number of subpictures in the pictures of the CLVS. When present, the value of sli_num_subpics_minus1 may be equal to the value of sps_num_subpics_minus1 in the SPS referred to by the pictures in the CLVS. sli_alignment_zero_bit may be equal to 0.

ref_level_idc[i] indicates a level to which each subpicture conforms as specified in Annex A. Bitstreams may not contain values of ref_level_idc other than those specified in Annex A. Other values of ref_level_idc[i] are reserved for future use by ITU-T ISO/IEC. For bitstream conformance, the value of ref_level_idc[i] may be less than or equal to ref_level_idc[k] for any value of k greater than i.

ref_level_fraction_minus1[i][j] plus 1 specifies the fraction of the level limits associated with ref_level_idc[i] that the j-th subpicture conforms to as specified in clause A.4.1. The variable SubpicSizeY[j] is set equal to (subpic_width_minus1 [j]+1)*CtbSizeY*(subpic_height_minus1 [j]+1)*CtbSizeY When not present, the value of ref_level_fraction_minus1 [i][j] is inferred to be equal to Ceil (256*SubpicSizeY[j]÷PicSizeInSamplesY*MaxLumaPs (general_level_idc)÷MaxLu maPs(ref_level_idc[i])−1.

The variable RefLevelFraction[i][j] is set equal to ref_level_fraction_minus1[i][j]+1. The variables SubpicNumTileCols[j] and SubpicNumTileRows[j] are derived as follows:

```
for( i = 0; i <= sps_num_subpics_minus1; i++) {
  SubpicNumTileCols[ i ] = 1
  SubpicNumTileRows[ i ] = 1
  for( ctbAddrRs = subpic_ctu_top_left_x[ i ]+ 1; ctbAddrRs <=
      sub_pic_ctu_top_left_x[i]+ subpic_width_minus1[ i ];
      ctbAddrRs++ )
    if( CtbToTileColBd[ ctbAddrRs ] != CtbToTileColBd[ ctbAddrRs −
1 ] )
      SubpicNumTileCols[ i ]++                          (D.5)
  for( ctbAddrRs = ( subpic_ctu_top_left_y[ i ] + 1 ) * PicWidthInCtbsY;
      ctbAddrRs <= ( subpic_ctu_top_left_y[ i ] + subpic_height_
minus1[ i ] ) * PicWidthInCtbsY;
      ctbAddrRs += PicWidthInCtbsY )
    if( CtbToTileRowBd[ ctbAddrRs ] !=
CtbToTileRowBd[ ctbAddrRs − PicWidthInCtbsY ] )
      SubpicNumTileRows[ i ]++
}
```

The variables SubpicCpbSizeVcl[i][j] and SubpicCpbSizeNal[i][j] are derived as follows:

$$SubpicCpbSizeVcl[i][j] = \text{Floor}(CpbVclFactor * MaxCPB * RefLevelFraction[i][j] \div 256) \quad (D.6)$$

$$SubpicCpbSizeNal[i][j] = \text{Floor}(CpbNalFactor * MaxCPB * RefLevelFraction[i][j] \div 256) \quad (D.7)$$

with MaxCPB derived from ref_level_idc[i] as specified in clause A.4.2.

The variables SubpicBitRateVcl[i][j] and SubpicBitRateNal[i][j] are derived as follows:

$$SubpicBitRateVcl[i][j] = \text{Floor}(CpbVclFactor * MaxBR * RefLevelFraction[i][j] \div 256) \quad (D.8)$$

$$SubpicBitRateNal[i][j] = \text{Floor}(CpbNalFactor * MaxBR * RefLevelFraction[i][j] \div 256) \quad (D.9)$$

with MaxBR derived from ref_level_idc[i] as specified in clause A.4.2.

NOTE 1—When a subpicture is extracted, the resulting bitstream has a CpbSize (either indicated in the SPS or inferred) that is greater than or equal to SubpicCpbSizeVcl[i][j] and SubpicCpbSizeNal[i][j] and a BitRate (either indicated in the SPS or inferred) that is greater than or equal to SubpicBitRateVcl[i][j] and SubpicBitRateNal[i][j].

For bitstream conformance, the bitstreams resulting from extracting the j-th subpicture for j in the range of 0 to sps_num_subpics_minus1, inclusive, and conforming to a profile with general_tier_flag equal to 0 and level equal to ref_level_idc[i] for i in the range of 0 to num_ref_level_minus1, inclusive, may obey the following constraints for each bitstream conformance test as specified in Annex C:—
- Ceil(256*SubpicSizeY[j]+RefLevelFraction[i][j]) may be less than or equal to MaxLumaPs, where MaxLumaPs is specified in Table A.1 for level ref_level_idc[i].
- The value of Ceil(256*(subpic_width_minus1 [j]+1) *CtbSizeY+RefLevelFraction[i][j]) may be less than or equal to Sqrt(MaxLumaPs*8).
- The value of Ceil(256*(subpic_height_minus1 [j]+1) *CtbSizeY+RefLevelFraction[i][j]) may be less than or equal to Sqrt(MaxLumaPs*8).
- The value of SubpicNumTileCols[j] may be less than or equal to MaxTileCols and of SubpicNumTileRows[j] may be less than or equal to MaxTileRows, where MaxTileCols and MaxTileRows are specified in Table A.1 for level ref_level_idc[i].
- The value of SubpicNumTileCols[j]*SubpicNumTileRows[j] may be less than or equal to MaxTileCols*MaxTileRows*RefLevelFraction[i][j], where MaxTileCols and MaxTileRows are specified in Table A.1 for level ref_level_idc[i].
- The sum of the NumBytesInNalUnit variables for AU 0 corresponding to the j-th subpicture may be less than or equal to FormatCapabilityFactor*(Max(SubpicSizeY [j], fR*MaxLumaSr*RefLevelFraction[i][j]÷256)+ MaxLumaSr*(AuCpbRemovalTime[0]−AuNominalRemovalTime[0])*RefLevelFraction[i][j])+ (256*MinCr) for the value of SubpicSizeInSamplesY of AU 0, where MaxLumaSr and FormatCapabilityFactor are the values specified in Table A.2 and Table A.3, respectively, that apply to AU 0, at level ref_level_idc[i], and MinCr is derived as indicated in A.4.2.
- The sum of the NumBytesInNalUnit variables for AU n (with n greater than 0) corresponding to the j-th subpicture may be less than or equal to FormatCapabilityFactor*MaxLumaSr*(AuCpbRemovalTime[n]AuCpbRemovalTime[n−1])*ReflLevelFraction[i][j] (256*MinCr), where MaxLumaSr and FormatCapabilityFactor are the values specified in Table A.2 and Table A.3 respectively, that apply to AU n, at level ref_level_idc[i], and MinCr is derived as indicated in A.4.2.

For any subpicture set containing one ore more subpictures and consisting of a list of subpicture indices SubpicSetIndices and a number of subpictures in the subpicture set NumSubpicsInSet, the level information of the subpicture set is derived.

The variable SubpicSetAccLevelFraction[i] for the total level fraction with respect to the reference level ref_level_idc[i], and the variables SubpicSetCpbSizeVcl[i], SubpicSetCpbSizeNal[i], SubpicSetBitRateVcl[i], and SubpicSetBitRateNal[i] of the subpicture set, are derived as follows:

```
for (i = 0; i <= num_ref_level_minus1; i ++) {
  SubpicSetAccLevelFraction[ i ] = 0
  SubpicSetCpbSizeVcl[ i ] = 0
  SubpicSetCpbSizeNal[ i ] = 0
  SubpicSetNumTiles[ i ] = 0
  for (j = 0; j < NumSubpicsInSet; j ++) {
    CurrSubpicIdx = SubpicSetIndices[ j ]
    SubpicSetAccLevelFraction[ i ] += RefLevelFraction[ i ]
```

-continued

```
                                                           [ CurrSubpicIdx ]   (D.10)
    SubpicSetCpbSizeVcl[ i ] += SubpicSetCpbSizeVcl[ i ]
      [ CurrSubpicIdx ]
    SubpicSetCpbSizeNal[ i ] += SubpicSetCpbSizeNal[ i ]
      [ CurrSubpicIdx ]
    SubpicSetBitRateVcl[ i ] += SubpicSetBitRateVcl[ i ]
      [ CurrSubpicIdx ]
    SubpicSetBitRateNal[ i ] += SubpicSetBitRateNal[ i ]
      [ CurrSubpicIdx ]
    SubpicSetNumTiles[ i ] += SubpicNumTileCols[ CurrSubpicIdx ] *
      SubpicNumTileRow[ CurrSubpicIdx ]
  }
}
```

The value of the subpicture set sequence level indicator, SubpicSetLevelIdc, is derived as follows:

SubpicSetLevelIdc=general_level_idc for($i$=num_ref_level_minus1;$i$>=0;$i$−−) if (SubpicSetNumTiles[$i$]<=(MaxTileCols*MaxTileRows) && (D.11)

SubpicSetAccLevelFraction[$i$]<=256)

SubpicSetLevelIdc=ref_level_idc[$i$]

where MaxTileCols and MaxTileRows are specified in Table A.1 for ref_level_idc[i]. The subpicture set bitstream conforming to a profile with general_tier_flag equal to 0 and a level equal to SubpicSetLevelIdc may obey the following constraints for each bitstream conformance test as specified in Annex C:
- For the VCL HRD parameters, SubpicSetCpbSizeVcl[i] may be less than or equal to CpbVclFactor*MaxCPB, where CpbVclFactor is specified in Table A.3 and MaxCPB is specified in Table A.1 in units of CpbVclFactor bits.
- For the NAL HRD parameters, SubpicSetCpbSizeNal[i] may be less than or equal to CpbNalFactor*MaxCPB, where CpbNalFactor is specified in Table A.3, and MaxCPB is specified in Table A.1 in units of CpbNalFactor bits.
- For the VCL HRD parameters, SubpicSetBitRateVcl[i] may be less than or equal to CpbVclFactor*MaxBR, where CpbVclFactor is specified in Table A.3 and MaxBR is specified in Table A.1 in units of CpbVclFactor bits.
- For the NAL HRD parameters, SubpicSetBitRateNal[i] may be less than or equal to CpbNalFactor*MaxCR, where CpbNalFactor is specified in Table A.3, and MaxBR is specified in Table A.1 in units of CpbNalFactor bits.
- NOTE 2—When a subpicture set is extracted, the resulting bitstream has a CpbSize (either indicated in the SPS or inferred) that is greater than or equal to SubpicSetCpbSizeVcl[i][j] and SubpicSetCpbSizeNal[i][j] and a BitRate (either indicated in the SPS or inferred) that is greater than or equal to SubpicSetBitRateVcl[i][j] and SubpicSetBitRateNal[i][j].

4. Technical Problems Addressed by Disclosed Technical Solutions

The existing designs for subpictures and LMCS in VVC have the following problems:
1) The derivation of the list SubpicNumTileRows[ ] (specifying the number of tile rows included in a subpicture) is Equation D.5 is incorrect, as the index value idx in CtbToTileRowBd[idx] in the equation can be greater than the greatest allowed value. Furthermore, the deviation of both SubpicNumTileRows[ ] and SubpicNumTileCols[ ] (specifying the number of tile columns included in a subpicture) uses a CTU based operation, which is unnecessarily complicated.

2) The derivation of the array CtbAddrInSlice in Equation 29 when single_slice_per_subpic_flag is equal to 1 is incorrect, as the values of raster scan CTB addresses in the array for each slice needs to be in decoding order of CTUs instead of in raster scan order of CTUs.

3) The LMCS signalling is inefficient. When ph_lmcs_enabled_flag is equal to 1, in most cases LMCS would be enabled for all slices of the picture. However, in the current VVC design, for the case when LMCS is enabled for all slices of a picture, not only ph_lmcs_enabled_flag is equal to 1, the slice_lmcs_enabled_flag with value 1 needs to be signalled for each slice.

a. The semantics of ph_lmcs_enabled_flag is conflicting with the motivation of signalling slice level LMCS flag when ph_lmcs_enabled_flag is true. In current VVC, when ph_lmcs_enabled_flag is true, it means all slices may enable LMCS. Therefore, there is no need to further signal LMCS enabling flags in slice header.

b. In addition, when the picture header tells LMCS is enabled, typically, for all slices, LMCS are all enabled. The controlling of LCMS in slice header is mainly for handling corner cases. Therefore, if the PH LMCS flag is true and SH LMCS flag is always signalled, which may result in unnecessary bits signalled for common user cases.

4) The semantics of the SPS affine AMVR flag is not correct since for each affine inter coded CU, the affine AMVR could be enabled or disabled.

5. Examples of Techniques and Embodiments

To solve the above problems, and some other problems not mentioned, methods as summarized below are disclosed. The items should be considered as examples to explain the general concepts and should not be interpreted in a narrow way. Furthermore, these items can be applied individually or combined in any manner.

Related to Subpictures for Solving the First and Second Problems

1. One or more of the following approaches are disclosed:
  a. The tile column index of each CTU column of a picture is derived.
  b. The derivation of the number of tile columns included in a subpicture is based on the tile column indices of the left-most and/or right-most CTUs included in the subpicture.
  c. The tile row index of each CTU row of a picture is derived.
  d. The derivation of the number of tile rows included in a subpicture is based on the tile row indices of the top and/or bottom CTUs included in the subpicture.
  e. The term picture-level slice index is defined as follows: an index, defined when rect_slice_flag is equal to 1, of a slice to the list of slices in a picture in the order as the slices are signalled in the PPS when single_slice_per_subpic_flag is equal to 0, or in the order increasing subpicture indices of the subpicture corresponding to the slices when single_slice_per_subpic_flag is equal to 1.
  f. In one example, the height of a subpicture may not be counted in terms of tiles when the subpicture contain a slice which is partitioned from a tile.
  g. In one example, the height of a subpicture may be counted in terms of CTUs instead of tiles.
  h. Whether the height of a subpicture is less than one tile row is derived.
    i. In one example, whether the height of a subpicture is less than one tile row is derived to be true when the subpicture only includes CTUs from one tile row and when either the top CTUs in the subpicture are not the top CTUs of the tile row or the bottom CTUs in the subpicture are not the bottom CTUs of the tile row.
    ii. When it is indicated that each subpicture contains only one slice and the height of a subpicture is less than one tile row, for each slice with picture-level slice index i of a picture, the value of CtbAddrInSlice[i][j] for j in the range of 0 to the number of CTUs in the slice minus 1, inclusive, is derived to be the picture raster scan CTU address of the j-th CTU in CTU raster scan of the subpicture.
    iii. In one example, whether the height of a subpicture is less than one tile row is derived to be true when the distance between the top CTUs in the subpicture and the bottom CTUs in the subpicture are less than the height of a tile in terms of CTUs.
    iv. When it is indicated that each subpicture contains only one slice and the height of a subpicture is greater than or equal to one tile row, for each slice with picture-level slice index i of a picture, the value of CtbAddrInSlice[i][j] for j in the range of 0 to the number of CTUs in the slice minus 1, inclusive, is derived to be the picture raster scan CTU address of the j-th CTU in the following order of CTUs:
      1) The CTUs in different tiles in the subpicture are ordered such that a first CTU in a first tile with a less value of tile index goes before a second CTU in a second tile with a greater value of tile index.
      2) The CTUs within one tile in the subpicture are ordered in CTU raster scan of the tile.

Related to LMCS for Solving the Third Problem (Including the Sub-Problems)

2. Two-level control of LMCS (which includes two aspects: luma mapping (reshaping process, denoted by RP) and luma dependent chroma residual scaling (CRS)) is introduced, wherein a higher level (e.g., a picture level) and a lower level (e.g., a slice level) control are used and whether the lower level control information is present is dependent on the high level control information. In addition, the following applies:
  a. In a first example, one or more of the sub-bullets below is applied:
    i. A first indicator (e.g., ph_lmcs_enabled_type) may be signalled at the higher level (e.g., in picture header (PH)) to specify how LMCS is enabled at lower level which is a non-binary value.
      1) In one example, when the first indicator is equal to X (e.g., X=2), it specifies that LMCS is enabled for all slices associated with the PH; when the first indicator is equal to Y (Y!=X) (e.g., Y=1), it specifies that LMCS is enabled for one, or more, but not all slices associated with the PH; when the first indicator is equal to Z (Z!=X and Z!=Y) (e.g., Z=0), it specifies that LMCS is disabled for all slices associated with the PH.

a) Alternatively, furthermore, when the first indicator is not present, the value of the indicator is inferred to be equal to a default value, such as Z.
2) In one example, when the first indicator is equal to X (e.g., X=2), it specifies that LMCS is disabled for all slices associated with the PH; when the first indicator is equal to Y (Y!=X) (e.g., Y=1), it specifies that LMCS is disabled for one, or more, but not all slices associated with the PH; when the first indicator is equal to Z (Z!=X and Z!=Y) (e.g., Z=0), it specifies that LMCS is enabled for all slices associated with the PH.
   a) Alternatively, furthermore, when the first indicator is not present, the value of the indicator is inferred to be equal to a default value, such as X.
3) Alternatively, furthermore, the first indicator may be conditionally signalled according to the value of a LMCS enabling flag in sequence level (e.g., sps_lmcs_enabled_flag).
4) Alternatively, furthermore, the first indicator may be coded with u(v), or u(2) or ue(v).
5) Alternatively, furthermore, the first indicator may be coded with a truncated unary code.
6) Alternatively, furthermore, the LMCS_APS information (e.g., ph_lmcs_aps_id) used by slices and/or CS enabling flag (e.g., ph_chroma_residual_scale_flag) may be signalled under the condition check of the values of the first indicator.
ii. A second indicator of enabling/disabling LMCS for the lower level (e.g., slice_lmcs_enabled_flag) may be signalled at the lower level (e.g., in slice header) and it may be conditionally signalled by checking the value of the first indicator.
   1) In one example, the second indicator may be signalled under the condition check of 'the first indicator is equal to Y'.
      a) Alternatively, the second indicator may be signalled under the condition check of 'the value of first indicator>>1' or 'the value of first indicator/2' or 'the value of first indicator & 0x01'.
      b) Alternatively, furthermore, it may be inferred to be enabled when the first indicator is equal to X; or inferred to be disabled when the first indicator is equal to Z.
b. In a second example, one or more of the sub-bullets below is applied:
   i. More than one indicator may be signalled at the higher level (e.g., in picture header (PH)) to specify how LMCS is enabled at lower level which is a non-binary value.
      1) In one example, two indicators may be signalled in PH.
         a) In one example, a first indicator specifies whether there is at least one slice associated with the PH that enables LMCS. And second indicator specifies whether all slices associated with the PH enable LMCS.
            i. Alternatively, furthermore, the second indicator may be conditionally signalled according to the value of the first indicator, e.g., when the first indicator specifies there is at least one slice that enables LMCS.
               i. Alternatively, furthermore, when the second indicator is not present, it is inferred that all slices enable LMCS.
               ii. Alternatively, furthermore, a third indicator may be conditionally signalled in SH according to the value of the second indicator, e.g., when the second indicator specifies that not all of slices enable LMCS.
                  i. Alternatively, furthermore, when the third indicator is not present, it may be inferred according to the value of the first and/or second indicator (e.g., inferred to be equal to the value of the first indicator).
         b) Alternatively, a first indicator specifies whether there is at least one slice associated with the PH that disable LMCS. And a second indicator specifies whether all slices associated with the PH disable LMCS.
            i. Alternatively, furthermore, the second indicator may be conditionally signalled according to the value of the first indicator, e.g., when the first indicator specifies there is at least one slice that disable LMCS.
               i. Alternatively, furthermore, when the second indicator is not present, it is inferred that all slices associated with the PH disable LMCS.
               ii. Alternatively, furthermore, a third indicator may be conditionally signalled in SH according to the value of the second indicator, e.g., when the second indicator specifies that not all of slices disable LMCS.
                  i. Alternatively, furthermore, when the third indicator is not present, it may be inferred according to the value of the first and/or second indicator (e.g., inferred to be equal to the value of the first indicator).
      2) Alternatively, furthermore, the first indicator may be conditionally signalled according to the value of a LMCS enabling flag in sequence level (e.g., sps_lmcs_enabled_flag).
      ii. A third indicator of enabling/disabling LMCS for the lower level (e.g., slice_lmcs_enabled_flag) may be signalled at the lower level (e.g., in slice header) and it may be conditionally signalled by checking the value of the first indicator and/or second indicator.
         1) In one example, the third indicator may be signalled under the condition check of 'not all slices enable LMCS' or 'not all slices disable LMCS'.
   c. In yet another example, the first and/or second and/or third indicator mentioned in the first/second example may be used to control the usage of RP or CRS instead of LMCS.
3. The semantics of the three LMCS flags in the SPS/PH/SH are updated as follows:
   sps_lmcs_enabled_flag equal to 1 specifies that luma mapping with chroma scaling [[is used]] may be used in the CLVS. sps_lmcs_enabled_flag equal to 0 specifies that luma mapping with chroma scaling is not used in the CLVS.
   ph_lmcs_enabled_flag equal to 1 specifies that luma mapping with chroma scaling [[is enabled]] may be used for all slices associated with the PH. ph_lmcs_enabled_flag equal to 0 specifies that luma mapping with chroma scaling [[may be disabled for one, or more, or]] are not used for all slices associated with the PH. When not present, the value of ph_lmcs_enabled_flag is inferred to be equal to 0.
   slice_lmcs_enabled_flag equal to 1 specifies that luma mapping with chroma scaling is [[enabled]] used for the current slice. slice_lmcs_enabled_flag equal to 0 specifies that luma mapping with chroma scaling is not [[enabled]] used for the current slice. When slice_lmcs_enabled_flag is not present, it is inferred to be equal to 0.
  a. The PH and/or SH LMCS signalling is changed such that when LMCS is used for all slices of the picture, no LMCS signalling is present in the SH.
    i. Alternatively, furthermore, how the LMCS is inferred depend on the PH LMCS signalling.
      1) In one example, it is inferred to be enabled when LMCS is used for all slices of the picture; and it is inferred to be disabled when LMCS is not used for all slices of the picture.

Related to Affine AMVR
4. The semantics of the Affine AMVR flag in the SPS are updated as follows:
  sps_affine_amvr_enabled_flag equal to 1 specifies that adaptive motion vector difference resolution may be used in motion vector coding of affine inter mode.
  sps_affine_amvr_enabled_flag equal to 0 specifies that adaptive motion vector difference resolution is not used in motion vector coding of affine inter mode. When not present, the value of sps_affine_amvr_enabled_flag is inferred to be equal to 0.

6. Embodiments

6.1. Embodiment 1: Support of Subpictures

This embodiment is for item 1 and its sub-items.

3 Definitions

*picture-level slice index: An index, defined when rect_slice_flag is equal to 1, of a slice to the list of slices in a picture in the order as the slices are signalled in the PPS when single_slice_per_subpic_flag is equal to 0, or in the order increasing subpicture indices of the subpicture corresponding to the slices when single_ slice_per_subpic_ _flag is equal to 1.*

[[picture-level slice index: An index of a slice to the list of slices in a picture in the order as they are signalled in the PPS when the rect_slice_flag is equal to 1.]]

6.5.1 CTB Raster Scanning, Tile Scanning, and Subpicture Scanning Processes

. . .

The lists CtbToTileColBd[ctbAddrX] *and ctbToTileColIdx[ ctbAddrX ]* for ctbAddrX ranging from 0 to PicWidthInCtbsY, inclusive, specifying the conversion from a horizontal CTB address to a left tile column boundary in units of CTBs *and to a tile column index, respectively, are* derived as follows:

```
tileX = 0
for( ctbAddrX = 0; ctbAddrX <= PicWidthInCtbsY; ctbAddrX++ ) {
  if( ctbAddrX = = tileColBd[ tileX + 1 ] )
    (27)
    tileX++
  CtbToTileColBd[ ctbAddrX ] = tileColBd[ tileX ]
  ctbToTileColIdx[ ctbAddrX ] = tileX
}
```

NOTE 3—The size of the *arrays* CtbToTileColBd[ ] *and ctbToTileColIdx[ ]* in the above derivation *are* one greater than the actual picture width in CTBs.

The lists CtbToTileRowBd[ctbAddrY] *and ctbToTileRowIdx[ ctbAddrY ]* for ctbAddrY ranging from 0 to PicHeightInCtbsY, inclusive, specifying the conversion from a vertical CTB address to a top tile column boundary in units of CTBs *and to a tile row index, respectively, are* derived as follows:

```
tileY = 0
for( ctbAddrY = 0; ctbAddrY <= PicHeightInCtbsY; ctbAddrY++ ) {
  if( ctbAddrY = = tileRowBd[ tileY + 1 ] )
    (28)
    tileY++
  CtbToTileRowBd[ ctbAddrY ] = tileRowBd[ tileY ]
  ctbToTileRowIdx[ctbAddrY]=tileY
}
```

NOTE 4—The sizes of the arrays CtbToTileRowBd[ ] *and ctbTo TileRowIdx[ ]* in the above derivation are one greater than the actual picture height in CTBs.

*The lists SubpicWidthInTiles[ i ] and Subpic HeightInTiles[ i ], for i ranging from 0 to sps_num_subpics_ minus1,inclusive,specifying the width and the height of the i-th subpicture in tile columns and rows, respectively, and the list subpicHeightLess ThanOneTile Flag[ i ], for i ranging from 0 to sps_num_subpics_ minus1,inclusive,specifying whether the height of the i-th subpicture is less than one tile row,are derived as follows:*
```
for( i = 0; i <= sps_num_subpics_minus1; i++ ) {
  leftX = subpic_ctu_top_left_x[ i ]
  rightX=leftX +subpic_width_minus1[i]
  SubpicWidthInTiles[i]=ctbToTileColIdx[ rightX]+1-ctbToTileColIdx[ leftx](29)
  topY=subpic_ctu_top_left_y[i]
  bottomY=topY +subpic_height_minus1[i]
  SubpicHeightInTiles[ i ] =
     ctbToTileRowIdx[ bottomY ] + 1– ctbToTileRowIdx[ topY ]
  if( SubpicHeightInTiles[ i ] = = 1 && bottomY + 1 - topY <
     RowHeight[ ctbToTileRow Idx[ topY ] ] )
       subpicHeightLessThanOneTile Flag[ i ] = 1
}
```
*Alternatively, in the above equation,the following condition:*
   *if( SubpicHeightInTiles[ i ] = = 1 && ( bottomY + 1 - topY <*
   *RowHeight[ ctbToTileRow Idx[ topY ] ] )*
*May be changed to be as follows:*
   *if( SubpicHeightInTiles[ i ] = = 1 && ( topY != CtbToTileRowBd[ topY ] ||*
      *bottomY + 1 != CtbToTileRowBd[ bottomY + 1 ] )*
*NOTE 5 - When a tile is partitioned into multiple rectangular slices and only a subset of the rectangular slices of the tile is included in the i-th subpicture,the tile is counted as one tile in the value of SubpicHeightInTiles[ i ].*

When rect_slice_flag is equal to 1, the list NumCtusInSlice[i] for i ranging from 0 to num_slices_in_pic_minus1, inclusive, specifying the number of CTUs in the i-th slice, the list SliceTopLeftTileIdx[i] for i ranging from 0 to num_slices_in_pic_minus1, inclusive, specifying the tile index of the tile containing the first CTU in the slice, and the matrix CtbAddrInSlice[i][j] for i ranging from 0 to num_slices_in_pic_minus1, inclusive, and j ranging from 0 to NumCtusInSlice[i]−1, inclusive, specifying the picture raster scan address of the j-th CTB within the i-th slice, and the variable NumSlicesInTile[i], specifying the number of slices in the tile containing the i-th slice, are derived as follows:

```
if( single_slice_per_subpic_flag ) {
    for( i = 0; i <=sps_num_subpics_minus1; i++) {
        NumCtusInSlice[ i ] = 0
        if( subpicHeightLessThanOneTileFlag[ i ] )/* The slice consists of a number of CTU rows in a tile. */
            AddCtbsToSlice( i, subpic_ctu_top_left_x[ i ],
                subpic_ctu_top_left_x[ i ] + subpic_width_minus1[ i ] + 1,
    subpic_ctu_top_left_y[ i ],
                subpic_ctu_top_left_y[ i ] + subpic_height_minus1[ i ] + 1 )
        else{ /* The slice consists of a number of complete tiles covering a rectangular region. */
            tileX = CtbToTileColBd[ subpic_ctu_top_left_x[ i ] ]
            tileY = CtbToTileRowBd[ subpic_ctu_top_left_y[ i ] ]
            for( j = 0; j < SubpicHeightInTiles[ i ]; j++ )
                for( k = 0; k < SubpicWidthInTiles[ i ]; k++ )
                    AddCtbsToSlice( i, tileColBd[ tileX + k ], tileColBd[ tileX + k + 1 ],
                        tileRowBd[ tileY + j ],  tileRowBd[ tileY + j + 1 ] )
        }
    }
[[ for( i = 0; i <= sps_num_subpics_minus1; i++ )
        NumCtusInSlice[ i ] = 0
    for( i = 0; i < PicSizeInCtbsY; i ++ ) {
        sliceIdx = subpic_info_present_flag ? CtbToSubpicIdx[ i ] : 0
        CtbAddrInSlice[ sliceIdx ][ NumCtusInSlice[ sliceIdx ] ] = i
        NumCtusInSlice[ sliceIdx ]++
    }]]
} else {
    tileIdx = 0
    for( i = 0; i <= num_slices_in_pic_minus1; i++ )
        NumCtusInSlice[ i ] = 0
    for( i = 0; i <= num_slices_in_pic_minus1; i++ ) {
        SliceTopLeftTileIdx[ i ] = tileIdx
        tileX = tileIdx % NumTileColumns
        tileY = tileIdx / NumTileColumns
        if( i < num_slices_in_pic_minus1 ) {
            sliceWidthInTiles[ i ] = slice_width_in_tiles_minus1[ i ] + 1
            sliceHeightInTiles[ i ] = slice_height_in_tiles_minus1[ i ] + 1
        } else {
            sliceWidthInTiles[ i ] = NumTileColumns − tileX
            sliceHeightInTiles[ i ] = NumTileRows − tileY
            NumSlicesInTile[ i ] = 1
        }
        if( slicWidthInTiles[ i ] = = 1 && sliceHeightInTiles[ i ] = = 1 ) {(30)
            if( num_exp_slices_in_tile[ i ] = = 0 ) {
                NumSlicesInTile[ i ] = 1
                sliceHeightInCtus[ i ] = RowHeight[ SliceTopLeftTileIdx[ i ] / NumTileColumns ]
            } else {
                remainingHeightInCtbsY = RowHeight[ SliceTopLeftTileIdx[ i ] / NumTileColumns ]
                for( j = 0; j < num_exp_slices_in_tile[ i ] − 1; j++ ) {
                    sliceHeightInCtus[ i + j ] = exp_slice_height_in_ctus_minus1[ i ][ j ] + 1
                    remainingHeightInCtbsY −= sliceHeightInCtus[ i + j ]
                }
                uniformSliceHeight = exp_slice_height_in_ctus_minus1[ i ][ j ] + 1
                while( remainingHeightInCtbsY >= uniformSliceHeight) {
                    sliceHeightInCtus[ i + j ] = uniformSliceHeight
                    remainingHeightInCtbsY −= uniformSliceHeight
                    j++
                }
                if( remainingHeightInCtbsY > 0 ) {
                    sliceHeightInCtus[ i + j ] = remainingHeightInCtbsY
                    j++
                }
                NumSlicesInTile[ i ] = j
            }
            ctbY = tileRowBd[ tileY ]
            for( j = 0; j < NumSlicesInTile[ i ]; j++ ) {
                AddCtbsToSlice( i, tileColBd[ tileX ], tileColBd[ tileX + 1 ],
                    ctbY, ctbY + sliceHeightInCtus[ i ] )
                ctbY += sliceHeightInCtus[ i ]
                if( j < NumSlicesInTile[ i ] − 1 )
```

```
            i++
        }
    } else
        for( j = 0; j < sliceHeightInTiles[ i ]; j++ )
            for( k = 0; k < sliceWidthInTiles[ i ]; k++ )
                AddCtbsToSlice( i, tileColBd[ tileX + k ], tileColBd[ tileX + k + 1 ]
                    tileRowBd[ tileY + j ], tileRowBd[ tileY + j + 1 ] )
    if( i < num_slices_in_pic_minus1 ) {
        if( tile_idx_delta_present_flag )
            tileIdx += tile_idx_delta[ i ]
        else {
            tileIdx += sliceWidthInTiles[ i ]
            if( tileIdx % NumTileColumns = = 0 )
                tileIdx += ( sliceHeightInTiles[ i ] - 1 ) * NumTileColumns
        }
    }
  }
}
. . . .
```

D.7.2 Subpicture Level Information SEI Message Semantics

. . .

ref_level_fraction_minus1[i][j] plus 1 specifies the fraction of the level limits associated with ref_level_idc[i] that the j-th subpicture conforms to as specified in clause A.4.1. The variable SubpicSizeY[j] is set equal to (subpic_width_minus1 [j]+1)*CtbSizeY*(subpic_height_minus1[j]+1)*CtbSizeY When not present, the value of ref_level_fraction_minus1 [i][j] is inferred to be equal to Ceil (256*SubpicSizeY[j]÷PicSizeInSamplesY*MaxLumaPs (general_level_idc)÷MaxLu maPs(ref_level_idc[i])−1.

The variable RefLevelFraction[i][j] is set equal to ref_level_fraction_minus1[i][j]+1. [[The variables SubpicNumTileCols[j] and SubpicNumTileRows[j] are derived as follows:

```
for( i = 0; i <= sps_num_subpics_minus1; i++) {
    SubpicNumTileCols[ i ] = 1
    SubpicNumTileRows[ i ] = 1
    for( ctbAddrRs = subpic_ctu_top_left_x[ i ] + 1; ctbAddrRs <=
            subpic_ctu_top_left_x[ i ] + subpic_width_minus1[ i ]; ctbAddrRs++ )
        if( CtbToTileColBd[ ctbAddrRs ] != CtbToTileColBd[ ctbAddrRs - 1 ] )
            SubpicNumTileCols[ i ]++                                          (D.5)
    for( ctbAddrRs = ( subpic_ctu_top_left_y[ i ] + 1 ) * PicWidthInCtbsY;
            ctbAddrRs <= ( subpic_ctu_top_left_y[ i ] + subpic_height_minus1[ i ]
        ) * PicWidthInCtbsY;
        ctbAddrRs += PicWidthInCtbsY )
        if( CtbToTileRowBd[ ctbAddrRs ] !=
CtbToTileRowBd[ ctbAddrRs - PicWidthInCtbsY ] )
            SubpicNumTileRows[ i ]++
}]]
```

. . .

The value of SubpicWidthInTiles [j] may be less than or equal to MaxTileCols and of SubpicHeightInTiles [j] may be less than or equal to MaxTileRows, where MaxTileCols and MaxTileRows are specified in Table A.1 for level ref_level_idc[i].

The value of SubpicWidthInTiles [j]* SubpicHeightInTiles [j] may be less than or equal to MaxTileCols*MaxTileRows*RefLevelFraction[i][j], where MaxTileCols and MaxTileRows are specified in Table A.1 for level ref_level_idc[i].

The variable SubpicSetAccLevelFraction[i] for the total level fraction with respect to the reference level ref_level_idc[i], and the variables SubpicSetCpbSizeVcl[i], SubpicSetCpbSizeNal[i], SubpicSetBitRateVcl[i], and SubpicSetBitRateNal[i] of the subpicture set, are derived as follows:

```
for (i = 0; i <= num_ref_level_minus1; i ++) {
    SubpicSetAccLevelFraction[ i ] = 0
    SubpicSetCpbSizeVcl[ i ] = 0
    SubpicSetCpbSizeNal[ i ] = 0
    SubpicSetNumTiles[ i ] = 0
```

-continued

```
    for (j = 0; j < NumSubpicsInSet; j ++) {
      CurrSubpicIdx = SubpicSetIndices[ j ]
      SubpicSetAccLevelFraction[ i ] += RefLevelFraction[ i ][ CurrSubpicIdx ]   (D.10)
      SubpicSetCpbSizeVcl[ i ] += SubpicSetCpbSizeVcl[ i ][ CurrSubpicIdx ]
      SubpicSetCpbSizeNal[ i ] += SubpicSetCpbSizeNal[ i ][ CurrSubpicIdx ]
      SubpicSetBitRateVcl[ i ] += SubpicSetBitRateVcl[ i ][ CurrSubpicIdx ]
      SubpicSetBitRateNal[ i ] += SubpicSetBitRateNal[ i ][ CurrSubpicIdx ]
      SubpicSetNumTiles[ i ] += SubpicWidthInTiles[ CurrSubpicIdx ] *
        SubpicHeightInTiles[ CurrSubpicIdx ]
    }
  }
...
```

6.2. Embodiment 2: Support of LMCS

In this embodiment, the syntax and semantics of LMCS related syntax elements in picture header are modified, such that when LMCS is used for all slices of the picture, no LMCS signalling is present in the SH.

7.3.2.7 Picture Header Structure Syntax

| | Descriptor |
|---|---|
| picture_header_structure( ) { | |
|   gdr_or_irap_pic_flag | u(1) |
|   if( gdr_or_irap_pic_flag ) | |
|     gdr_pic_flag | u(1) |
|   ph_inter_slice_allowed_flag | u(1) |
|   if( ph_inter_slice_allowed_flag ) | |
|     ph_intra_slice_allowed_flag | u(1) |
|   non_reference_picture_flag | u(1) |
|   ph_pic_parameter_set_id | ue(v) |
|   ph_pic_order_cnt_lsb | u(v) |
|   if( gdr_or_irap_pic_flag ) | |
|     no_output_of_prior_pics_flag | u(1) |
|   if( gdr_pic_flag ) | |
|     recovery_poc_cnt | ue(v) |
|   for( i = 0; i < NumExtraPhBits; i++ ) | |
|     ph_extra_bit[ i ] | u(1) |
|   if( sps_poc_msb_flag) { | |
|     ph_poc_msb_present_flag | u(1) |
|     if( ph_poc_msb present_flag ) | |
|       poc_msb_val | u(v) |
|   } | |
|   if( sps_alf_enabled_flag && alf_info_in_ph_flag ) { | |
| ... | |
|   } | |
|   if( sps_lmcs_enabled_flag ) { | |
|     [[ph_lmcs_enabled_flag ]] ph_lmcs_enabled_type | [[u(1)]] u(2) |
|     ph_lmcs_aps_id | |
|     if( [[ph_lmcs_enabled_flag]] ph_lmcs_enabled_type ) { | |
|       ph_lmcs_aps_id | u(2) |
|       if( ChromaArrayType != 0 ) | |
|         ph_chroma_residual_scale_flag | u(1) |
|     } | |
|   } | |
|   if( picture_header_extension_present_flag ) { | |
| ... | |
|     ph_extension_length | ue(v) |
|     for( i = 0; i < ph_extension_length; i++ ) | |
|       ph_extension_data_byte[ i ] | u(8) |
|   } | |
| } | |

7.3.7.1 General Slice Header Syntax

| | Descriptor |
|---|---|
| slice_header( ) { | |
|   picture_header_in_slice_header_flag | u(1) |
|   slice_ts_residual_coding_disabled_flag | u(1) |
|   if([[ph_lmcs_enabled_flag]] ph_lmcs_enabled_type == N ) | |

| | Descriptor |
|---|---|
|     slice_lmcs_enabled_flag | u(1) |
|   if( pic_scaling_list_enabled_flag ) | |
|     slice_scaling_list_present_flag | u(1) |
| ... | |
| } | | ph_lmcs_enabled_type[[flag]] equal to M (e.g., M=1)[[1]] specifies that luma mapping with chroma scaling is enabled for all slices associated with the PH. ph_lmcs_enabled _flag equal to N (e.g., N=2) specifies that luma mapping with chroma scaling is eanbled for at least one slice and disabled for at lease one slice associated with the PH. . ph_lmcs_enabled_flag equal to 0 specifies that luma mapping with chroma scaling [[may be disabled for one, or more, or]] is disabled for all slices associated with the PH. When not present, the value of ph_lmcs_enabled_flag is inferred to be equal to 0.

slice_lmcs_enabled_flag equal to 1 specifies that luma mapping with chroma scaling is enabled for the current slice. slice_lmcs_enabled_flag equal to 0 specifies that luma mapping with chroma scaling is not enabled for the current slice. When slice_lmcs_enabled_flag is not present, it is inferred to be equal to [[0]] (ph_lmcs_ enabled_type ? 1 : 0).

Figure 5:
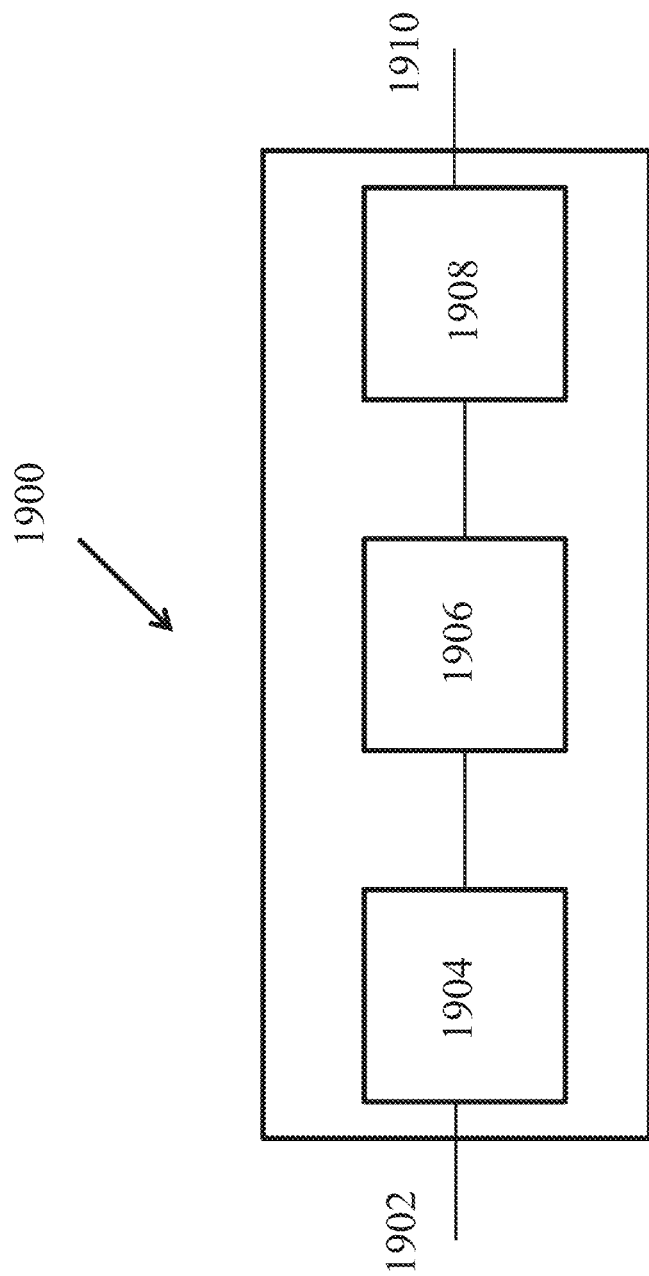
FIG. 5 is a block diagram of an example video processing system.

In above examples, the values of M and N may be set to 1 and 2, respectively. Alternatively, the values of M and N may be set to 2 and 1, respectively FIG. 5 is a block diagram showing an example video processing system 1900 in which various techniques disclosed herein may be implemented. Various implementations may include some or all of the components of the system 1900. The system 1900 may include input 1902 for receiving video content. The video content may be received in a raw or uncompressed format, e.g., 8 or 10 bit multi-component pixel values, or may be in a compressed or encoded format. The input 1902 may represent a network interface, a peripheral bus interface, or a storage interface. Examples of network interface include wired interfaces such as Ethernet, passive optical network (PON), etc. and wireless interfaces such as Wi-Fi or cellular interfaces.

The system 1900 may include a coding component 1904 that may implement the various coding or encoding methods described in the present document. The coding component 1904 may reduce the average bitrate of video from the input 1902 to the output of the coding component 1904 to produce a coded representation of the video. The coding techniques are therefore sometimes called video compression or video transcoding techniques. The output of the coding component 1904 may be either stored, or transmitted via a communication connected, as represented by the component 1906.

The stored or communicated bitstream (or coded) representation of the video received at the input 1902 may be used by the component 1908 for generating pixel values or displayable video that is sent to a display interface 1910. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include serial advanced technology attachment (SATA), peripheral component interconnect (PCI), integrated drive electronics (IDE) interface, and the like. The techniques described in the present document may be embodied in various electronic devices such as mobile phones, laptops, smartphones or other devices that are capable of performing digital data processing and/or video display.

Figure 6:
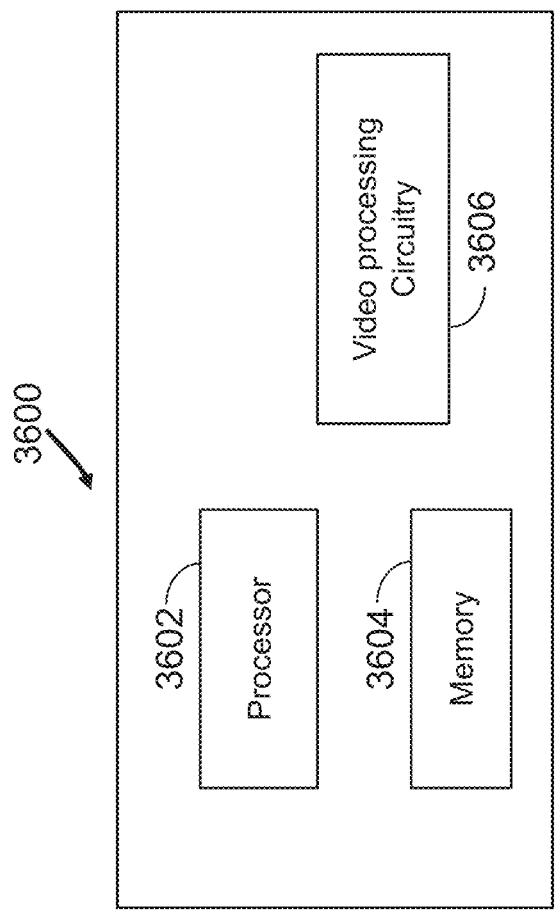
FIG. 6 is a block diagram of a video processing apparatus.

FIG. 6 is a block diagram of a video processing apparatus 3600. The apparatus 3600 may be used to implement one or more of the methods described herein. The apparatus 3600 may be embodied in a smartphone, tablet, computer, Internet of Things (IoT) receiver, and so on. The apparatus 3600 may include one or more processors 3602, one or more memories 3604 and video processing hardware 3606. The processor(s) 3602 may be configured to implement one or more methods described in the present document. The memory (memories) 3604 may be used for storing data and code used for implementing the methods and techniques described herein. The video processing hardware 3606 may be used to implement, in hardware circuitry, some techniques described in the present document.

Figure 8:
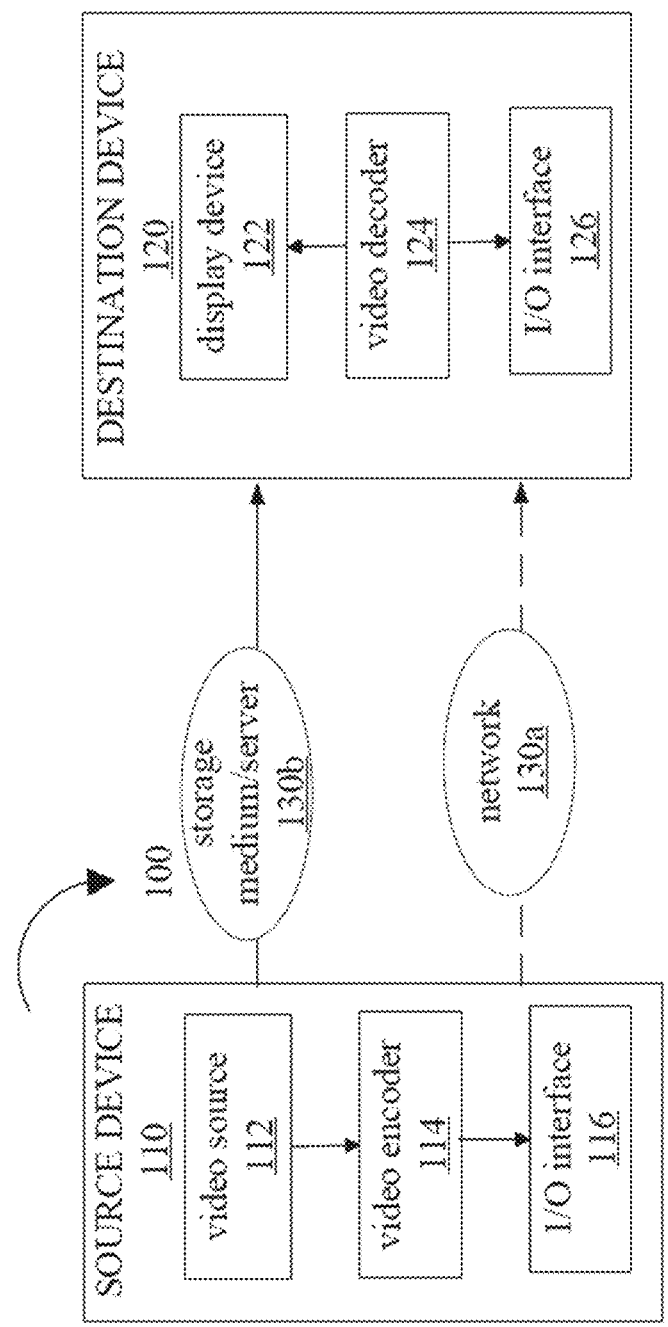
FIG. 8 is a block diagram that illustrates a video coding system according to various embodiments of the present disclosure.

FIG. 8 is a block diagram that illustrates an example video coding system 100 that may utilize the techniques of this disclosure.

As shown in FIG. 8, video coding system 100 may include a source device 110 and a destination device 120. Source device 110 generates encoded video data which may be referred to as a video encoding device. Destination device 120 may decode the encoded video data generated by source device 110 which may be referred to as a video decoding device.

Source device 110 may include a video source 112, a video encoder 114, and an input/output (I/O) interface 116.

Video source 112 may include a source such as a video capture device, an interface to receive video data from a video content provider, and/or a computer graphics system for generating video data, or a combination of such sources. The video data may comprise one or more pictures. Video encoder 114 encodes the video data from video source 112 to generate a bitstream. The bitstream may include a sequence of bits that form a coded representation of the video data. The bitstream may include coded pictures and associated data. The coded picture is a coded representation of a picture. The associated data may include sequence parameter sets, picture parameter sets, and other syntax structures. I/O interface 116 may include a modulator/demodulator (modem) and/or a transmitter. The encoded video data may be transmitted directly to destination device 120 via I/O interface 116 through network 130a. The encoded video data may also be stored onto a storage medium/server 130b for access by destination device 120.

Destination device 120 may include an I/O interface 126, a video decoder 124, and a display device 122.

I/O interface 126 may include a receiver and/or a modem. I/O interface 126 may acquire encoded video data from the source device 110 or the storage medium/server 130b. Video decoder 124 may decode the encoded video data. Display device 122 may display the decoded video data to a user. Display device 122 may be integrated with the destination device 120, or may be external to destination device 120 which may be configured to interface with an external display device.

Video encoder 114 and video decoder 124 may operate according to a video compression standard, such as the High Efficiency Video Coding (HEVC) standard, Versatile Video Coding (VVM) standard and other current and/or further standards.

Figure 9:
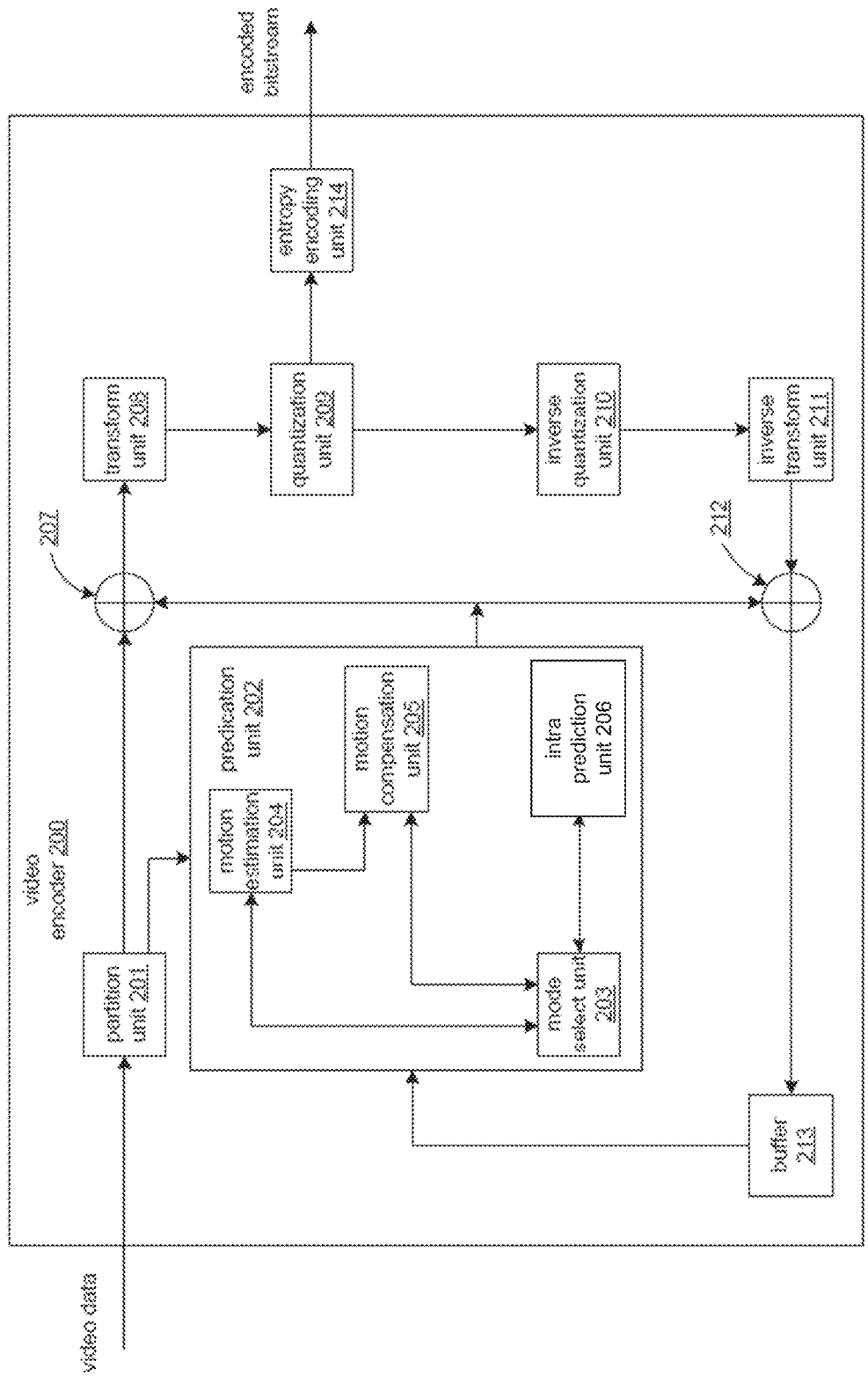
FIG. 9 is a block diagram that illustrates an encoder according to various embodiments of the present disclosure.

FIG. 9 is a block diagram illustrating an example of video encoder 200, which may be video encoder 114 in the system 100 illustrated in FIG. 8.

Video encoder 200 may be configured to perform any or all of the techniques of this disclosure. In the example of FIG. 9, video encoder 200 includes a plurality of functional components. The techniques described in this disclosure may be shared among the various components of video encoder 200. In some examples, a processor may be configured to perform any or all of the techniques described in this disclosure.

The functional components of video encoder 200 may include a partition unit 201, a predication unit 202 which may include a mode select unit 203, a motion estimation unit 204, a motion compensation unit 205, an intra prediction unit 206, a residual generation unit 207, a transform unit 208, a quantization unit 209, an inverse quantization unit 210, an inverse transform unit 211, a reconstruction unit 212, a buffer 213, and an entropy encoding unit 214.

In other examples, video encoder 200 may include more, fewer, or different functional components. In an example, predication unit 202 may include an intra block copy (IBC) unit. The IBC unit may perform predication in an IBC mode in which at least one reference picture is a picture where the current video block is located.

Furthermore, some components, such as motion estimation unit 204 and motion compensation unit 205 may be highly integrated, but are represented in the example of FIG. 9 separately for purposes of explanation.

Partition unit 201 may partition a picture into one or more video blocks. Video encoder 200 and video decoder 300 may support various video block sizes.

Mode select unit 203 may select one of the coding modes, intra or inter, e.g., based on error results, and provide the resulting intra- or inter-coded block to a residual generation unit 207 to generate residual block data and to a reconstruction unit 212 to reconstruct the encoded block for use as a reference picture. In some examples, the mode select unit 203 may select a combination of intra and inter predication (CIIP) mode in which the predication is based on an inter predication signal and an intra predication signal. Mode select unit 203 may also select a resolution for a motion vector (e.g., a sub-pixel or integer pixel precision) for the block in the case of inter predication.

To perform inter prediction on a current video block, motion estimation unit 204 may generate motion information for the current video block by comparing one or more reference frames from buffer 213 to the current video block. Motion compensation unit 205 may determine a predicted video block for the current video block based on the motion information and decoded samples of pictures from buffer 213 other than the picture associated with the current video block.

Motion estimation unit 204 and motion compensation unit 205 may perform different operations for a current video block, for example, depending on whether the current video block is in an I slice, a P slice, or a B slice.

In some examples, motion estimation unit 204 may perform uni-directional prediction for the current video block, and motion estimation unit 204 may search reference pictures of list 0 or list 1 for a reference video block for the current video block. Motion estimation unit 204 may then generate a reference index that indicates the reference picture in list 0 or list 1 that contains the reference video block and a motion vector that indicates a spatial displacement between the current video block and the reference video block. Motion estimation unit 204 may output the reference index, a prediction direction indicator, and the motion vector as the motion information of the current video block. Motion compensation unit 205 may generate the predicted video block of the current block based on the reference video block indicated by the motion information of the current video block.

In other examples, motion estimation unit 204 may perform bi-directional prediction for the current video block, motion estimation unit 204 may search the reference pictures in list 0 for a reference video block for the current video block and may also search the reference pictures in list 1 for another reference video block for the current video block. Motion estimation unit 204 may then generate reference indexes that indicate the reference pictures in list 0 and list 1 containing the reference video blocks and motion vectors that indicate spatial displacements between the reference video blocks and the current video block. Motion estimation unit 204 may output the reference indexes and the motion vectors of the current video block as the motion information of the current video block. Motion compensation unit 205 may generate the predicted video block of the current video block based on the reference video blocks indicated by the motion information of the current video block.

In some examples, motion estimation unit 204 may output a full set of motion information for decoding processing of a decoder.

In some examples, motion estimation unit 204 may not output a full set of motion information for the current video. Rather, motion estimation unit 204 may signal the motion information of the current video block with reference to the motion information of another video block. For example, motion estimation unit 204 may determine that the motion information of the current video block is sufficiently similar to the motion information of a neighboring video block.

In one example, motion estimation unit 204 may indicate, in a syntax structure associated with the current video block, a value that indicates to the video decoder 300 that the current video block has the same motion information as the other video block.

In another example, motion estimation unit 204 may identify, in a syntax structure associated with the current video block, another video block and a motion vector difference (MVD). The motion vector difference indicates a difference between the motion vector of the current video block and the motion vector of the indicated video block. The video decoder 300 may use the motion vector of the indicated video block and the motion vector difference to determine the motion vector of the current video block.

As discussed above, video encoder 200 may predictively signal the motion vector. Two examples of predictive signalling techniques that may be implemented by video encoder 200 include advanced motion vector predication (AMVP) and merge mode signalling.

Intra prediction unit 206 may perform intra prediction on the current video block. When intra prediction unit 206 performs intra prediction on the current video block, intra prediction unit 206 may generate prediction data for the current video block based on decoded samples of other video blocks in the same picture. The prediction data for the current video block may include a predicted video block and various syntax elements.

Residual generation unit 207 may generate residual data for the current video block by subtracting (e.g., indicated by the minus sign) the predicted video block(s) of the current video block from the current video block. The residual data of the current video block may include residual video blocks that correspond to different sample components of the samples in the current video block.

In other examples, there may be no residual data for the current video block for the current video block, for example in a skip mode, and residual generation unit 207 may not perform the subtracting operation.

Transform processing unit 208 may generate one or more transform coefficient video blocks for the current video block by applying one or more transforms to a residual video block associated with the current video block.

After transform processing unit 208 generates a transform coefficient video block associated with the current video block, quantization unit 209 may quantize the transform coefficient video block associated with the current video block based on one or more quantization parameter (QP) values associated with the current video block.

Inverse quantization unit 210 and inverse transform unit 211 may apply inverse quantization and inverse transforms to the transform coefficient video block, respectively, to reconstruct a residual video block from the transform coefficient video block. Reconstruction unit 212 may add the reconstructed residual video block to corresponding samples from one or more predicted video blocks generated by the predication unit 202 to produce a reconstructed video block associated with the current block for storage in the buffer 213.

After reconstruction unit 212 reconstructs the video block, loop filtering operation may be performed to reduce video blocking artifacts in the video block.

Entropy encoding unit 214 may receive data from other functional components of the video encoder 200. When entropy encoding unit 214 receives the data, entropy encoding unit 214 may perform one or more entropy encoding operations to generate entropy encoded data and output a bitstream that includes the entropy encoded data.

Some embodiments of the disclosed technology include making a decision or determination to enable a video processing tool or mode. In an example, when the video processing tool or mode is enabled, the encoder will use or implement the tool or mode in the processing of a block of video, but may not necessarily modify the resulting bitstream based on the usage of the tool or mode. That is, a conversion from the block of video to the bitstream (or the bitstream representation) of the video will use the video processing tool or mode when it is enabled based on the decision or determination. In another example, when the video processing tool or mode is enabled, the decoder will process the bitstream with the knowledge that the bitstream has been modified based on the video processing tool or mode. That is, a conversion from the bitstream of the video to the block of video will be performed using the video processing tool or mode that was enabled based on the decision or determination.

Figure 10:
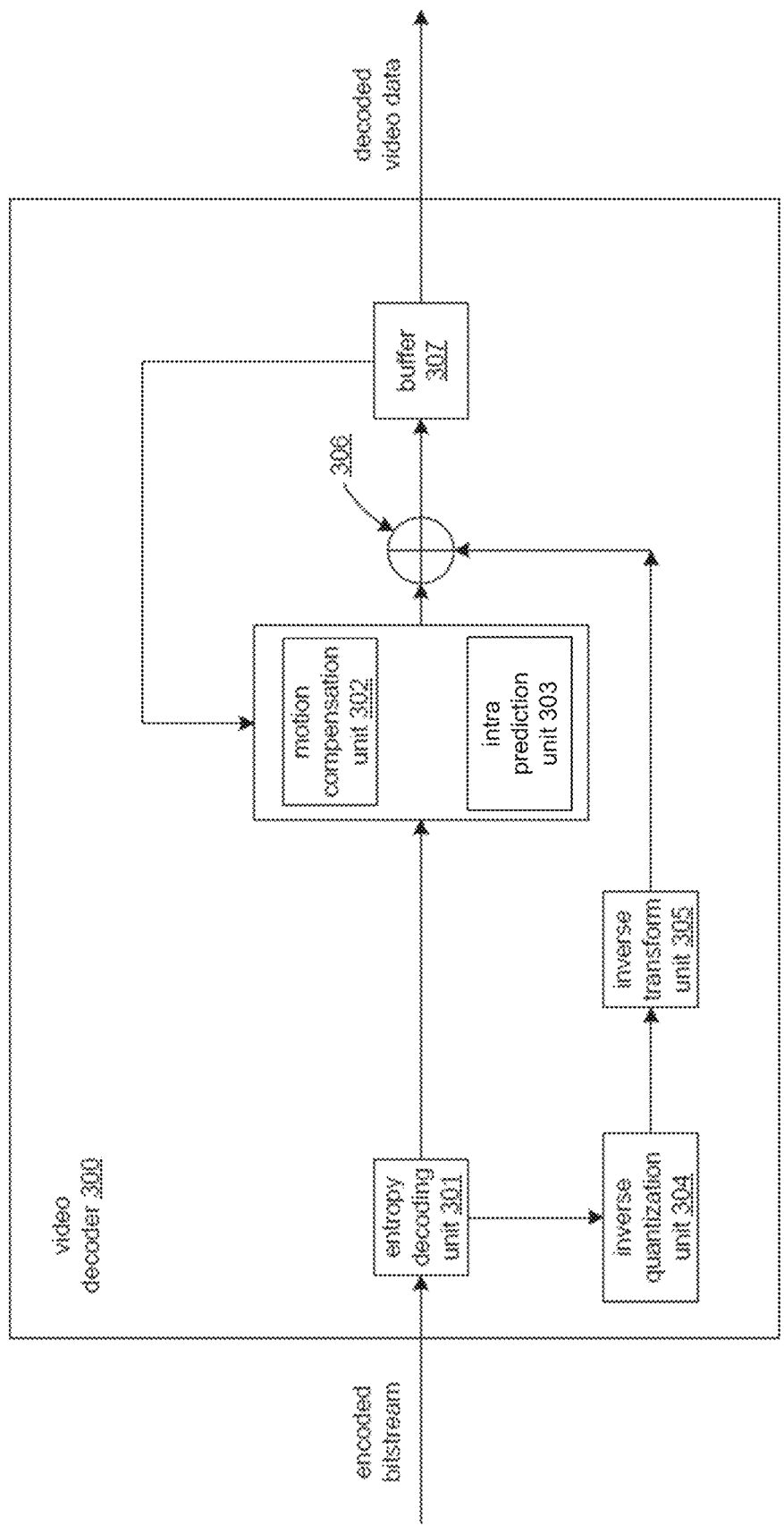
FIG. 10 is a block diagram that illustrates a decoder according to various embodiments of the present disclosure.

FIG. 10 is a block diagram illustrating an example of video decoder 300 which may be video decoder 124 in the system 100 illustrated in FIG. 8.

The video decoder 300 may be configured to perform any or all of the techniques of this disclosure. In the example of FIG. 10, the video decoder 300 includes a plurality of functional components. The techniques described in this disclosure may be shared among the various components of the video decoder 300. In some examples, a processor may be configured to perform any or all of the techniques described in this disclosure.

In the example of FIG. 10, video decoder 300 includes an entropy decoding unit 301, a motion compensation unit 302, an intra prediction unit 303, an inverse quantization unit 304, an inverse transformation unit 305, and a reconstruction unit 306 and a buffer 307. Video decoder 300 may, in some examples, perform a decoding pass generally reciprocal to the encoding pass described with respect to video encoder 200 (FIG. 9).

Entropy decoding unit 301 may retrieve an encoded bitstream. The encoded bitstream may include entropy coded video data (e.g., encoded blocks of video data). Entropy decoding unit 301 may decode the entropy coded video data, and from the entropy decoded video data, motion compensation unit 302 may determine motion information including motion vectors, motion vector precision, reference picture list indexes, and other motion information. Motion compensation unit 302 may, for example, determine such information by performing the AMVP and merge mode.

Motion compensation unit 302 may produce motion compensated blocks, possibly performing interpolation based on interpolation filters. Identifiers for interpolation filters to be used with sub-pixel precision may be included in the syntax elements.

Motion compensation unit 302 may use interpolation filters as used by video encoder 200 during encoding of the video block to calculate interpolated values for sub-integer pixels of a reference block. Motion compensation unit 302 may determine the interpolation filters used by video encoder 200 according to received syntax information and use the interpolation filters to produce predictive blocks.

Motion compensation unit 302 may use some of the syntax information to determine sizes of blocks used to encode frame(s) and/or slice(s) of the encoded video sequence, partition information that describes how each macroblock of a picture of the encoded video sequence is partitioned, modes indicating how each partition is encoded, one or more reference frames (and reference frame lists) for each inter-encoded block, and other information to decode the encoded video sequence.

Intra prediction unit 303 may use intra prediction modes for example received in the bitstream to form a prediction block from spatially adjacent blocks. Inverse quantization unit 304 inverse quantizes, i.e., de-quantizes, the quantized video block coefficients provided in the bitstream and decoded by entropy decoding unit 301. Inverse transform unit 305 applies an inverse transform.

Reconstruction unit 306 may sum the residual blocks with the corresponding prediction blocks generated by motion compensation unit 302 or intra prediction unit 303 to form decoded blocks. If desired, a deblocking filter may also be applied to filter the decoded blocks in order to remove blockiness artifacts. The decoded video blocks are then stored in buffer 307, which provides reference blocks for subsequent motion compensation/intra predication and also produces decoded video for presentation on a display device.

A listing of solutions preferred by some embodiments is provided next.

The following solutions show example embodiments of techniques discussed in the previous section (e.g., item 1).

Figure 7:
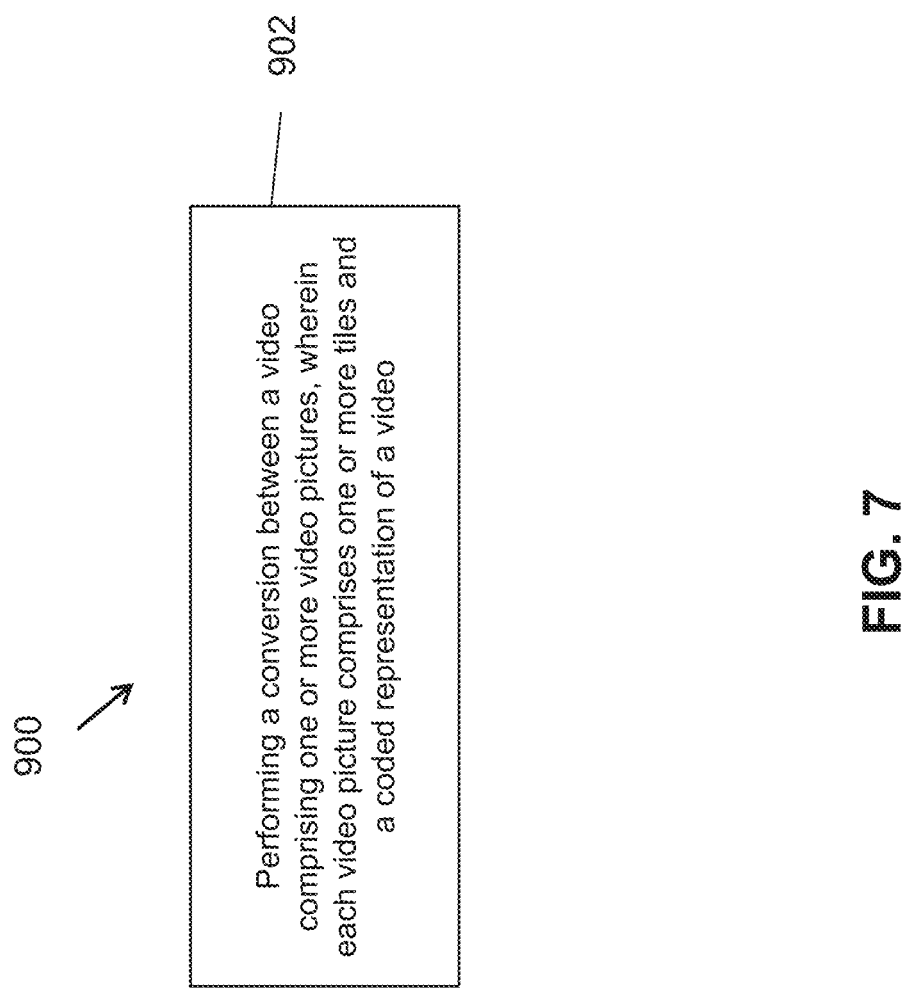
FIG. 7 is a flowchart for an example method of video processing.

1. A video processing method (e.g., method 900 depicted in FIG. 7), comprising: performing (902) a conversion between a video comprising one or more video pictures, wherein each video picture comprises one or more tiles and a coded representation of a video, wherein the coded representation conforms to a format rule; wherein the format rule specifies first information that is signalled in the coded representation and second information that is derived from the coded representation, wherein at least the first information or the second information relates to row indexes or column indexes of the one or more tiles.

2. The method of solution 1, wherein the format rule specifies that a tile column index of each coding tree unit column of each video picture is derived.

3. The method of solution 1, wherein the format rule specifies that a tile row index of each coding tree unit row of each video picture is derived.

The following solutions show example embodiments of techniques discussed in the previous section (e.g., item 2). In these solutions, a video region may be a video picture and a video unit may be a video block or a coding tree unit or a video slice.

4. A method of video processing, comprising: performing a conversion between a video unit of a video region of a video and a coded representation of a video, wherein the coded representation conforms to a format rule; wherein the format rule specifies that a first control information at the video region controls whether a second control information is included at the video unit level; wherein the first control information and/or the second control information includes information about luma mapping and chroma scaling (LMCS) or chroma residue scaling (CRS) or a reshaping process (RP) used for the conversion.

5. The method of solution 4, wherein the first control information comprises an indicator indicating whether the second control information is included in the coded representation.

6. The method of solutions 4-5, wherein a specific value of the first control information indicates that LMCS is disabled for all video units in the video region.

7. The method of any of solutions 4-6, wherein the second control information controls enabling of LMCS at the video unit.

8. The method of solution 4, wherein the first control information comprises multiple indicators.

9. The method of any of solutions 1 to 8, wherein the conversion comprises encoding the video into the coded representation.

10. The method of any of solutions 1 to 8, wherein the conversion comprises decoding the coded representation to generate pixel values of the video.

11. A video decoding apparatus comprising a processor configured to implement a method recited in one or more of solutions 1 to 10.

12. A video encoding apparatus comprising a processor configured to implement a method recited in one or more of solutions 1 to 10.

13. A computer program product having computer code stored thereon, the code, when executed by a processor, causes the processor to implement a method recited in any of solutions 1 to 10.

14. A method, apparatus or system described in the present document.

In the solutions described herein, an encoder may conform to the format rule by producing a coded representation according to the format rule. In the solutions described herein, a decoder may use the format rule to parse syntax elements in the coded representation with the knowledge of presence and absence of syntax elements according to the format rule to produce decoded video.

Figure 11:
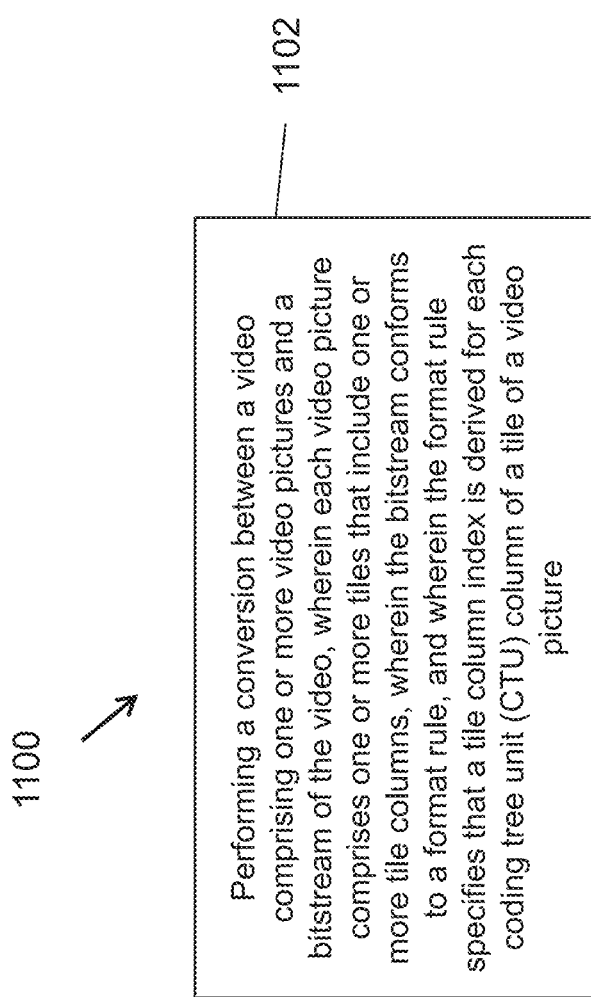

FIG. 11 is a flowchart for an example method 1100 of video processing. Operation 1102 includes performing a conversion between a video comprising one or more video pictures and a bitstream of the video, wherein each video picture comprises one or more tiles that include one or more tile columns, wherein the bitstream conforms to a format rule, and wherein the format rule specifies that a tile column index is derived for each coding tree unit (CTU) column of a tile of a video picture.

In some embodiments of method 1100, the tile column index for a ctbAddrX-th tile column, denoted as ctbToTileColIdx[ctbAddrX], is derived as follows: tileX=0

```
for( ctbAddrX = 0; ctbAddrX <= PicWidthInCtbsY; ctbAddrX++ ) {
  if( ctbAddrX = = tileColBd[ tileX + 1 ] )
    tileX++
  ctbToTileColIdx[ ctbAddrX ] = tileX
},
``` wherein PicWidthInCtbsY represents a width of the video picture in units of coded tree blocks (CTBs), and wherein tileColBd[i] represents a location of an i-th tile column boundary in units of CTBs.

In some embodiments of method 1100, each video picture also comprises one or more subpictures, each subpicture comprises one or more slices that collectively form a rectangular subset of the video picture, and the format rule further specifies that a width of a subpicture in units of tile columns included is derived based on tile column indices of a left-most CTU and/or a right-most CTU included in the subpicture.

In some embodiments of method 1100, the width of an i-th subpicture in units of tiles columns, denoted as SubpicWidthInTiles[i], is derived as follows:

```
for( i = 0; i <= sps_num_subpics_minus1; i++ ) {
  leftX = sps_subpic_ctu_top_left_x[ i ]
  rightX = leftX + sps_subpic_width_minus1[ i ]
  SubpicWidthInTiles[ i ] = ctbToTileColIdx[ rightX ] + 1 − ctbToTileColIdx[ leftX ]
},
``` wherein sps_num_subpics_minus1 represents a number of subpictures in the video picture, wherein sps_subpic_ctu_top_left_x[i] represents a horizontal position of top-left CTU of the i-th subpicture, wherein sps_subpic_width_minus1[i] plus 1 specifies the width of the i-th subpicture, and wherein ctbToTileColIdx[rightX] and ctbToTileColIdx [leftX] represent the tile column indices of a left-most CTU and a right-most CTU, respectively, included in the subpicture.

In some embodiments of method 1100, in response to a tile being partitioned into multiple rectangular slices and only a subset of the rectangular slices of the tile is included in the subpicture, the tile is counted as one tile in the value of the width of the subpicture.

Figure 12:
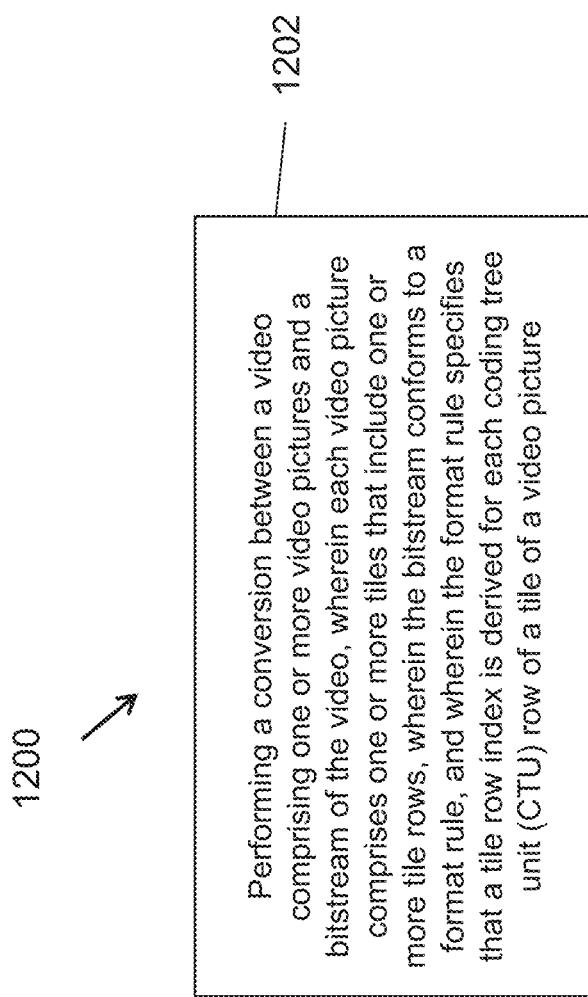

FIG. 12 is a flowchart for an example method 1200 of video processing. Operation 1202 includes performing a conversion between a video comprising one or more video pictures and a bitstream of the video, wherein each video picture comprises one or more tiles that include one or more tile rows, wherein the bitstream conforms to a format rule, and wherein the format rule specifies that a tile row index is derived for each coding tree unit (CTU) row of a tile of a video picture.

In some embodiments of method 1200, the tile row index for a ctbAddrY-th tile row, denoted as ctbToTileRowIdx [ctbAddrY], is derived as follows:

```
tileY = 0
for( ctbAddrY = 0; ctbAddrY <= PicHeightInCtbsY; ctbAddrY++ ) {
  if( ctbAddrY = = tileRowBd[ tileY + 1 ] )
    tileY++
  ctbToTileRowIdx[ ctbAddrY ] = tileY
},
``` wherein PicHeightInCtbsY represents a height of the video picture in units of coded tree blocks (CTBs), and wherein tileRowBd[i] represents a location of an i-th tile row boundary in units of CTBs.

In some embodiments of method 1200, each video picture also comprises one or more subpictures, each subpicture comprises one or more slices that collectively form a rectangular subset of the video picture, and the format rule further specifies that a height of a subpicture in units of tile rows is derived based on tile row indices of a top CTU and/or a bottom CTU included in the subpicture.

In some embodiments of method 1200, the height of an i-th subpicture in units of tile rows, denoted as SubpicHeightInTiles[i], is derived as follows:
  for (i=0; i<=sps_num_subpics_minus1; i++) {
    topY=sps_subpic_ctu_top_left_y[i]
    bottomY=topY+sps_subpic_height_minus1[i]
    SubpicHeightInTiles[i]=ctbToTileRowIdx[botY]+1−
      ctbToTileRowIdx[topY]
  },
wherein sps_num_subpics_minus1 represents a number of subpictures in the video picture, wherein sps_subpic_ctu_top_left_y[i] represents a vertical position of top-left CTUs of the i-th subpicture, wherein sps_subpic_height_minus1 [i] plus 1 specifies the height of the i-th subpicture, and wherein ctbToTileRowIdx[botY] and ctbToTileRowIdx [topY] represent the tile row indices of a bottom CTU and a top CTU, respectively, included in the subpicture.

In some embodiments of method 1200, in response to a tile being partitioned into multiple rectangular slices and only a subset of the rectangular slices of the tile is included in the subpicture, the tile is counted as one tile in the value of the height of the subpicture.

Figure 13:
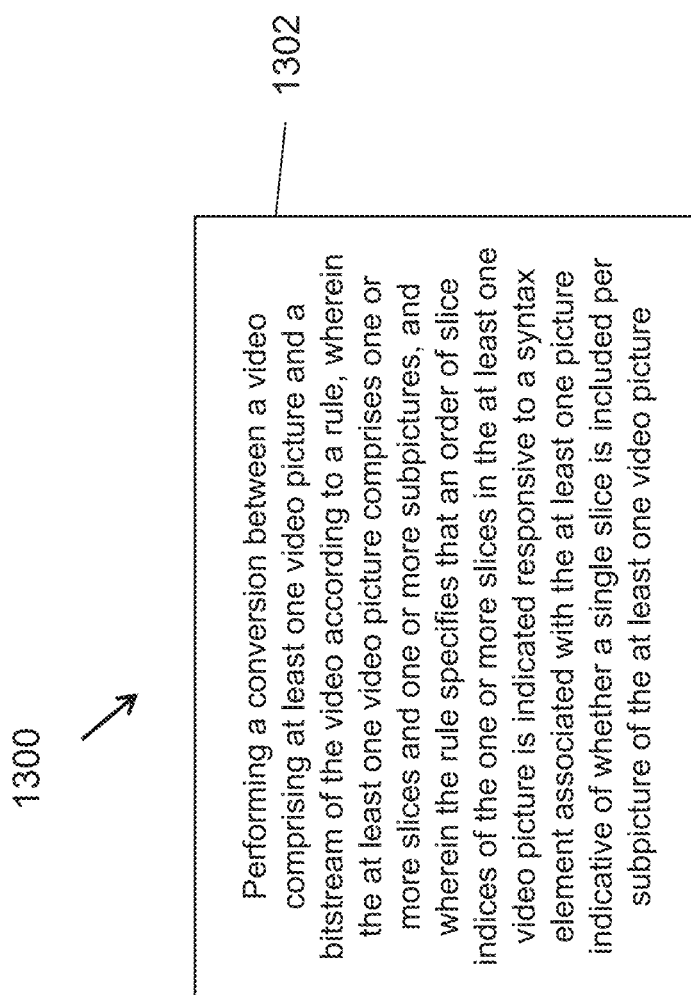

FIG. 13 is a flowchart for an example method 1300 of video processing. Operation 1302 includes performing a conversion between a video comprising at least one video picture and a bitstream of the video according to a rule, wherein the at least one video picture comprises one or more slices and one or more subpictures, and wherein the rule specifies that an order of slice indices of the one or more slices in the at least one video picture is indicated responsive to a syntax element associated with the at least one picture indicative of whether a single slice is included per subpicture of the at least one video picture.

In some embodiments of method 1300, the rule further specifies that the slice indices are indicated in response to each slice in the at least one video picture being a rectangular slice. In some embodiments of method 1300, the rule specifies that in case that the syntax element indicates that each of the one or more subpicture includes a single rectangular slice, then the order corresponds to increasing values of subpicture indices of the one or more subpictures in the video picture, and the subpicture indices of the one or more subpictures are indicated in a sequence parameter set (SPS) referred to by the at least one video picture. In some embodiments of method 1300, the rule specifies that in case that the syntax element indicates that each subpicture includes one or more rectangular slices, then the order corresponds to an order in which the one or more slices are included in a picture parameter set (PPS) referred to by the at least one video picture. In some embodiments of method 1300, the syntax element is included in a picture parameter set (PPS) referred to by the at least one video picture.

FIG. 14 is a flowchart for an example method 1400 of video processing. Operation 1402 includes performing a conversion between a video unit of a video region of a video and a bitstream of a video, wherein the bitstream conforms to a format rule, wherein the format rule specifies that a first control information at a first level the video region in the bitstream controls whether a second control information is included at a second level of the video unit in the bitstream, wherein the second level is smaller than the first level, wherein the first control information and the second control information include information about whether or how a luma mapping and chroma scaling (LMCS) tool is applied to the video unit, and wherein the LMCS tool includes using a chroma residue scaling (CRS), or a luma reshaping process (RP) for the conversion.

In some embodiments of method 1400, the first control information selectively includes a first indicator indicating whether the LMCS tool is enabled for one or more slices at the first level of the video region to specify whether the LMCS tool is enabled at the second level of the video unit, and the first indicator is a non-binary value. In some embodiments of method 1400, the first level of the video region includes a picture header. In some embodiments of method 1400, the first level of the video region includes a picture header, the first control information includes the first indicator, the LMCS tool is enabled for all slices of the picture header when the first indicator is equal to a first value, the LMCS tool is enabled for less than all slices of the picture header when the first indicator is equal to a second value, the LMCS tool is disabled for all slices of the picture header when the first indicator is equal to a third value, and the first value, the second value, and the third value are different from each other. In some embodiments of method 1400, a value of the first indicator is inferred to be a default value when the first control information excludes the first indicator.

In some embodiments of method 1400, the first level of the video region includes a picture header, the first control information includes the first indicator, the LMCS tool is disabled for all slices of the picture header when the first indicator is equal to a first value, the LMCS tool is disabled for less than all slices of the picture header when the first indicator is equal to a second value, the LMCS tool is enabled for all slices of the picture header when the first indicator is equal to a third value, and the first value, the second value, and the third value are different from each other. In some embodiments of method 1400, whether the first indicator is selectively included in the first control information based on a value of a syntax element in the bitstream that indicates whether the LMCS tool is enabled at a sequence level. In some embodiments of method 1400, the first indicator is coded with u(v) or u(2) or ue(v). In some embodiments of method 1400, the first indicator is coded with a truncated unary code.

In some embodiments of method 1400, an adaptation parameter set (APS) Information of the LMCS tool used by the one or more slices and/or a chroma scaling syntax element is included in the bitstream based on a value of the first indicator indicating whether the LMCS tool is enabled for the one or more slices at the first level of the video region. In some embodiments of method 1400, the second control information selectively includes a second indicator indicating whether the LMCS tool is enabled or disabled for one or more slices at the second level of the video unit, and the second indicator is included in the bitstream based on a value of a first indicator included in the first control information, and the first indicator indicates whether the LMCS tool is enabled or disabled for the one or more slices at the second level of the video unit. In some embodiments of method 1400, the second control information comprises a slice header. In some embodiments of method 1400, the second indicator is included in the second control information in response to the first indicator being equal to a first value. In some embodiments of method 1400, the second indicator is included in the second control information in response to performing a condition check of: the first indicator>>1, or the first indicator/2, or the first indicator & 0x01, wherein >> describes a right shift operation, and wherein & describes a bitwise logical and operation.

In some embodiments of method 1400, the second indicator is inferred to indicate that the LMCS tool is enabled for the one or more slices at the second level of the video unit in response to the first indicator being equal to a first value, or the second indicator is inferred to indicate that the LMCS tool is disabled for the one or more slices at the second level of the video unit in response to the first indicator being equal to a third value, and the first value, a second value of the first indicator, and the third value are different from each other. In some embodiments of method 1400, the first control information comprises multiple indicators that indicate whether the LMCS tool is enabled for one or more slices at the first level of the video region to specify whether the LMCS tool is enabled at the second level of the video unit, and the multiple indicators have non-binary values. In some embodiments of method 1400, the multiple indicators include at least two indicators included in a picture header. In some embodiments of method 1400, the at least two indicators include a first indicator that specifies whether the LMCS tool is enabled for at least one slice associated with the picture header, and the at least two indicators selectively include a second indicator that specifies whether the LMCS tool is enabled for all slices associated with the picture header. In some embodiments of method 1400, the second indicator is selectively present in the multiple indicators based on a value of the first indicator.

In some embodiments of method 1400, the value of the first indicator indicates that the LMCS tool is enabled for at least one slice. In some embodiments of method 1400, the LMCS tool is inferred to be enabled for all slices associated with the picture header in response to the second indicator being absent from the bitstream. In some embodiments of method 1400, the at least two indicators include a third indicator that is selectively included in a slice header based on a second value of the second indicator. In some embodiments of method 1400, the second value of the second indictor indicates that the LMCS tool is disabled for all of the slices. In some embodiments of method 1400, a value for the third indicator is inferred based on a first value of the first indicator and/or the second value of the second indicator in response to the third indicator being absent from the bitstream. In some embodiments of method 1400, the at least two indicators include a first indicator that specifies whether the LMCS tool is disabled for at least one slice associated with the picture header, and the at least two indicators selectively include a second indicator that specifies whether the LMCS tool is disabled for all slices associated with the picture header. In some embodiments of method 1400, the second indicator is present in the multiple indicators based on a value of the first indicator. In some embodiments of method 1400, the value of the first indicator specifies that the LMCS tool is disabled for at least one slice. In some embodiments of method 1400, the LMCS tool is inferred to be disabled for all slices associated with the picture header in response to the second indicator being absent from the bitstream. In some embodiments of method 1400, the at least two indicators selectively include a third indicator in a slice header based on a second value of the second indicator.

In some embodiments of method 1400, the second value of the second indicator specifies that the LMCS tool is enabled for all of the slices. In some embodiments of method 1400, a value for the third indicator is inferred based on a first value of the first indicator and/or a second value of the second indicator in response to the third indicator being absent from the bitstream. In some embodiments of method 1400, the multiple indicators selectively include a first indicator based on a value of a syntax element that indicates whether the LMCS tool is enabled at a sequence level. In some embodiments of method 1400, the multiple indicators selectively include a third indicator that indicates whether the LMCS tool is enabled or disabled at the second level of the video unit, and the third indicator is selectively present based on a first value of the first indicator and/or a second value of the second indicator. In some embodiments of method 1400, the third indicator is selectively present based on the second indicator indicating that the LMCS tool is not enabled for all slices or that the LMCS tool is not disabled for all slices. In some embodiments of method 1400, the first indicator, the second indicator, and/or the third indicator control a usage of the CRS or the luma RP.

FIG. 15 is a flowchart for an example method 1500 of video processing. Operation 1502 includes performing a conversion between a video and a bitstream of the video according to a rule, wherein the rule specifies that a luma mapping and chroma scaling (LMCS) tool is enabled when a first syntax element in a referred sequence parameter set indicates that the LMCS tool is enabled, wherein the rule specifies that the LMCS tool is not used when the first syntax element indicates that the LMCS tool is disabled, wherein the rule specifies that the LMCS tool is enabled for all slices associated with picture header of a video picture when a second syntax element in the bitstream indicates that the LMCS tool is enabled at the picture header level of the video, wherein the rule specifies that the LMCS tool is not used for all slices associated with the picture header when the second syntax element indicates that the LMCS tool is disabled at a picture header level of the video, wherein the rule specifies that the LMCS tool is used for a current slice associated with a slice header of a video picture when a third syntax element selectively included in the bitstream indicates that the LMCS tool is enabled at a slice header level of the video, and wherein the rule specifies that the LMCS tool is not used for the current slice when the third syntax element indicates that the LMCS tool is disabled at the slice header level of the video.

In some embodiments of method 1500, the rule specifies that the third syntax element is not included the slice header in the bitstream when the LMCS tool is used for all slices of the video picture. In some embodiments of method 1500, whether the LMCS tool is enabled or disabled is based on the second syntax element. In some embodiments of method 1500, the LMCS tool is enabled when the LMCS tool is used for all slices of the video picture, and the LMCS tool is disabled when the LMCS tool is not used for all slices of the video picture.

FIG. 16 is a flowchart for an example method 1600 of video processing. Operation 1602 includes performing a conversion between a video comprising one or more video pictures and a bitstream of a video according to a rule, wherein the rule specifies that whether an adaptive motion vector difference resolution (AMVR) is used in a motion vector coding of an affine inter mode based on a syntax element selectively included in a referred sequence parameter set (SPS) that indicates whether the AMVR is enabled, wherein the rule specifies that the AMVR is not used in the motion vector coding of the affine inter mode when the syntax element indicates that the AMVR is disabled, and wherein the rule specifies that the AMVR is inferred not to be used in the motion vector coding of the affine inter mode when the syntax element when the syntax element is not included in the SPS.

Figure 17:
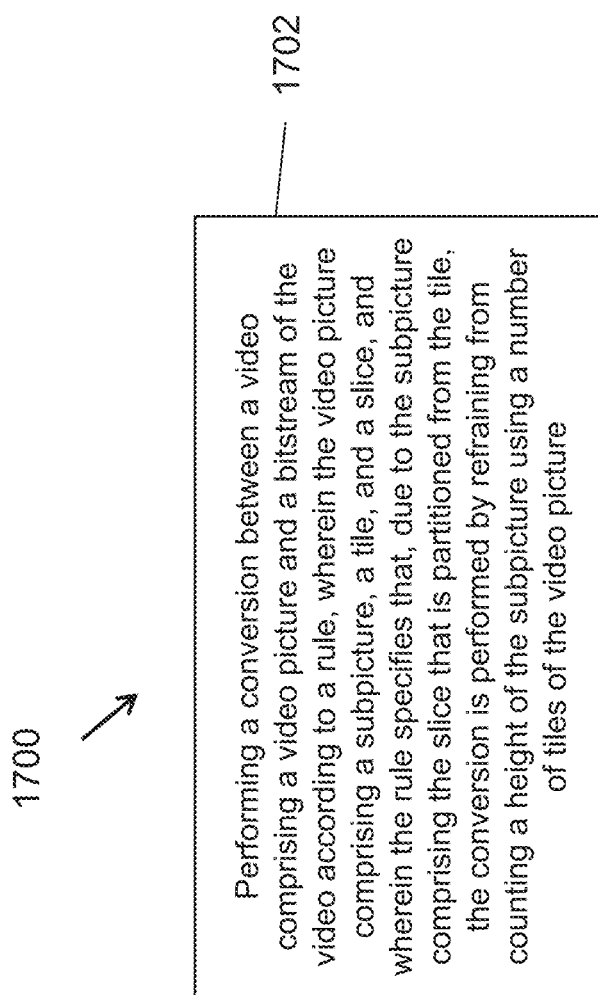

FIG. 17 is a flowchart for an example method 1700 of video processing. Operation 1702 includes performing a conversion between a video comprising a video picture and a bitstream of the video according to a rule, wherein the video picture comprising a subpicture, a tile, and a slice, and wherein the rule specifies that, due to the subpicture comprising the slice that is partitioned from the tile, the conversion is performed by refraining from counting a height of the subpicture using a number of tiles of the video picture.

In some embodiments of method 1700, the height of the subpicture is counted based on a number of coding tree units (CTUs). In some embodiments of method 1700, the height of the subpicture is less than one tile row.

Figure 18:
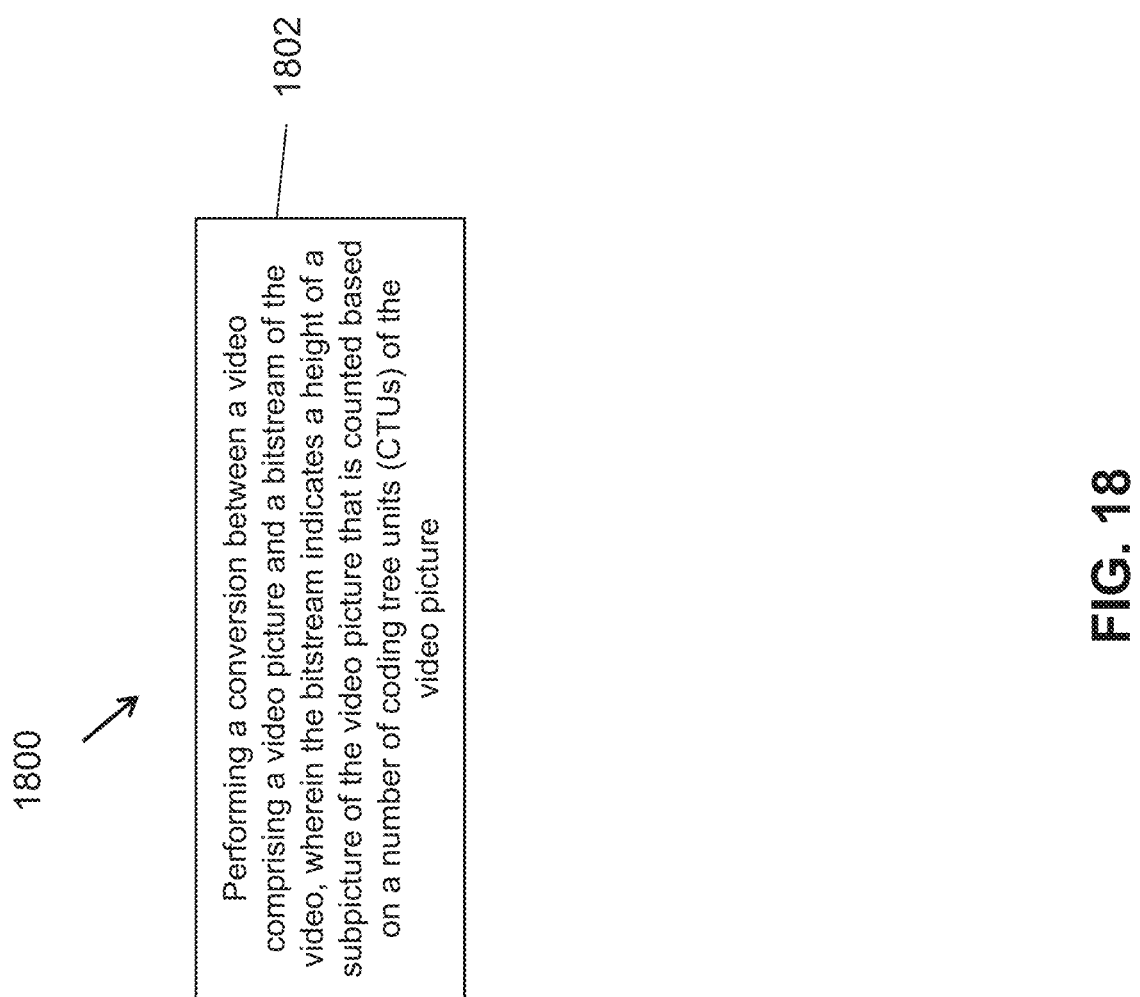

FIG. 18 is a flowchart for an example method 1800 of video processing. Operation 1802 includes performing a conversion between a video comprising a video picture and a bitstream of the video, wherein the bitstream indicates a height of a subpicture of the video picture that is counted based on a number of coding tree units (CTUs) of the video picture.

In some embodiments of method 1800, the height of the subpicture is not based on a number of tiles of the video picture. In some embodiments of method 1800, the height of the subpicture is less than one tile row.

Figure 19:
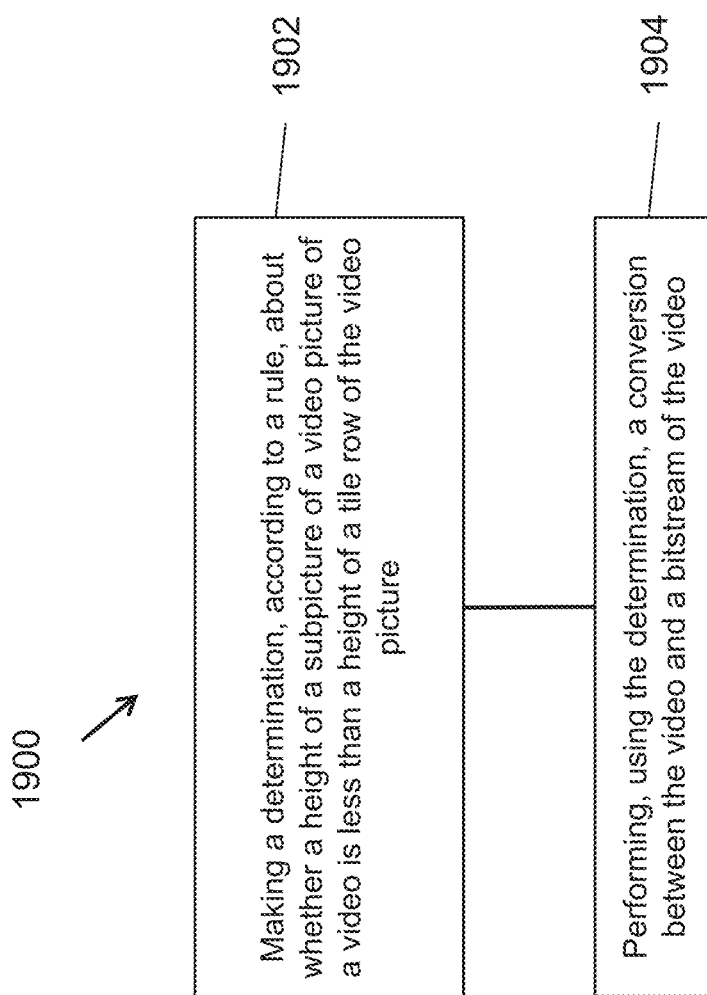

FIG. 19 is a flowchart for an example method 1900 of video processing. Operation 1902 includes making a determination, according to a rule, about whether a height of a subpicture of a video picture of a video is less than a height of a tile row of the video picture. Operation 1904 includes performing, using the determination, a conversion between the video and a bitstream of the video.

In some embodiments of method 1900, the rule specifies that the height of the subpicture is less than one tile row when: the subpicture only includes coding tree units (CTUs) from the one tile row, and either a first set of CTUs located on top of the subpicture are not the same as a second set of CTUs located on top of the one tile row, or a third set of CTUs located on the bottom of the subpicture are not the same as a fourth set of CTUs located on the bottom of the one tile row. In some embodiments of method 1900, when each subpicture of the video picture includes only one slice and the height of the subpicture is less than one tile row, for each slice with picture-level slice index i of the video picture, a value of CtbAddrInSlice[i][j] is derived from a picture raster scan CTU address of a j-th CTU in a CTU raster scan of the subpicture, and j is in a range of 0 to a number of CTUs in a slice minus 1, inclusive.

In some embodiments of method 1900, the rule specifies that the height of the subpicture is less than the one tile row when: a distance between a first set of CTUs located on top of the subpicture and a second set of CTUs located on the bottom of the subpicture is less than a second height of a tile of the video picture, wherein the second height of the tile is based on a number of CTUs of the subpicture. In some embodiments of method 1900, when each subpicture of the video picture includes only one slice and the height of the subpicture is greater than or equal to one tile row, for each slice with picture-level slice index i of the video picture, a value of CtbAddrInSlice[i][j] is derived from a picture raster scan CTU address of a j-th CTU in an order of CTUs in the subpicture, and j is in a range of 0 to a number of CTUs in a slice minus 1, inclusive.

In some embodiments of method 1900, the order of the CTUs in the subpicture is such that a first CTU in a first tile with a first tile index is placed before a second CTU in a second tile with a second tile index, and a value of the first tile index is less than that of the second tile index. In some embodiments of method 1900, the order of the CTUs in the subpicture is such that CTUs within one tile in the subpicture are ordered in a raster scan of the CTUs in the one tile.

In some embodiments of method(s) 1100-1900, the performing the conversion comprising encoding the video into the bitstream. In some embodiments of method(s) 1100-1900, the performing the conversion comprises encoding the video into the bitstream, and the method further comprises storing the bitstream in a non-transitory computer-readable recording medium. In some embodiments of method(s) 1100-1900, the performing the conversion comprises decoding the video from the bitstream.

In some embodiments, a video decoding apparatus comprising a processor configured to implement operations described for any one or more of methods 1100 to 1900. In some embodiments, a video encoding apparatus comprising a processor configured to implement operations described for any one or more of methods 1100 to 1900. In some embodiments, a computer program product having computer instructions stored thereon, the instructions, when executed by a processor, causes the processor to implement operations described for any one or more of methods 1100 to 1900. In some embodiments, a non-transitory computer-readable storage medium that stores a bitstream generated according to operations described for any one or more of methods 1100 to 1900. In some embodiments, a non-transitory computer-readable storage medium storing instructions that cause a processor to implement operations described for any one or more of methods 1100 to 1900. In some embodiments, method of bitstream generation, comprising: generating a bitstream of a video according to operations described for any one or more of methods 1100 to 1900, and storing the bitstream on a computer-readable program medium. In some embodiments, a method, an apparatus, a bitstream generated according to a disclosed method or a system described in the present document.

In the present document, the term "video processing" may refer to video encoding, video decoding, video compression or video decompression. For example, video compression algorithms may be applied during conversion from pixel representation of a video to a corresponding bitstream representation or vice versa. The bitstream representation of a current video block may, for example, correspond to bits that are either co-located or spread in different places within the bitstream, as is defined by the syntax. For example, a macroblock may be encoded in terms of transformed and coded error residual values and also using bits in headers and other fields in the bitstream. Furthermore, during conversion, a decoder may parse a bitstream with the knowledge that some fields may be present, or absent, based on the determination, as is described in the above solutions. Similarly, an encoder may determine that certain syntax fields are or are not to be included and generate the coded representation accordingly by including or excluding the syntax fields from the coded representation.

The disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an field programmable gate array (FPGA) or an application specific integrated circuit (ASIC).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., erasable programmable read-only memory (EPROM), electrically EPROM (EEPROM), and flash memory devices; magnetic disks, e.g., internal hard disks or removable disks; magneto optical disks; and compact disc read-only memory (CD ROM) and digital versatile disc read-only memory (DVD-ROM) disks. The processor and the memory can be supplemented by, or incorporated in, special purpose logic circuitry.

While this patent document contains many specifics, these should not be construed as limitations on the scope of any subject matter or of what may be claimed, but rather as descriptions of features that may be specific to particular embodiments of particular techniques. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method of video processing, comprising:
    making a determination, according to a rule, about whether a height of a subpicture of a video picture of a video is less than a height of a tile row of the video picture, and
    performing, using the determination, a conversion between the video and a bitstream of the video,
    wherein the rule specifies that the height of the subpicture is less than one tile row when a distance between a first set of coding tree units (CTUs) located on top of the subpicture and a second set of CTUs located at a bottom of the subpicture is less than a second height of a tile of the video picture, and
    wherein the second height of the tile is based on a number of CTUs of the tile.

2. The method of claim 1, wherein the rule specifies that the height of the subpicture is less than one tile row when:
    the subpicture only includes CTUs from the one tile row, and
    either a first set of CTUs located on top of the subpicture are not the same as a second set of CTUs located on top of the one tile row, or a third set of CTUs located at a bottom of the subpicture are not the same as a fourth set of CTUs located at a bottom of the one tile row.

3. The method of claim 1, wherein when each subpicture of the video picture includes only one slice and the height of the subpicture is less than one tile row, for each slice with a picture-level slice index i of the video picture, a value of CtbAddrInSlice[i][j] specifying a picture raster scan coding tree block (CTB) address of a j-th CTB within a slice is derived from the picture raster scan CTB address of the j-th CTB in a CTB raster scan of the subpicture, and wherein i is in a range of 0 to a number of slices in the video picture minus 1, inclusive and j is in a range of 0 to a number of CTUs in the slice minus 1, inclusive.

4. The method of claim 1, wherein when each subpicture of the video picture includes only one slice and the height of the subpicture is greater than or equal to one tile row, for each slice with a picture-level slice index i of the video picture, a value of CtbAddrInSlice[i][j] specifying a picture raster scan coding tree block (CTB) address of a j-th CTB within a slice is derived from the picture raster scan CTB address of the j-th CTB in an order of CTBs in the subpicture, and wherein i is in a range of 0 to a number of slices in the video picture minus 1, inclusive and j is in a range of 0 to a number of CTUs in the slice minus 1, inclusive.

5. The method of claim 4, wherein the order of the CTBs in the subpicture is such that a first CTB in a first tile with a first tile index is placed before a second CTB in a second tile with a second tile index, and wherein a value of the first tile index is less than a value of the second tile index.

6. The method of claim 4, wherein an order of the CTBs within one tile in the subpicture is ordered in a raster scan of the CTBs in the one tile.

7. The method of claim 1, wherein performing the conversion comprises encoding the video into the bitstream.

8. The method of claim 1, wherein performing the conversion comprises decoding the video from the bitstream.

9. An apparatus for processing video data comprising a processor and a non-transitory memory with instructions thereon, wherein the instructions upon execution by the processor, cause the processor to:
    make a determination, according to a rule, about whether a height of a subpicture of a video picture of a video is less than a height of a tile row of the video picture; and perform, using the determination, a conversion between the video and a bitstream of the video, wherein the rule specifies that the height of the subpicture is less than one tile row when a distance between a first set of coding tree units (CTUs) located on top of the subpicture and a second set of CTUs located at a bottom of the subpicture is less than a second height of a tile of the video picture, and wherein the second height of the tile is based on a number of CTUs of the tile.

10. The apparatus of claim 9, wherein when each subpicture of the video picture includes only one slice and the height of the subpicture is less than one tile row, for each slice with a picture-level slice index i of the video picture, a value of CtbAddrInSlice[i][j] specifying a picture raster scan coding tree block (CTB) address of a j-th CTB within a slice is derived from the picture raster scan CTB address of the j-th CTB in a CTB raster scan of the subpicture, and wherein i is in a range of 0 to a number of slices in the video picture minus 1, inclusive and j is in a range of 0 to a number of CTUs in the slice minus 1, inclusive.

11. The apparatus of claim 9, wherein when each subpicture of the video picture includes only one slice and the height of the subpicture is greater than or equal to one tile row, for each slice with a picture-level slice index i of the video picture, a value of CtbAddrInSlice[i][j] specifying a picture raster scan coding tree block (CTB) address of a j-th CTB within a slice is derived from the picture raster scan CTB address of the j-th CTB in an order of CTBs in the subpicture, wherein i is in a range of 0 to a number of slices in the video picture minus 1, inclusive and j is in a range of 0 to a number of CTUs in the slice minus 1, inclusive, wherein the order of the CTBs in the subpicture is such that a first CTB in a first tile with a first tile index is placed before a second CTB in a second tile with a second tile index, wherein a value of the first tile index is less than a value of the second tile index, and wherein an order of the CTBs within one tile in the subpicture is ordered in a raster scan of the CTBs in the one tile.

12. A non-transitory computer-readable storage medium storing instructions that cause a processor to:

make a determination, according to a rule, about whether a height of a subpicture of a video picture of a video is less than a height of a tile row of the video picture; and perform, using the determination, a conversion between the video and a bitstream of the video, wherein the rule specifies that the height of the subpicture is less than one tile row when a distance between a first set of coding tree units (CTUs) located on top of the subpicture and a second set of CTUs located at a bottom of the subpicture is less than a second height of a tile of the video picture, and wherein the second height of the tile is based on a number of CTUs of the tile.

13. The non-transitory computer-readable storage medium of claim 12, wherein when each subpicture of the video picture includes only one slice and the height of the subpicture is less than one tile row, for each slice with a picture-level slice index i of the video picture, a value of CtbAddrInSlice[i][j] specifying a picture raster scan coding tree block (CTB) address of a j-th CTB within a slice is derived from the picture raster scan CTB address of the j-th CTB in a CTB raster scan of the subpicture, and wherein i is in a range of 0 to a number of slices in the video picture minus 1, inclusive and j is in a range of 0 to a number of CTUs in the slice minus 1, inclusive.

14. The non-transitory computer-readable storage medium of claim 12, wherein when each subpicture of the video picture includes only one slice and the height of the subpicture is greater than or equal to one tile row, for each slice with a picture-level slice index i of the video picture, a value of CtbAddrInSlice[i][j] specifying a picture raster scan coding tree block (CTB) address of a j-th CTB within a slice is derived from the picture raster scan CTB address of the j-th CTB in an order of CTBs in the subpicture, wherein i is in a range of 0 to a number of slices in the video picture minus 1, inclusive and j is in a range of 0 to a number of CTUs in the slice minus 1, inclusive, wherein the order of the CTBs in the subpicture is such that a first CTB in a first tile with a first tile index is placed before a second CTB in a second tile with a second tile index, wherein a value of the first tile index is less than a value of the second tile index, and wherein an order of the CTBs within one tile in the subpicture is ordered in a raster scan of the CTBs in the one tile.

15. A non-transitory computer-readable recording medium storing a bitstream of a video which is generated by a method performed by a video processing apparatus, wherein the method comprises:

making a determination, according to a rule, about whether a height of a subpicture of a video picture of a video is less than a height of a tile row of the video picture; and generating, using the determination, the bitstream of the video, wherein the rule specifies that the height of the subpicture is less than one tile row when a distance between a first set of coding tree units (CTUs) located on top of the subpicture and a second set of CTUs located at a bottom of the subpicture is less than a second height of a tile of the video picture, and wherein the second height of the tile is based on a number of CTUs of the tile.

16. The non-transitory computer-readable recording medium of claim 15, wherein when each subpicture of the video picture includes only one slice and the height of the subpicture is less than one tile row, for each slice with a picture-level slice index i of the video picture, a value of CtbAddrInSlice[i][j] specifying a picture raster scan coding tree block (CTB) address of a j-th CTB within a slice is derived from the picture raster scan CTB address of the j-th CTB in a CTB raster scan of the subpicture, and wherein i is in a range of 0 to a number of slices in the video picture minus 1, inclusive and j is in a range of 0 to a number of CTUs in the slice minus 1, inclusive.

17. The non-transitory computer-readable recording medium of claim 15, wherein when each subpicture of the video picture includes only one slice and the height of the subpicture is greater than or equal to one tile row, for each slice with a picture-level slice index i of the video picture, a value of CtbAddrInSlice[i][j] specifying a picture raster scan coding tree block (CTB) address of a j-th CTB within a slice is derived from the picture raster scan CTB address of the j-th CTB in an order of CTBs in the subpicture,
wherein i is in a range of 0 to a number of slices in the video picture minus 1, inclusive and j is in a range of 0 to a number of CTUs in the slice minus 1, inclusive,
wherein the order of the CTBs in the subpicture is such that a first CTB in a first tile with a first tile index is placed before a second CTB in a second tile with a second tile index,
wherein a value of the first tile index is less than a value of the second tile index, and
wherein an order of the CTBs within one tile in the subpicture is ordered in a raster scan of the CTBs in the one tile.

\* \* \* \* \*